US009667372B2

(12) United States Patent
Ohwatari et al.

(10) Patent No.: US 9,667,372 B2
(45) Date of Patent: May 30, 2017

(54) MOBILE COMMUNICATION TERMINAL

(71) Applicant: NTT DOCOMO, INC., Tokyo (JP)

(72) Inventors: Yusuke Ohwatari, Tokyo (JP); Yousuke Sano, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 169 days.

(21) Appl. No.: 14/760,600

(22) PCT Filed: Sep. 26, 2013

(86) PCT No.: PCT/JP2013/075975
§ 371 (c)(1),
(2) Date: Jul. 13, 2015

(87) PCT Pub. No.: WO2014/115373
PCT Pub. Date: Jul. 31, 2014

(65) Prior Publication Data
US 2015/0358104 A1    Dec. 10, 2015

(30) Foreign Application Priority Data

Jan. 25, 2013 (JP) ................. 2013-011741
Mar. 13, 2013 (JP) ................. 2013-049779

(51) Int. Cl.
*H04J 11/00* (2006.01)
*H04L 5/00* (2006.01)
(Continued)

(52) U.S. Cl.
CPC ........ *H04J 11/0056* (2013.01); *H04B 7/0456* (2013.01); *H04B 7/0617* (2013.01);
(Continued)

(58) Field of Classification Search
CPC ... H04B 7/0456; H04B 7/0617; H04J 11/005; H04J 11/0056; H04L 5/0026;
(Continued)

(56) References Cited

U.S. PATENT DOCUMENTS 7,231,007 B2 * 6/2007 Artamo ............... H04B 7/0871
                                                            375/347
2011/0206167 A1 * 8/2011 Rosenqvist ......... H04L 25/0238
                                                            375/346
(Continued)

FOREIGN PATENT DOCUMENTS

JP    2000-511370 A    8/2000
WO    97/45968 A1     12/1997

OTHER PUBLICATIONS

International Search Report issued in PCT Application No. PCT/JP2013/075975 mailed Dec. 17, 2013 (1 page).
(Continued)

Primary Examiner — Robert M Morlan
Assistant Examiner — Nourali Mansoury
(74) Attorney, Agent, or Firm — Osha Liang LLP

(57) ABSTRACT

A mobile communication terminal calculates an interference rejection combining reception weight matrix based on a vector representing a reference signal transmitted from a desired base station so as to reduce interference with a desired beam of radio waves. The mobile communication terminal estimates, from the interference rejection combining reception weight matrix and the reference signal, an all received power expected when an IRC is implemented, and estimates, from an interference rejection combining weight vector, a channel matrix, and a reference signal sequence, a desired reference signal power expected when an IRC is implemented. The mobile communication terminal subtracts the desired reference signal power from the all received power, thereby estimating an interference and noise power
(Continued)

expected when an IRC is implemented, and calculates an SINR expected when an IRC is implemented from the estimated interference and noise power.

22 Claims, 21 Drawing Sheets

(51) Int. Cl.
*H04W 72/08* (2009.01)
*H04W 72/04* (2009.01)
*H04B 7/0456* (2017.01)
*H04B 7/06* (2006.01)

(52) U.S. Cl.
CPC ............ *H04J 11/005* (2013.01); *H04L 5/005* (2013.01); *H04L 5/0026* (2013.01); *H04W 72/0413* (2013.01); *H04W 72/082* (2013.01); *H04L 5/0073* (2013.01)

(58) Field of Classification Search
CPC .... H04L 5/005; H04L 5/0073; H04W 72/082; H04W 72/0413
See application file for complete search history.

(56) References Cited

U.S. PATENT DOCUMENTS

| | | | | |
|---|---|---|---|---|
| 2013/0279425 | A1* | 10/2013 | Balraj | H04B 7/0456 370/329 |
| 2014/0133535 | A1* | 5/2014 | Orlik | H04B 17/336 375/224 |
| 2015/0124632 | A1* | 5/2015 | Sandberg | H04B 7/0854 370/252 |

OTHER PUBLICATIONS

Y. Ohwatari et al; "Performance of Advanced Receiver Employing Interference Rejection Combining to Suppress Inter-cell Interference on LTE-Advanced Downlink"; Proceedings of the IEEE Vehicular Technology Conference (VTC Fall 2011); Sep. 2011 (7 pages).

R4-115213, 3GPP TSG-RAN WG4 #60Bis, Zhuhai, CN, Oct. 10-14, 2011; Agenda item: 9.3, Source: NTT DOCOMO, Title: "Reference receiver structure for interference mitigation on Enhanced performance requirement for LTE UE"; Document for Approval, Oct. 2011 (3 pages).

Raphael Visoz, et al.; "Binary Versus Symbolic Performance Prediction Methods for Iterative MMSE-IC Multiuser Mimo Joint Decoding"; Proc. IEEE SPAWC; pp. 131-135; Jun. 2009 (5 pages).

* cited by examiner

FIG. 10
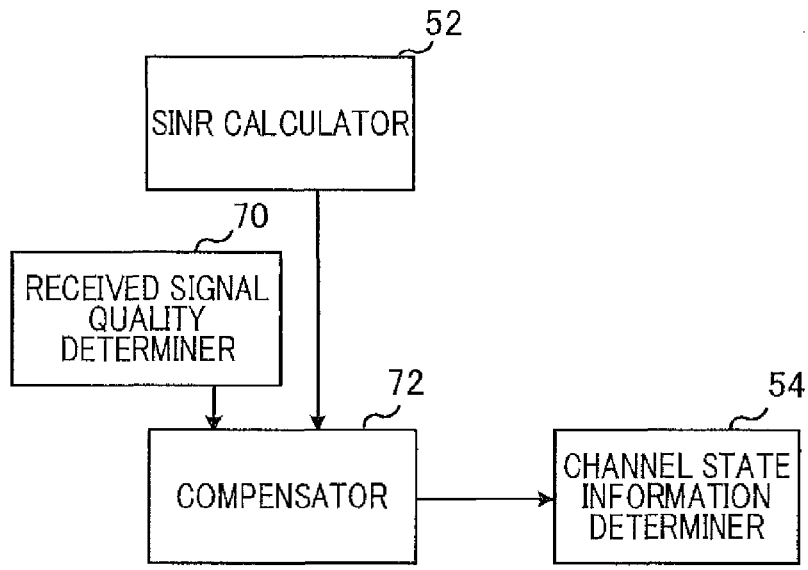
FIG. 11
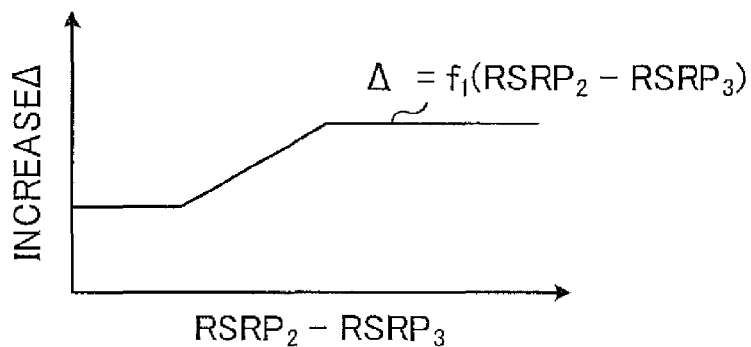
FIG. 12
| x = RSRP$_2$ − RSRP$_3$ | INCREASE$\Delta$ |
|---|---|
| x = 0 dBm | 1 dB |
| 0 dBm < x ≤ 10 dBm | 2 dB |
| 10 dBm < x | 3 dB |

FIG. 13
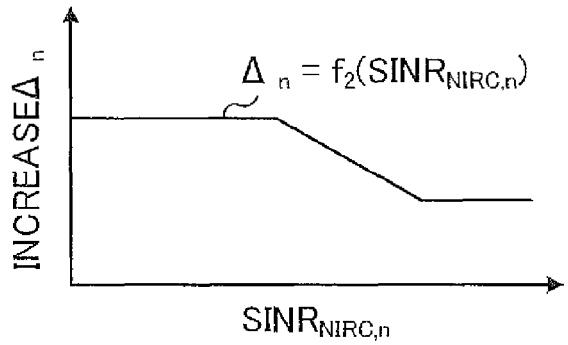
FIG. 14
| $SINR_{NIRC,n}$ | $INCREASE\Delta_n$ |
|---|---|
| $SINR_{NIRC,n} < 0$ dB | 3 dB |
| 0 dB $\leq SINR_{NIRC,n} < 10$ dB | 2 dB |
| 10 dB $\leq SINR_{NIRC,n}$ | 1 dB |
FIG. 15
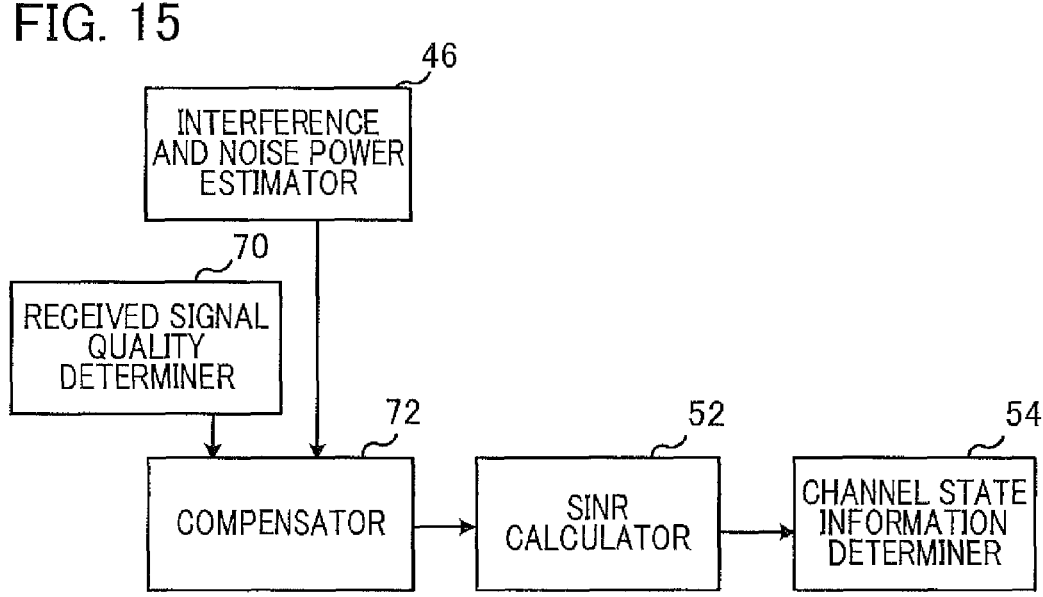

FIG. 17

$RSRP_2 < y_1$

| $x = RSRP_2 - RSRP_3$ | DECREASEΔ |
|---|---|
| $x = 0$ dBm | 10 dB |
| $0$ dBm $< x \leq 10$ dBm | 20 dB |
| $10$ dBm $< x$ | 30 dB |

$y_1 \leq RSRP_2 < y_2$

| $x = RSRP_2 - RSRP_3$ | DECREASEΔ |
|---|---|
| $x = 0$ dBm | 20 dB |
| $0$ dBm $< x \leq 10$ dBm | 30 dB |
| $10$ dBm $< x$ | 40 dB |

$y_2 \leq RSRP_2$

| $x = RSRP_2 - RSRP_3$ | DECREASEΔ |
|---|---|
| $x = 0$ dBm | 30 dB |
| $0$ dBm $< x \leq 10$ dBm | 40 dB |
| $10$ dBm $< x$ | 50 dB |

$y_1 < y_2$

FIG. 19
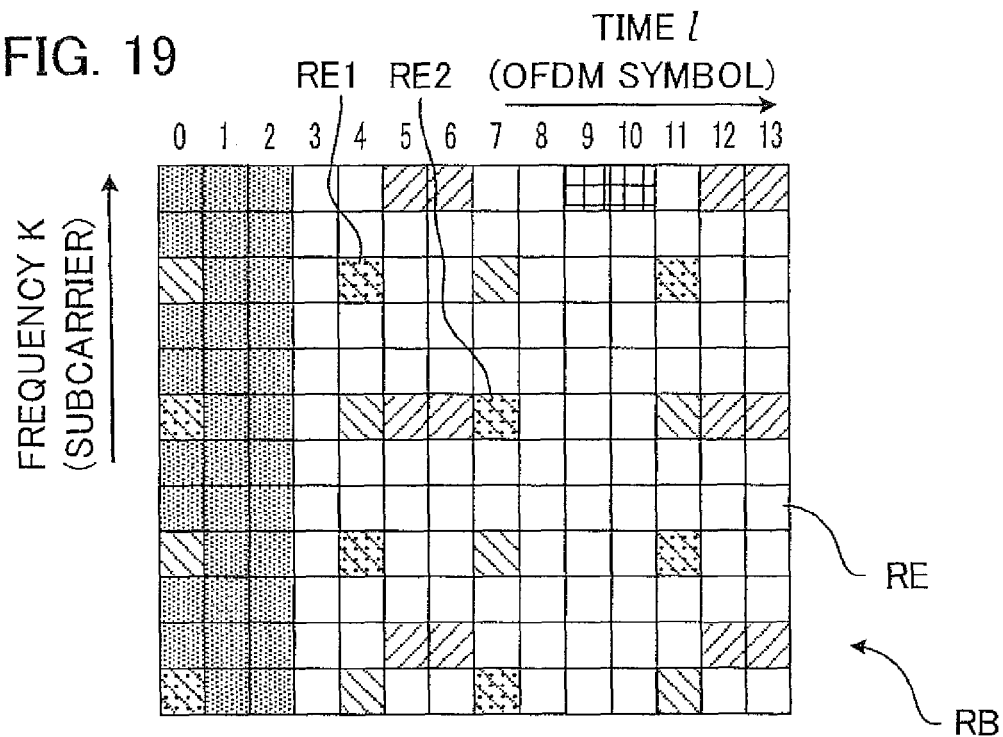
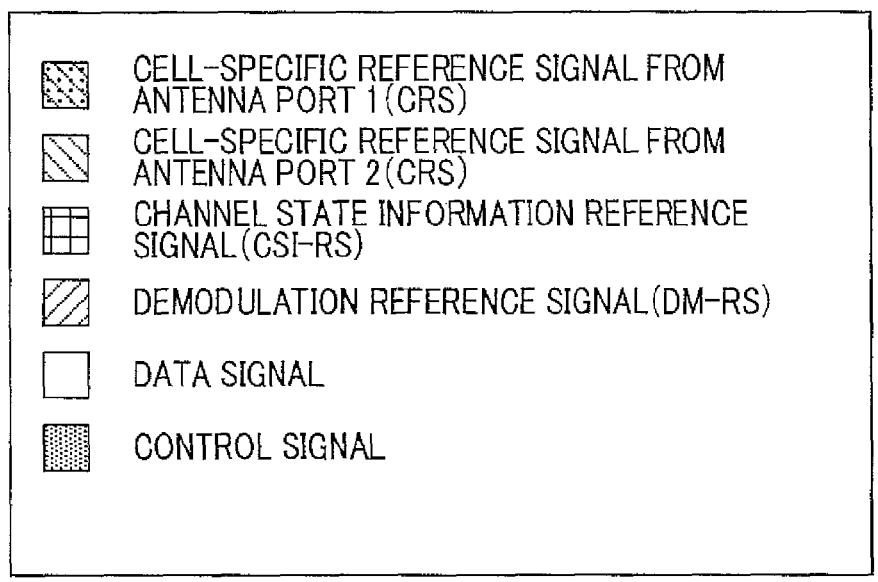

MOBILE COMMUNICATION TERMINAL

TECHNICAL FIELD

The present invention relates to a mobile communication terminal.

BACKGROUND ART

The LTE (Long Term Evolution) Advanced under the 3GPP (Third Generation Partnership Project) has proposed OFDMA (Orthogonal Frequency Division Multiplexing Access) using MU-MIMO (multi-user multiple-input multiple-output). In the downlink transmission of the MU-MIMO, one base station can not only communicate with a plurality of mobile communication terminals but can also simultaneously transmit different data streams (layers) to one mobile communication terminal.

The LTE Advanced group has been discussing a reception technology for mobile communication terminals, called interference rejection combining (Interference Rejection Combining, IRC). The interference rejection combining is a technology of weighting, at a mobile communication terminal, each signal obtained by the respective reception antennas so that the mobile communication terminal reduces the interference of interfering radio wave beams from interfering base stations to desired radio wave beams from a visited base station (desired base station) in the downlink communication.

The IRC enhances the reception quality of desired radio wave beams of a desired signal especially when, as shown in FIG. 1, a mobile communication terminal 10 is located near the boundary of a visited cell area 1a (the cell area of a desired base station 1) and is subject to strong interference radio wave beams from a different base station 2 (interfering base station) that is next to the desired base station 1. In FIG. 1, the reference symbol 2a denotes the cell area of the interfering base station 2. FIG. 1 depicts a schematic shape of a beam 1b generated at the desired base station 1 and that of a beam 2b generated at the interfering base station 2 also. The beam 2b generated at the interfering base station 2, in other words, a part of beams for a downlink channel to another mobile communication terminal (e.g., mobile communication terminal 12) is a cause of an interfering signal 2c interfering the mobile communication terminal 10.

Patent Document 1, Non-Patent Document 1, and Non-Patent Document 2 are example documents describing the IRC.

Non-Patent Document 2 discloses a reception weight matrix calculation of the IRC, using the MMSE (Minimum Mean Square Error) algorithm. This technology can calculate a reception weight matrix (interference rejection combining reception weight matrix) $W_{IRC(k, l)}$ of a mobile communication terminal receiving a signal in accordance with the following Equation (1) derived from the MMSE algorithm.

$$W_{IRC(k,l)} = H_1^H{}_{(k,l)} R^{-1} \quad (1)$$

In Equation (1), $H_1$ is a channel impulse matrix of a signal from a desired base station (desired cell) to which the mobile communication terminal connects; R is a variance-covariance matrix of a received signal vector for the mobile communication terminal. The letter k denotes a reception subcarrier number (i.e., a subcarrier index), and the letter l denotes an OFDM symbol number (i.e., an OFDM symbol index). The superscript H on the right-hand side of Equation (1) denotes a complex conjugate transpose.

A variance-covariance matrix for the received signal vector can be calculated from a channel impulse matrix obtained from a vector representing a reference signal received from the desired base station. A calculation method for a variance-covariance matrix based on a vector representing a reference signal is publically known. A variance-covariance matrix for a received signal vector can be calculated from a vector representing a data signal. A calculation method for a variance-covariance matrix based on a vector representing a data signal is publically known.

The 3GPP categorizes reference signals (reference signals, RSs) into cell-specific reference signals (cell-specific RSs (CRS)), channel state information reference signals (channel state information RSs (CSI-RS)), and demodulation reference signals (demodulation RSs (DM-RS)). The demodulation reference signals are also called terminal-specific reference signals (UE-specific RSs).

The 3GPP-LTE, i.e., Release 8, requires the use of cell-specific reference signals (CRS). A cell-specific reference signal supports a maximum of 4 transmission antennas of a base station (cell). The cell-specific reference signal is used for determination of channel state information (channel state estimation), demodulation of data, measurement of signal reception qualities (RSRP, reference signal reception power) from cells, and demodulation of control channels (Dedicated Physical Control Channel, DPCCH).

The 3GPP-LTE-Advanced, i.e., Release 10 LTE and after, would require channel state information reference signals (CSI-RS) and demodulation reference signals (DM-RS). A channel state information reference signal supports a maximum of 8 transmission antennas of a base station (cell). The channel state information reference signal will be used only for the determination of channel state information (channel state estimation). Accordingly, in comparison with the cell-specific reference signal, the channel state information reference signal is transmitted at lower density (with longer intervals).

A demodulation reference signal supports a maximum of 8 transmission streams that can be transmitted from a base station (cell). The demodulation reference signals would be used for demodulating mobile communication terminal (User Equipment, UE)-specific data signals. The demodulation reference signals have been precoded in substantially the same way as for data signals, and therefore, mobile communication terminals are able to demodulate data signals using the demodulation reference signals without any precoding information.

The LTE Advanced possibly uses also cell-specific reference signals, for example, for reception quality (RSRP) measurement of signals from cells and for control channel demodulation. FIG. 2 shows an example mapping of various signals transmitted in a single resource block of an LTE Advanced downlink transmission. The reference symbol RB denotes one resource block, and each segment of the resource block shows a resource element RE consisting of one subcarrier and one OFDM symbol, which are the minimum resource unit. The vertical axis shows frequency (subcarriers), and the horizontal axis shows time (OFDM symbols).

According to the LTE Advanced, mobile communication terminals determine channel state information (channel state information, CSI) from SINRs (signal-to-interference-plus-noise ratios) and feed the determined channel state information back to a base station. In response to the channel state information fed back from the mobile communication terminals, the base station executes precoding for forming transmission beams suited for respective mobile communication terminals. The precoding alleviates interferences from a plurality of transmission beams that use the same frequency, to improve reception qualities at a plurality of mobile communication terminals that receive these transmission beams. Known as an example of the channel state information fed back from mobile communication terminals is a set of a channel quality indicator (CQI), a precoding matrix indicator (PMI), and a rank indicator (RI).

RELATED ART DOCUMENT

Patent Document

Patent Document 1 Japanese Translation of PCT International Publication No. JP-T-2000-511370

Non-Patent Document

Non-Patent Document 1 Y. Ohwatari, N. Miki, T. Asai, T. Abe, and H. Taoka, "Performance of Advanced Receiver Employing Interference Rejection Combining to Suppress Inter-cell Interference in LTE-Advanced Downlink," in Proceedings of the IEEE Vehicular Technology Conference (VTC Fall 2011), September 2011

Non-Patent Document 2 R4-115213, 3GPP TSG RAN WG4 #60Bis, Zhuhai, C N, 10-14 Oct. 2011, Agenda item: 9.3, Source: NTT DOCOMO, Title: "Reference receiver structure for interference mitigation on Enhanced performance requirement for LTE UE", Document for: Approval, October 2011

SUMMARY OF THE INVENTION

Problem to be Solved by the Invention

It is desirable that mobile communication terminals capable of performing the interference rejection combining (IRC) can calculate, in determining the channel state information, an SINR expected when the interference rejection combining is implemented. This is because if a mobile communication terminal can ensure good reception qualities by the interference rejection combining, a base station is then able to loosen precoding requirements for the mobile communication terminal. The SINR can be used also as a handover index by mobile communication terminals. It is desirable if an SINR expected when the interference rejection combining is implemented can be calculated also on handovers of mobile communication terminals capable of performing the interference rejection combining.

An interference and noise power estimation is necessary for the SINR calculation. An interference power which is a part of the interference and noise power fluctuates greatly and frequently depending on scheduling with respect to mobile communication terminals in another cell. Therefore, accurate and timely estimation of the interference and noise power is difficult, and accordingly, accurate and timely calculation of the SINR is also difficult. In a case in which the calculated SINR is inaccurate, a base station executes inappropriate precoding depending on channel state information determined based on the inaccurate SINR. In this case, for example, mobile communication terminals could possibly receive a low-quality signal from a base station. When the calculated SINR is inaccurate, and when such an SINR is used as an index for handover, an inaccurate handover could take place.

Proposed as another technique for reducing the interference is a technique called successive interference cancellation (Successive Interference Cancellation, SIC) (e.g., Raphael Visoz, et al., "Binary Versus Symbolic Performance Prediction Methods For Iterative MMSE-IC Multiuser MIMO Joint Decoding", in Proc. IEEE SPAWC, June 2009). To give an overview, according to the SIC, a mobile communication terminal demodulates an interfering data signal (for some situations, additionally decodes the signals), successively canceling an interfering data signal from the received signals, to extract a desired data signal for the mobile terminal itself.

The SIC repeats processes of demodulating a data signal, generating a data signal replica, and canceling the replica. A data signal having a higher SINR is demodulated and canceled with priority. Therefore, it is crucial to calculate an SINR with a high degree of accuracy also for the execution of the SIC.

Accordingly, the present invention provides a mobile communication terminal capable of interference rejection combining, which is able to calculate with a high degree of accuracy signal-to-interference-plus-noise ratios expected when the interference rejection combining is implemented.

Means of Solving the Problems

A mobile communication terminal according to a first aspect of the present invention is a mobile communication terminal for receiving a downlink signal from a desired base station by an orthogonal frequency-division multiple access. The mobile communication terminal has: a plurality of reception antennas for receiving radio waves; a reference signal vector measurer configured to measure a reference signal vector being a vector representing a reference signal transmitted from the desired base station; an interference rejection combining processor configured to calculate an interference rejection combining reception weight matrix based on the reference signal vector measured by the reference signal vector measurer so as to reduce effects on a desired beam by another beam, wherein the desired beam is a beam of radio waves transmitted from the desired base station; an all received power estimator configured to estimate an all received power expected when an interference rejection combining is implemented, the all received power being estimated from the interference rejection combining reception weight matrix and the reference signal vector measured by the reference signal vector measurer; a channel impulse matrix estimator configured to estimate a channel impulse matrix from a signal derived from the radio waves received by the reception antennas; a desired reference signal power estimator configured to estimate a desired reference signal power expected when the interference rejection combining is implemented, the desired reference signal power being estimated from an interference rejection combining weight vector being a part of the interference rejection combining reception weight matrix, the channel impulse matrix, and a reference signal sequence being a sequence of the reference signal or of another reference signal; an interference and noise power estimator configured to estimate an interference and noise power expected when the interference rejection combining is implemented, the interference and noise power being estimated by subtracting the desired reference signal power from the all received power, a transmission weight vector estimator configured to estimate a transmission weight vector, from the channel impulse matrix, to be used for precoding performed at the desired base station; a desired data signal power estimator configured to estimate a desired data signal power expected when the interference rejection combining is implemented, the desired data signal power being estimated from the interference rejection combining weight vector, the channel impulse matrix, and the transmission weight vector; and a signal-to-interference-plus-noise ratio calculator configured to calculate a signal-to-interference-plus-noise ratio expected when the interference rejection combining is implemented, the signal-to-interference-plus-noise ratio being calculated from the desired data signal power and the interference and noise power.

A mobile communication terminal according to a second aspect of the present invention is a mobile communication terminal for receiving a downlink signal from a desired base station by an orthogonal frequency-division multiple access. The mobile communication terminal has: a plurality of reception antennas for receiving radio waves; a reference signal vector measurer configured to measure a reference signal vector being a vector representing a reference signal transmitted from the desired base station; an interference rejection combining processor configured to calculate an interference rejection combining reception weight matrix based on the reference signal vector measured by the reference signal vector measurer so as to reduce effects on a desired beam by another beam, wherein the desired beam is a beam of radio waves transmitted from the desired base station; an all received signal component estimator configured to estimate all received signal components expected when the interference rejection combining is implemented, the all received signal components being estimated from the interference rejection combining reception weight matrix and the reference signal vector measured by the reference signal vector measurer; a channel impulse matrix estimator configured to estimate a channel impulse matrix from a signal derived from radio waves received by the reception antennas; a desired reference signal component estimator configured to estimate desired reference signal components expected when the interference rejection combining is implemented, the desired reference signal components being estimated from an interference rejection combining weight vector being a part of the interference rejection combining reception weight matrix, the channel impulse matrix, and a reference signal sequence being a sequence of the reference signal or of another reference signal; an interference and noise power estimator configured to estimate an interference and noise power expected when the interference rejection combining is implemented, the interference and noise power being estimated by squaring a result of subtraction obtained by subtracting the desired reference signal components from the all received signal components; a transmission weight vector estimator configured to estimate a transmission weight vector, from the channel impulse matrix, to be used for precoding at the desired base station; a desired data signal power estimator configured to estimate a desired data signal power expected when the interference rejection combining is implemented, the desired data signal power being estimated from the interference rejection combining weight vector, the channel impulse matrix, and the transmission weight vector; and a signal-to-interference-plus-noise ratio calculator configured to calculate a signal-to-interference-plus-noise ratio that is expected when the interference rejection combining is implemented, the signal-to-interference-plus-noise ratio being calculated from the desired data signal power and the interference and noise power.

A mobile communication terminal according to a third aspect of the present invention is a mobile communication terminal for receiving a downlink signal from a desired base station by an orthogonal frequency-division multiple access. The mobile communication terminal has: a plurality of reception antennas for receiving radio waves; a reference signal vector measurer configured to measure a reference signal vector being a vector representing a reference signal transmitted from the desired base station; an interference rejection combining processor configured to calculate an interference rejection combining reception weight matrix based on the reference signal vector measured by the reference signal vector measurer so as to reduce effects on a desired beam by another beam, wherein the desired beam is a beam of radio waves transmitted from the desired base station; a channel impulse matrix estimator configured to estimate a plurality of channel impulse matrices each corresponding to respective ones of different resource elements of the reference signal, from a signal derived from radio waves received by the reception antennas; an interference and noise power estimator configured to estimate an interference and noise power expected when an interference rejection combining is implemented, the interference and noise power being estimated from the interference rejection combining reception weight matrix and a plurality of channel impulse vectors each being a part of respective ones of the channel impulse matrices; a transmission weight matrix supplier configured to supply a candidate for a transmission weight matrix to be used for precoding at the desired base station; an inter-transmission-stream interference power estimator configured to estimate an inter-transmission-stream interference power expected when the interference rejection combining is implemented from an interference rejection combining weight vector being a part of the interference rejection combining reception weight matrix, one of the channel impulse matrices or another of the channel impulse matrices estimated by the channel impulse matrix estimator, and the transmission weight matrix candidate, wherein the inter-transmission-stream interference power is transmitted from the desired base station; a desired data signal power estimator configured to estimate a desired data signal power expected when the interference rejection combining is implemented, the desired data signal power being estimated from the interference rejection combining weight vector, one of the channel impulse matrices estimated by the channel impulse matrix estimator or another channel impulse matrix, and the transmission weight matrix candidate; and a signal-to-interference-plus-noise ratio calculator configured to calculate a signal-to-interference-plus-noise ratio expected when the interference rejection combining is implemented, the signal-to-interference-plus-noise ratio being calculated from the desired data signal power, the interference and noise power, and the inter-transmission-stream interference power.

A mobile communication terminal according to a fourth aspect of the present invention is a mobile communication terminal for receiving a downlink signal from a desired base station by an orthogonal frequency-division multiple access. The mobile communication terminal has: a plurality of reception antennas for receiving radio waves; a reference signal vector measurer configured to measure a demodulation reference signal vector being a vector representing a reference signal for demodulation transmitted from the desired base station; an interference rejection combining processor configured to calculate an interference rejection combining reception weight matrix based on the demodulation reference signal vector measured by the reference signal vector measurer so as to reduce effects on a desired beam by another beam, wherein the desired beam is a beam of radio waves transmitted from the desired base station; an all received power estimator configured to estimate an all received power expected when an interference rejection combining is implemented, the all received power being estimated from the interference rejection combining reception weight matrix and the demodulation reference signal vector measured by the reference signal vector measurer; a channel impulse matrix estimator configured to estimate a channel impulse matrix based on the demodulation reference signal vector measured by the reference signal vector measurer; a desired reference signal power estimator configured to estimate a desired reference signal power expected when the interference rejection combining is implemented, the desired reference signal power being estimated from an interference rejection combining weight vector being a part of the interference rejection combining reception weight matrix, the channel impulse matrix, and a sequence of the reference signal for demodulation; an interference and noise power estimator configured to estimate an interference and noise power expected when the interference rejection combining is implemented, the interference and noise power being estimated by subtracting the desired reference signal power from the all received power, and a signal-to-interference-plus-noise ratio calculator configured to calculate a signal-to-interference-plus-noise ratio expected when the interference rejection combining is implemented, the signal-to-interference-plus-noise ratio being calculated from the desired reference signal power and the interference and noise power.

A mobile communication terminal according to a fifth aspect of the present invention is a mobile communication terminal for receiving a downlink signal from a desired base station by an orthogonal frequency-division multiple access. The mobile communication terminal has: a plurality of reception antennas for receiving radio waves; a reference signal vector measurer configured to measure a demodulation reference signal vector being a vector representing a reference signal for demodulation transmitted from the desired base station; an interference rejection combining processor configured to calculate an interference rejection combining reception weight matrix based on the demodulation reference signal vector measured by the reference signal vector measurer so as to reduce effects on a desired beam by another beam, wherein the desired beam is a beam of radio waves transmitted from the desired base station; a channel impulse matrix estimator configured to estimate, from a signal derived from radio waves received by the reception antennas, a plurality of channel impulse matrices each corresponding to respective ones of different resource elements of the reference signal for demodulation; an interference and noise power estimator configured to estimate an interference and noise power that is expected when an interference rejection combining is implemented, the interference and noise power being estimated from the interference rejection combining reception weight matrix and a plurality of channel impulse vectors each being a part of respective ones of the channel impulse matrices; an inter-transmission-stream interference power estimator configured to estimate an inter-transmission-stream interference power from an interference rejection combining weight vector being a part of the interference rejection combining reception weight matrix and one of the channel impulse matrices estimated by the channel impulse matrix estimator, wherein the inter-transmission-stream interference power is transmitted from the desired base station and is expected when the interference rejection combining is implemented; a desired data signal power estimator configured to estimate a desired data signal power expected when the interference rejection combining is implemented, the desired data signal power being estimated from the interference rejection combining weight vector, one of the channel impulse matrices estimated by the channel impulse matrix estimator, and a sequence of the reference signal for demodulation; and a signal-to-interference-plus-noise ratio calculator configured to calculate a signal-to-interference-plus-noise ratio expected when the interference rejection combining is implemented, the signal-to-interference-plus-noise ratio being calculated from the desired data signal power, the interference and noise power, and the inter-transmission-stream interference power.

Effect of the Invention

The present invention calculates interference and noise powers with small error. The interference and noise power fluctuates greatly and frequently, but so calculating interference and noise powers with small error enables highly accurate calculation of a signal-to-interference-plus-noise ratio expected when the interference rejection combining is implemented.

BRIEF DESCRIPTION OF THE DRAWINGS

FIG. 10 is a block diagram showing a partial configuration of a mobile communication terminal according to each of seventh and eighth embodiments of the present invention.

FIG. 11 is a graph illustrating an example of a function $f_1$ used in the seventh embodiment.

FIG. 12 shows an example table used in the seventh embodiment.

FIG. 13 is a graph illustrating an example of a function $f_2$ used in the eighth embodiment.

FIG. 14 shows an example table used in the eighth embodiment.

FIG. 15 is a block diagram showing a partial configuration of a mobile communication terminal according to a ninth embodiment of the present invention.

FIG. 17 shows a plurality of example tables used in the ninth embodiment.

FIG. 19 is a diagram showing an example mapping of various signals in a resource block of a downlink transmission.

MODES FOR CARRYING OUT THE INVENTION

In the following, various embodiments according to the present invention will be described with reference to the attached drawings.

Figure 3:
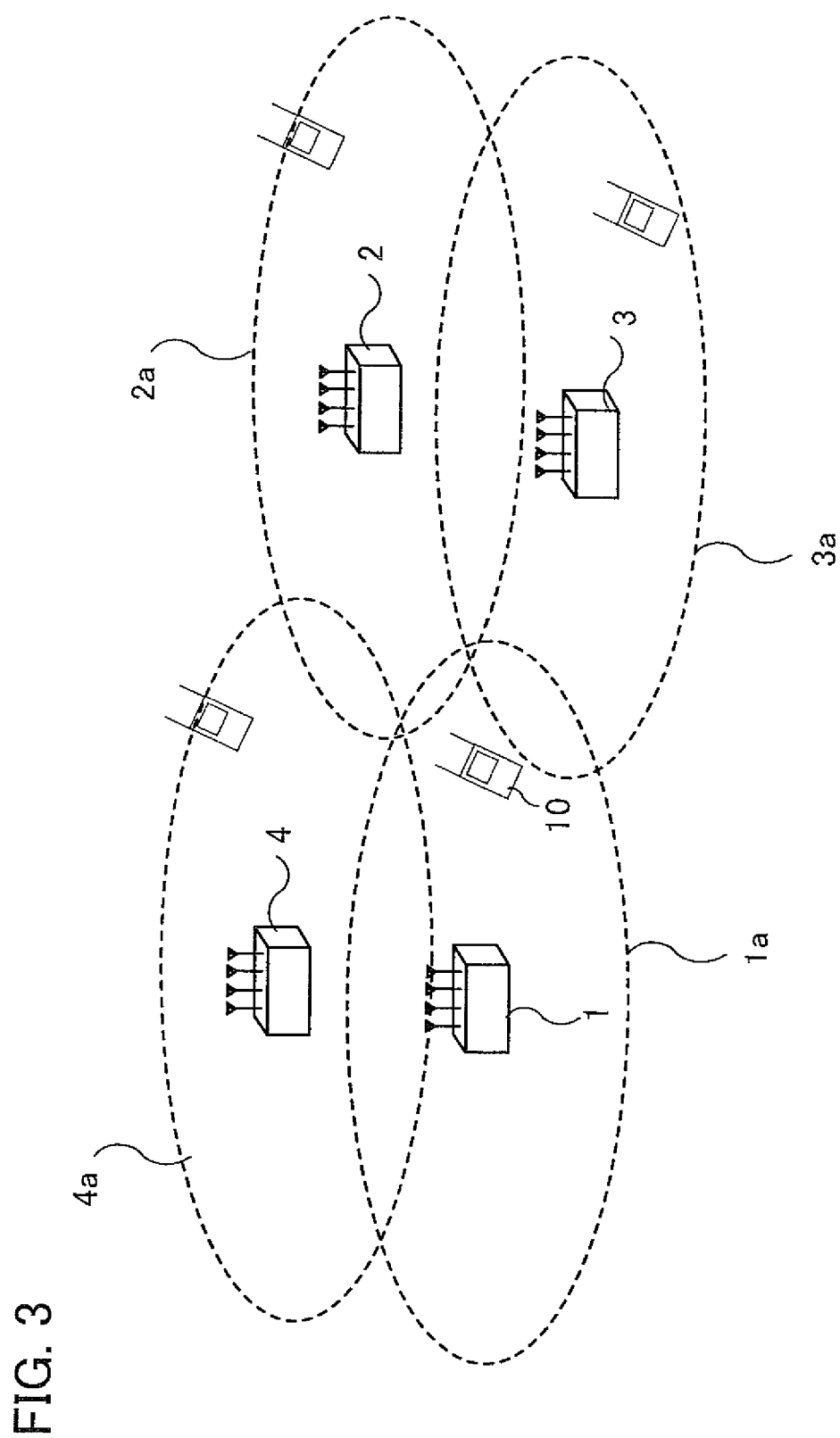
FIG. 3 is a diagram showing a radio communication system according to an embodiment of the present invention.

A mobile communication terminal according to the present invention is used in a radio communication system shown in FIG. 3. The radio communication system is provided with a plurality of base stations 1, 2, 3, and 4. The base stations 1, 2, 3, and 4 are each an LTE eNB (evolved Node B). Each of the base stations 1, 2, 3, and 4 is able to communicate with many mobile communication terminals 10. The base stations (cells) 1, 2, 3, and 4 have cell areas 1a, 2a, 3a, and 4a, respectively. The downlink communication uses OFDMA (orthogonal frequency-division multiple access). Each mobile communication terminal 10 is an LTE UE (user equipment).

The mobile communication terminal 10 according to an embodiment of the present invention is fit for MIMO, and is capable of implementing the interference rejection combining (IRC).

First Embodiment

Figure 4:
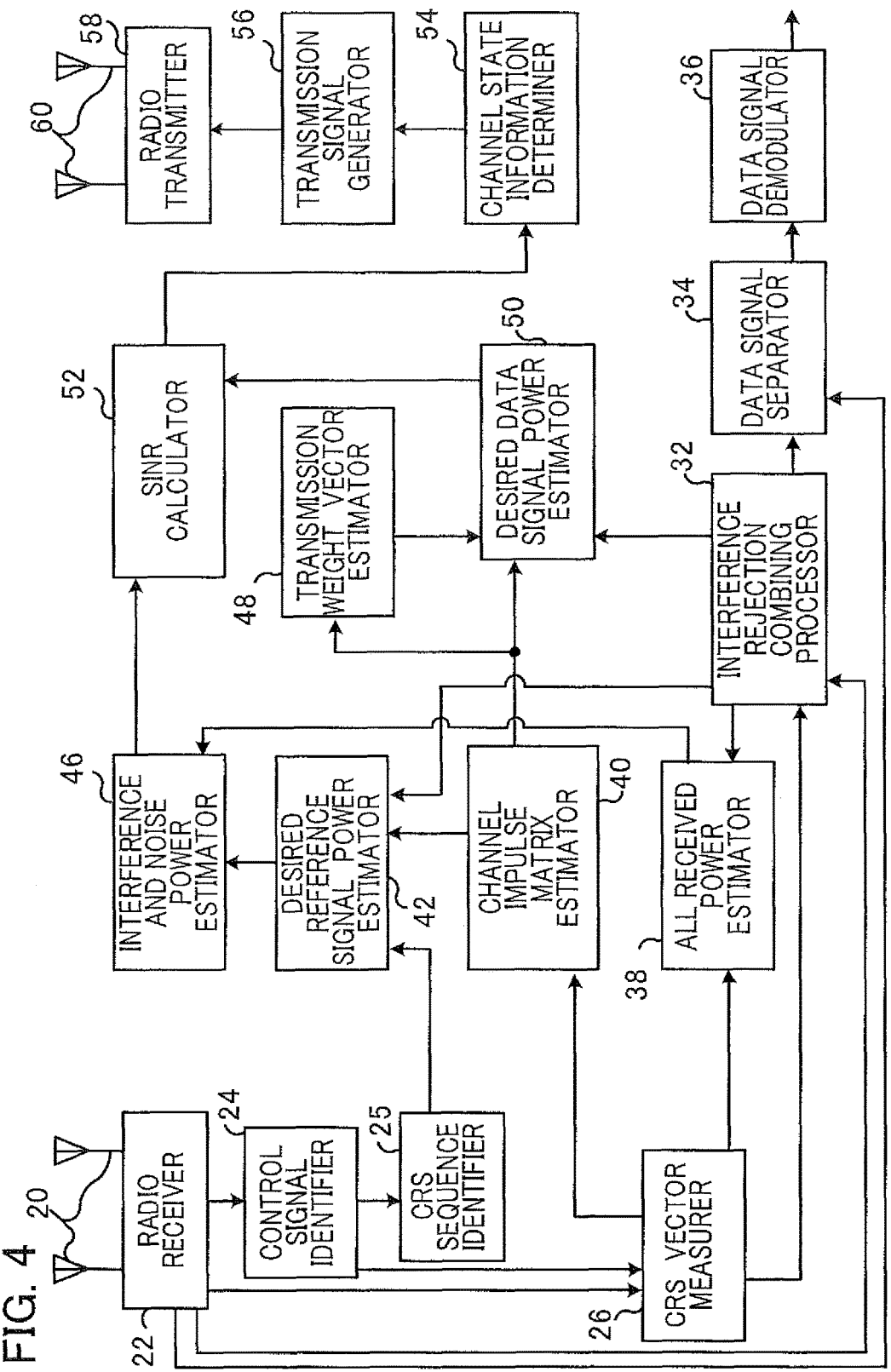
FIG. 4 is a block diagram showing a configuration of a mobile communication terminal according to a first embodiment of the present invention.

FIG. 4 is a block diagram showing a configuration of a mobile communication terminal according to a first embodiment of the present invention. FIG. 4 simply shows signal reception related portions and signal transmission related portions alone, and other portions are not depicted therein.

As shown in FIG. 4, the mobile communication terminal has a plurality of reception antennas 20 that receive radio waves and a radio receiver 22 which is a reception circuit used for OFDMA for converting the radio waves received from the reception antennas 20 into electric signals.

The mobile communication terminal is also provided with a control signal identifier 24, a cell-specific reference signal (CRS) sequence identifier 25, a cell-specific reference signal (CRS) vector measurer 26, an interference rejection combining processor 32, a data signal separator 34, a data signal demodulator 36, an all received power estimator 38, a channel impulse matrix estimator 40, a desired reference signal power estimator 42, an interference and noise power estimator 46, a transmission weight vector estimator 48, a desired data signal power estimator 50, a signal-to-interference-plus-noise ratio (SINR) calculator 52, a channel state information determiner 54, and a transmission signal generator 56. These components are functional blocks realized by a CPU (Central Processing Unit), not shown, of the mobile communication terminal running and executing a computer program and functioning in accordance with the computer program.

The mobile communication terminal is further provided with a radio transmitter 58 and at least one transmission antenna 60. The radio transmitter 58 is a transmission circuit employed for SC-FDMA (Single-Carrier Frequency-Division Multiple Access), for converting electric signals into radio waves, the electric signals being signals for transmission generated by the transmission signal generator 56. The transmission antenna 60 transmits radio waves.

The control signal identifier 24 identifies control signals received from a desired base station, from among signals output from the radio receiver 22. Control signals indicate, for example, a cell ID of the desired base station, the number of transmission antennas of the desired base station, the number of transmission layers (i.e., the number of transmission streams) transmitted from the desired base station to the mobile communication terminal.

The CRS sequence identifier 25 (reference signal sequence identifier) identifies, based on the cell ID indicated by the control signals identified by the control signal identifier 24, a cell-specific reference signal sequence (CRS sequence) $d_{1,CRS}$ which is a sequence of a cell-specific reference signal (CRS) transmitted from the desired base station. Specifically, from among a set of CRS sequences known to the mobile communication terminal, the CRS sequence identifier 25 selects a CRS sequence that corresponds to the cell ID.

The CRS vector measurer 26 (reference signal vector measurer) measures a cell-specific reference signal vector (CRS vector) $y_{CRS}$ which is a vector representing a CRS transmitted from the desired base station. The CRS vector is an $N_{RX}$-dimensional vector, and $N_{RX}$ corresponds to the number of the reception antennas 20 of the mobile communication terminal.

The interference rejection combining processor 32 calculates, based on the reference signal vector (CRS vector) measured by the CRS vector measurer 26, an interference rejection combining reception weight matrix $W_{IRC}$ by use of a publically-known method so as to reduce effects on desired beams of radio waves transmitted from the desired base station by another beam. The interference rejection combining reception weight matrix is an $N_{stream} \times N_{RX}$-dimensional matrix. $N_{stream}$ is the number of transmission layers transmitted from the desired base station to the mobile communication terminal.

The data signal separator 34 uses the interference rejection combining reception weight matrix calculated by the interference rejection combining processor 32, to separate, from among signals output from the radio receiver 22, data signals for this mobile communication terminal from data signals for another mobile communication terminal. The data signal demodulator 36 demodulates and decodes the data signals for the mobile communication terminal, which have been separated by the data signal separator 34, to obtain data signals.

The all received power estimator 38 estimates an all received power expected when the interference rejection combining is implemented $\hat{P}_{S+I+N,n}$ from the interference rejection combining reception weight matrix calculated by the interference rejection combining processor 32 and the CRS vector measured by the CRS vector measurer 26. The all received power is a sum of a desired signal power, an interference power, and a noise power expected from the CRS vector, and it is estimated for each transmission stream. The subscript n denotes a transmission stream number.

Specifically, the all received power estimator 38 calculates an $N_{stream}$-dimensional estimate signal vector ŝ in accordance with the following Equation (2):

$$\hat{s} = W_{IRC} y_{CRS} \tag{2}$$

The all received power estimator 38 then extracts, from the estimate signal vector, an estimate signal $s_n$ for each transmission stream. The subscript n denotes a transmission stream number. The all received power estimator 38 calculates an all received power $\hat{P}_{S+I+N,n}$, for each transmission stream, expected when the interference rejection combining is implemented in accordance with the following Equation (3):

$$\hat{P}_{S+I+N,n} = |s_n| \tag{3}$$

The channel impulse matrix estimator 40 estimates, from signals derived from radio waves received by the reception antennas 20, an $N_{RX} \times N_{TX}$-dimensional channel impulse matrix of a CRS $H_{CRS}$ which is received from the desired base station. $N_{TX}$ is the number of transmission antennas of the desired base station. Specifically, the channel impulse matrix estimator 40 calculates, from the CRS vector $y_{CRS}$ measured by the CRS vector measurer 26, the channel impulse matrix by use of a publically known method.

The desired reference signal power estimator 42, calculates, i.e., estimates, a desired reference signal power $\hat{P}_{S,n}$ expected when the interference rejection combining is implemented for each transmission stream in accordance with the following Equation (4):

$$\hat{P}_{S,n} = |w_{IRC,n} H_{CRS} d_{1,CRS}| \tag{4}$$

where the subscript n denotes a transmission stream number.

In Equation (4), $w_{IRC,n}$ is a row vector extracted relative to each transmission stream from the interference rejection combining reception weight matrix $W_{IRC}$ ($N_{stream} \times N_{RX}$-dimensional matrix) which is calculated by the interference rejection combining processor 32. Thus, the row vector is an interference rejection combining weight vector which is a part of an interference rejection combining reception weight matrix. The subscript n denotes a transmission stream number.

Thus, the desired reference signal power estimator 42 estimates a desired reference signal power expected when the interference rejection combining is implemented from an interference rejection combining weight vector, which is a part of an interference rejection combining reception weight matrix calculated by the interference rejection combining processor 32, a channel impulse matrix calculated by the channel impulse matrix estimator 40, and a CRS sequence identified by the CRS sequence identifier 25.

The interference and noise power estimator 46 subtracts the desired reference signal power from the all received power, thereby estimating an interference and noise power relative to the CRS, the interference and noise power being an expected power when the interference rejection combining is implemented. That is, the interference and noise power estimator 46 calculates an interference and noise power for each transmission stream $\hat{P}_{I+N,n}$ in accordance with the following Equation (5):

$$\hat{P}_{I+N,n} = \hat{P}_{S+I+N,n} - \hat{P}_{S,n} \tag{5}$$

where the subscript n denotes a transmission stream number.

The transmission weight vector estimator 48 estimates, from the channel impulse matrix estimated by the channel impulse matrix estimator 40, a transmission weight vector $w_{TX}$ to be used for precoding at the desired base station. More specifically, the transmission weight vector estimator 48, based on the channel impulse matrix $H_{CRS}$ estimated by the channel impulse matrix estimator 40, estimates a transmission weight matrix $W_{TX}$ to be used for precoding at the desired base station. The transmission weight matrix is an $N_{TX} \times N_{stream}$-dimensional matrix. In the transmission weight matrix estimation, the transmission weight vector estimator 48 may instead select a transmission weight matrix that matches the channel impulse matrix estimated by the channel impulse matrix estimator 40 from a codebook (describing a set of transmission weight matrices), where both of the mobile communication terminal and the base station own the same codebook. Another alternative may involve the transmission weight vector estimator 48 calculating a transmission weight matrix based on the channel impulse matrix estimated by the channel impulse matrix estimator 40 with a publically known method.

A transmission weight vector is a column vector extracted for each transmission stream from the transmission weight matrix (NTX×Nstream-dimensional matrix). Thus, this column vector is a transmission weight vector which is a part of the transmission weight matrix. The subscript n denotes a transmission stream number. The transmission weight vector estimator 48, from the transmission weight matrix, extracts a transmission weight vector for each transmission stream.

The desired data signal power estimator 50 calculates, i.e., estimates, a desired data signal power $\hat{P}_{S,n}'$, for each transmission stream, expected when the interference rejection combining is implemented, from the interference rejection combining weight vector, the channel impulse matrix, and the transmission weight vector in accordance with the following Equation (6):

$$\hat{P}_{S,n}' = |w_{IRC,n} H_{CRS} w_{TX}|^2 \tag{6}$$

The subscript n denotes a transmission stream number.

The SINR calculator 52 calculates a signal-to-interference-plus-noise ratio expected when the interference rejection combining is implemented, from the desired data signal power estimated by the desired data signal power estimator 50 and the interference and noise power estimated by the interference and noise power estimator 46. The SINR calculator 52 calculates, i.e., estimates, a signal-to-interference-plus-noise ratio $SINR_n$ expected when the interference rejection combining is implemented, for each transmission stream, in accordance with the following Equation (7):

$$SINR_n = \hat{P}_{S,n}' / \hat{P}_{I+N,n} \tag{7}$$

The subscript n denotes a transmission stream number.

The channel state information determiner 54 determines channel state information (CSI) from a signal-to-interference-plus-noise ratio $SINR_n$ calculated by the SINR calculator 52. As described above, a set of a channel quality indicator (CQI), a precoding matrix indicator (PMI), and a rank indicator (RI) are known as the channel state information. The channel state information determiner 54 uses a publically known method to determine a CQI, PMI, and RI, to give a signal representing CSI including the CQI, PMI, and RI to the transmission signal generator 56.

The transmission signal generator 56 transmits, i.e., feeds the signal representing CSI, back to the desired base station through the radio transmitter 58 and the transmission antenna 60. Thus, the transmission signal generator 56 serves as a channel state information transmitter.

The present embodiment estimates an all received power expected when the interference rejection combining is implemented, from an interference rejection combining reception weight matrix and a CRS vector, and estimates a desired reference signal power expected when the interference rejection combining is implemented, from an interference rejection combining weight vector, a channel impulse matrix, and a CRS sequence. An interference and noise power expected when the interference rejection combining is implemented is a difference between the all received power and the desired reference signal power. The interference rejection combining reception weight matrix and the channel impulse matrix could contain errors since they are obtained through estimation. In contrast, the CRS sequence is error free because it is a sequence corresponding to a desired base station to which the mobile communication terminal connects. Accordingly, an interference and noise power with small error is calculated. Although the interference and noise power fluctuates frequently and greatly, since an interference and noise power with such a small error is calculated, the present invention can calculate a signal-to-interference-plus-noise ratio (SINR) expected when the interference rejection combining is implemented with a high degree of accuracy.

Since the calculated SINR is highly accurate, a base station is able to perform suitable adaptive modulation and user scheduling depending on channel quality information determined based on an SINR with a high degree of accuracy, and it is also possible to perform a suitable precoding depending on channel state information determined based on an SINR with a high degree of accuracy. Moreover, since the calculated SINR has a high degree of accuracy, a suitable handover could be performed if the SINR is used as an index for handover.

In the present embodiment, the CRS vector measurer 26 measures, as a reference signal vector, a cell-specific reference signal vector (CRS vector), which is a vector representing a cell-specific reference signal, and the all received power estimator 38 estimates an all received power based on the CRS vector measured by the CRS vector measurer 26. Also, the channel impulse matrix estimator 40 estimates a channel impulse matrix based on the CRS vector measured by the CRS vector measurer 26, and the desired reference signal power estimator 42 estimates a desired reference signal power from an interference rejection combining weight vector, a channel impulse matrix, and a CRS sequence identified by the CRS sequence identifier 25. The interference and noise power is a difference between the all received power and the desired reference signal power.

Figure 1:
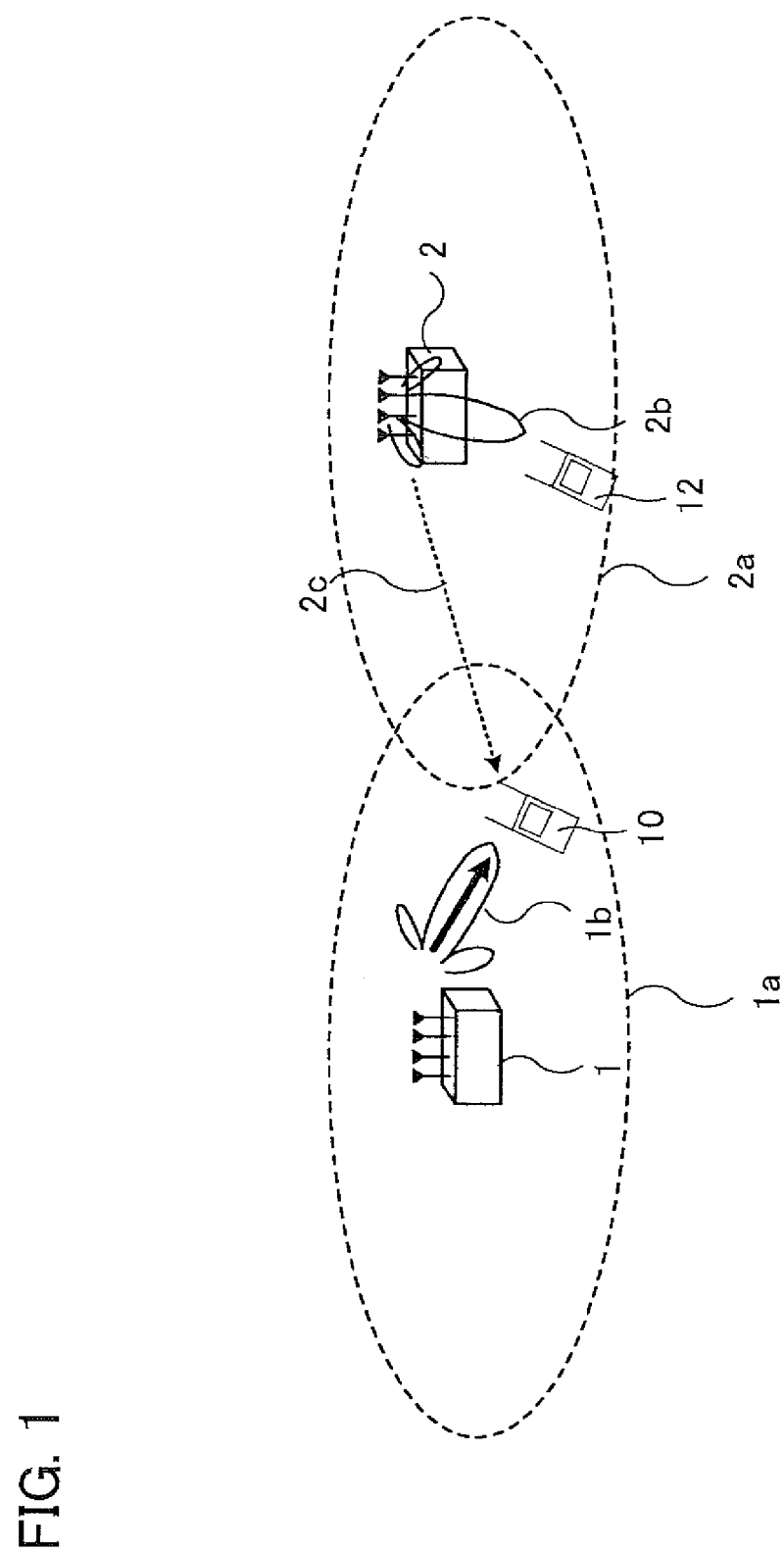
FIG. 1 is a diagram showing a mobile communication terminal receiving an interfering beam from an interfering base station.
Figure 2:
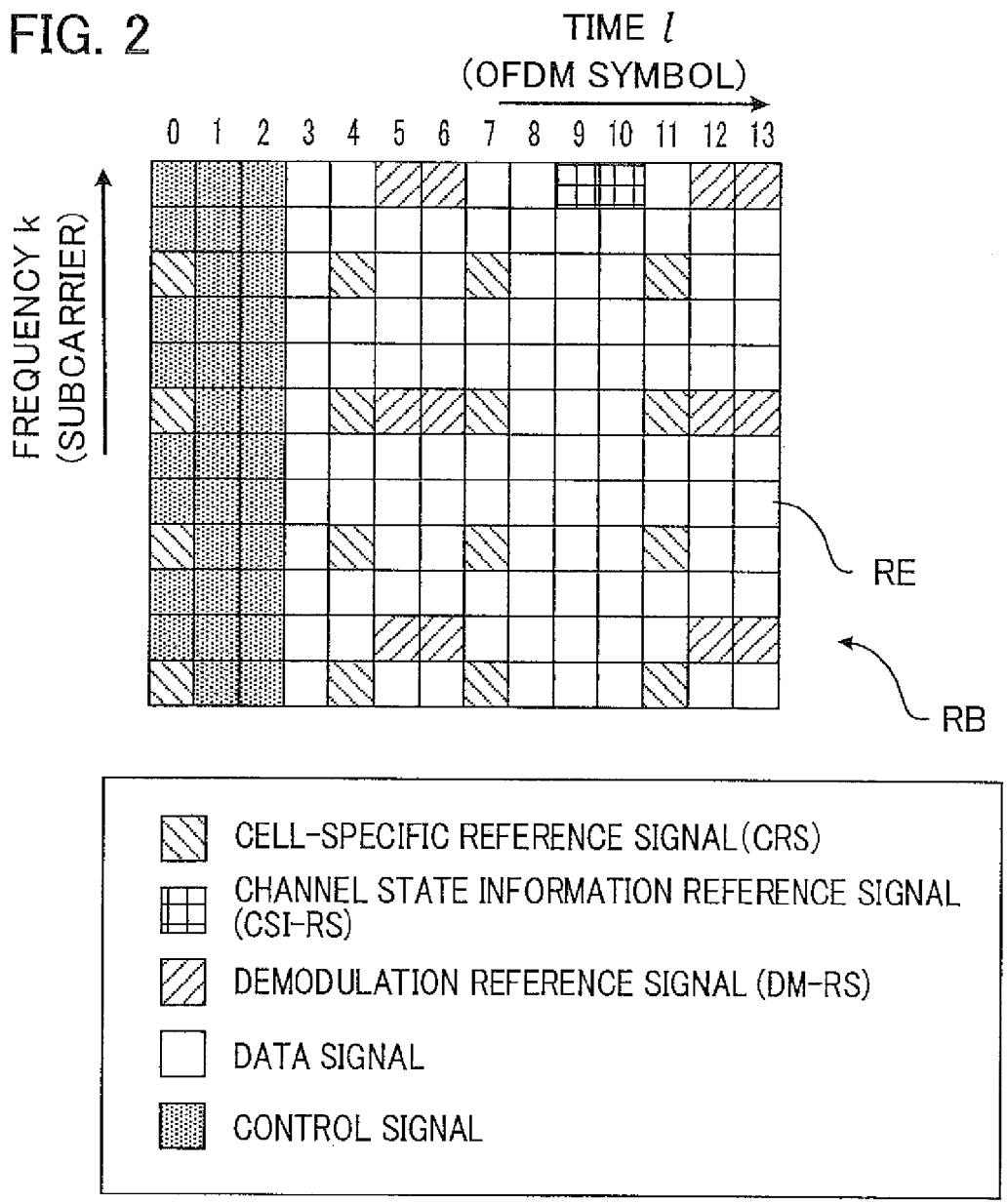
FIG. 2 is a diagram showing an example mapping of various signals in a resource block of a downlink transmission.

As will be understood from the example mapping of FIG. 2, since CRSs are transmitted at higher density (with shorter intervals) than CSI-RSs are transmitted, the use of a CRS vector and a CRS sequence for estimating an all received power including an interference power and a desired reference signal power enables an accurate and timely estimation of an interference and noise power.

Second Embodiment

Figure 5:
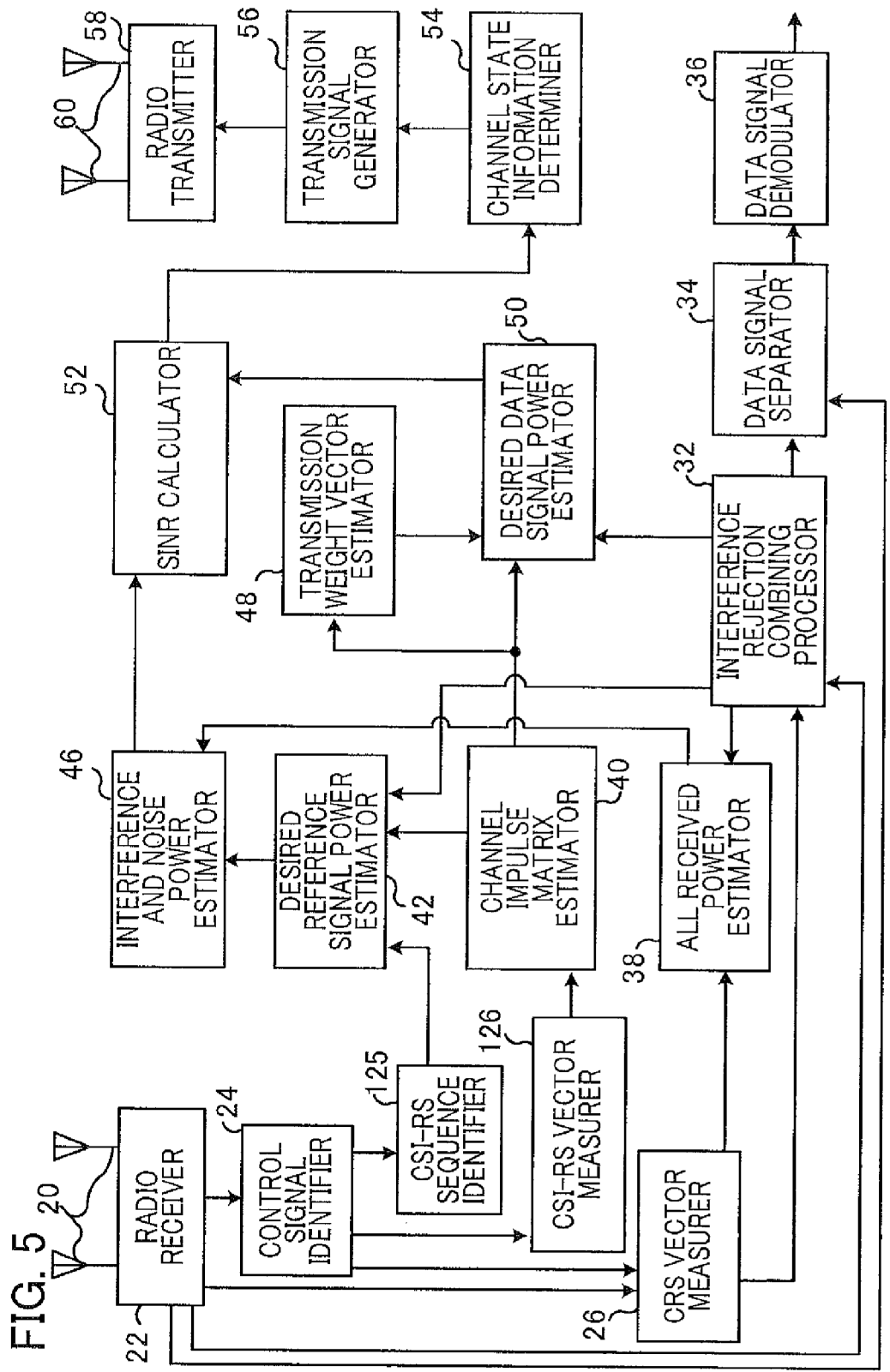
FIG. 5 is a block diagram showing a configuration of a mobile communication terminal according to a second embodiment of the present invention.

FIG. 5 is a block diagram showing a configuration of a mobile communication terminal according to a second embodiment of the present invention. FIG. 5 simply shows signal reception related portions and signal transmission related portions alone, and other portions are not depicted therein. FIG. 5 uses the same reference symbols to indicate components that are the same in FIG. 4, and the following description omits detailed descriptions of these components in some cases.

As shown in FIG. 5, the mobile communication terminal has a CSI-RS (channel state information reference signal) sequence identifier 125 and a CSI-RS (channel state information reference signal) vector measurer 126. The CSI-RS sequence identifier 125 and the CSI-RS vector measurer 126 are functional blocks realized by a CPU, not shown, of the mobile communication terminal running and executing a computer program and functioning in accordance with the computer program.

The CSI-RS sequence identifier 125 (reference signal sequence identifier) identifies, based on the cell ID indicated by the control signals identified by the control signal identifier 24, a channel state information reference signal sequence (CSI-RS sequence) $d_{1,CSI-RS}$ which is a sequence of a channel state information reference signal (CSI-RS) transmitted from a desired base station. Specifically, from among a set of CSI-RS sequences known to the mobile communication terminal, the CSI-RS sequence identifier 125 selects a CSI-RS sequence that corresponds to the cell ID.

The CSI-RS vector measurer 126 (reference signal vector measurer) measures a channel state information reference signal vector (CSI-RS vector) $y_{CSI-RS}$ which is a vector representing a CSI-RS transmitted from the desired base station. The CSI-RS vector is an $N_{RX}$-dimensional vector, and $N_{RX}$ corresponds to the number of the reception antennas 20 of the mobile communication terminal.

The functions of the interference rejection combining processor 32, the data signal separator 34, the data signal demodulator 36 and the all received power estimator 38 are the same as those of the first embodiment. The interference rejection combining processor 32 calculates, based on the reference signal (CRS vector) $y_{CRS}$ measured by the CRS vector measurer 26, an interference rejection combining reception weight matrix $W_{IRC}$ ($N_{stream} \times N_{RX}$-dimensional matrix) by use of a publically-known method so as to reduce effects on desired beams of radio waves transmitted from the desired base station by another beam.

The all received power estimator 38, from the interference rejection combining reception weight matrix calculated by the interference rejection combining processor 32 and the CRS vector measured by the CRS vector measurer 26, estimates an all received power $\hat{P}_{S+I+N,n}$ for each transmission stream, that is expected when the interference rejection combining is implemented. This estimation method follows Equation (2) and Equation (3) substantially in the same way as in the first embodiment.

The channel impulse matrix estimator 40 estimates, from signals derived from radio waves received by the reception antennas 20, an $N_{RX} \times N_{TX}$-dimensional channel impulse matrix $H_{CSI-RS}$ of the CSI-RS received from the desired base station. Specifically, the channel impulse matrix estimator

40 calculates the channel impulse matrix by using a publically known method, from the CSI-RS vector $y_{CSI-RS}$ measured by the CSI-RS vector measurer 126.

The desired reference signal power estimator 42 calculates, i.e., estimates, a desired reference signal power $\hat{P}_{S,n}$, for each transmission stream, expected when the interference rejection combining is implemented in accordance with the following Equation (8):

$$\hat{P}_{S,n} = |w_{IRC,n} H_{CSI-RS} d_{1,CSI-RS}|^2 \qquad (8)$$

The subscript n denotes the transmission stream number.

In the Equation (8), $W_{IRC,n}$ is a row vector extracted for each transmission stream, from the interference rejection combining reception weight matrix $W_{IRC}$ ($N_{stream} \times N_{RX}$-dimensional matrix) calculated by the interference rejection combining processor 32. Thus, this row vector is an interference rejection combining weight vector that is a part of the interference rejection combining reception weight matrix. The subscript n denotes a transmission stream number.

Thus, the desired reference signal power estimator 42 estimates a desired reference signal power expected when the interference rejection combining is implemented from an interference rejection combining weight vector, which is a part of an interference rejection combining reception weight matrix calculated by the interference rejection combining processor 32, a channel impulse matrix calculated by the channel impulse matrix estimator 40, and a CSI-RS sequence identified by the CSI-RS sequence identifier 125.

The interference and noise power estimator 46 subtracts the desired reference signal power from the all received power, thereby estimating an interference and noise power relative to the reference signal, the interference and noise power being expected when the interference rejection combining is implemented. That is, the interference and noise power estimator 46 calculates an interference and noise power $\hat{P}_{I+N,n}$ for each transmission stream in accordance with the following Equation (9):

$$\hat{P}_{I+N,n} = \hat{P}_{S+I+N,n} - \hat{P}_{S,n} \qquad (9)$$

The subscript n denotes the transmission stream number.

The transmission weight vector estimator 48 estimates, from the channel impulse matrix estimated by the channel impulse matrix estimator 40, a transmission weight vector $w_{TX}$ to be used for precoding at the desired base station. More specifically, the transmission weight vector estimator 48 estimates, based on the channel impulse matrix $H_{CSI-RS}$ estimated by the channel impulse matrix estimator 40, a transmission weight matrix $W_{TX}$ ($N_{TX} \times N_{stream}$-dimensional matrix) to be used for precoding at the desired base station. The same method as in the first embodiment may also be used for the transmission weight matrix estimation.

The transmission weight vector is a column vector extracted, for each transmission stream, from the transmission weight matrix (NTX×Nstream-dimensional matrix). Thus, this column vector is a transmission weight vector which is a part of the transmission weight matrix. The subscript n denotes a transmission stream number. The transmission weight vector estimator 48 extracts, from the transmission weight matrix, a transmission weight vector for each transmission stream.

The desired data signal power estimator 50 calculates, i.e., estimates, from the interference rejection combining weight vector, the channel impulse matrix, and the transmission weight vector, a desired data signal power $\hat{P}_{S,n}'$, for each transmission stream, expected when the interference rejection combining is implemented in accordance with the following Equation (10):

$$\hat{P}_{S,n}' = |w_{IRC,n} H_{CSI-RS} w_{TX}|^2 \qquad (10)$$

The subscript n denotes a transmission stream number.

The SINR calculator 52 calculates, from the desired data signal power estimated by the desired data signal power estimator 50 and the interference and noise power estimated by the interference and noise power estimator 46, a signal-to-interference-plus-noise ratio expected when the interference rejection combining is implemented. That is, the SINR calculator 52 calculates, i.e., estimates, a signal-to-interference-plus-noise ratio $SINR_n$ for each transmission stream, expected when the interference rejection combining is implemented in accordance with the following Equation (11):

$$SINR_n = \hat{P}_{S,n}' / \hat{P}_{I+N,n} \qquad (11)$$

The subscript n denotes a transmission stream number.

The channel state information determiner 54 determines channel state information (CSI), i.e., a CQI, PMI, and RI, from the signal-to-interference-plus-noise ratio $SINR_n$ calculated by the SINR calculator 52 by using a publically known method, and gives a signal representing the CSI including the CQI, PMI, and RI, to the transmission signal generator 56. The transmission signal generator 56 transmits, i.e., feeds the signal representing the CSI, back to the desired base station through the radio transmitter 58 and the transmission antenna 60. Thus, the transmission signal generator 56 serves as a channel state information transmitter.

The present embodiment estimates an all received power expected when the interference rejection combining is implemented, from an interference rejection combining reception weight matrix and a CRS vector, and estimates a desired reference signal power expected when the interference rejection combining is implemented, from an interference rejection combining weight vector, a channel impulse matrix, and a CSI-RS sequence. An interference and noise power expected when the interference rejection combining is implemented is a difference between the all received power and the desired reference signal power. The interference rejection combining reception weight matrix and the channel impulse matrix could contain errors since they are obtained through estimation. In contrast, the CSI-RS sequence is error free because it is a sequence corresponding to a desired base station to which the mobile communication terminal connects. Accordingly, an interference and noise power with small error is calculated. Although the interference and noise power fluctuates frequently and greatly, since such an interference and noise power with small error is calculated, the present invention can calculate a signal-to-interference-plus-noise ratio (SINR) expected when the interference rejection combining is implemented with a high degree of accuracy.

Since the calculated SINR is highly accurate, a base station is able to perform suitable adaptive modulation and user scheduling depending on channel quality information determined based on an SINR with a high degree of accuracy, and it is also possible to perform a suitable precoding depending on channel state information determined based on an SINR with a high degree of accuracy. Moreover, since the calculated SINR has a high degree of accuracy, a suitable handover could be performed if the SINR is used as an index for handover.

In the present embodiment, the CRS vector measurer 26 measures, as a reference signal vector, a cell-specific reference signal vector (CRS vector), which is a vector representing a cell-specific reference signal, and the all received power estimator 38 estimates an all received power based on the CRS vector measured by the CRS vector measurer 26. Also, the channel impulse matrix estimator 40 estimates a channel impulse matrix based on a CSI-RS vector measured by the CSI-RS vector measurer 126, and the desired reference signal power estimator 42 estimates a desired reference signal power from an interference rejection combining weight vector, a channel impulse matrix, and a CSI-RS sequence identified by the CSI-RS sequence identifier 125. An interference and noise power is a difference between the all received power and the desired reference signal power.

As will be understood from the example mapping of FIG. 2, since CRSs are transmitted at higher density (with shorter intervals) than CSI-RSs are transmitted, the use of a CRS vector and a CRS sequence for estimating an all received power including an interference power enables an accurate and timely estimation of the all received power. In contrast, CSI-RSs are transmitted at lower density (with longer intervals) than CRSs are, and a desired reference signal power probably does not fluctuate frequently or greatly. Therefore, even if CSI-RS vectors and CSI-RS sequences are used for the estimation of desired reference signal powers, an accurate and timely estimation of desired reference signal powers is still possible. The accurate and timely estimation of all received powers and the accurate and timely estimation of desired reference signal powers enable accurate and timely estimation of interference and noise powers.

Third Embodiment

Figure 6:
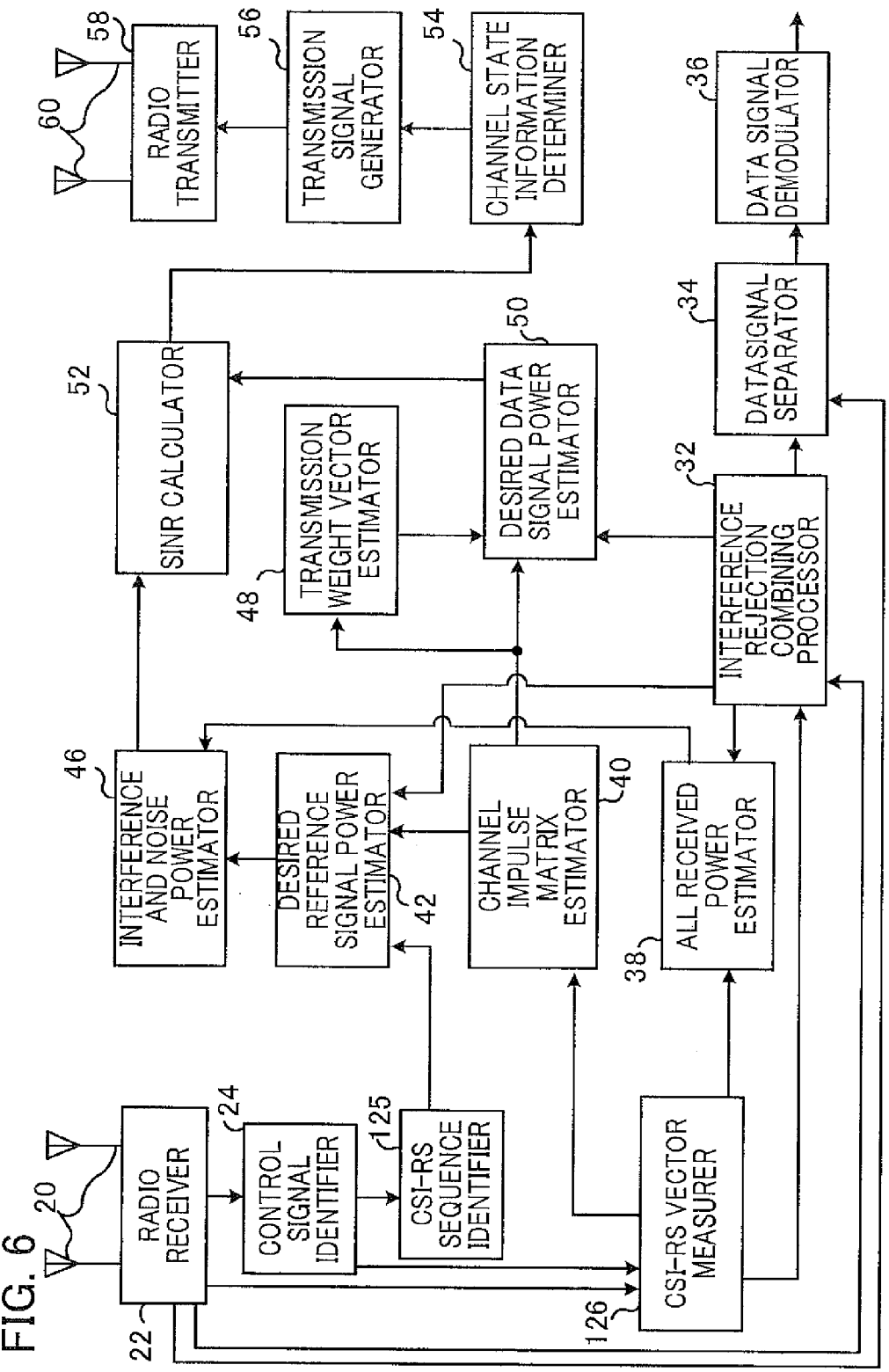
FIG. 6 is a block diagram showing a configuration of a mobile communication terminal according to a third embodiment of the present invention.

FIG. 6 is a block diagram showing a configuration of a mobile communication terminal according to a third embodiment of the present invention. FIG. 6 simply shows signal reception related portions and signal transmission related portions alone, and other portions are not depicted therein. FIG. 6 uses the same reference symbols to indicate components that are the same in FIGS. 4 and 5, and the following description omits detailed descriptions of these components in some cases.

The present embodiment uses only the CSI-RS, which is one of the reference signals, instead of the CRS, which is also a reference signal, for estimating an all received power, a desired reference signal power, and a desired data signal power. In substantially the same way as in the second embodiment, the CSI-RS sequence identifier 125 (reference signal sequence identifier) identifies, based on the cell ID indicated by the control signals identified by the control signal identifier 24, a channel state information reference signal sequence (CSI-RS sequence) $d_{1,CSI-RS}$ which is a sequence of a channel state information reference signal (CSI-RS) transmitted from a desired base station.

As in the second embodiment, the CSI-RS vector measurer 126 (reference signal vector measurer) measures a channel state information reference signal vector (CSI-RS vector) $y_{CSI-RS}$, which is a vector of a CSI-RS transmitted from the desired base station.

The interference rejection combining processor 32 calculates an interference rejection combining reception weight matrix $W_{IRC}$ ($N_{stream} \times N_{RX}$-dimensional matrix) based on the reference signal (CSI-RS vector) $y_{CSI-RS}$ measured by the CSI-RS vector measurer 126 by use of a publically known method so as to reduce effects on desired beams of radio waves transmitted from the desired base station by another beam.

The functions of the data signal separator 34, the data signal demodulator 36, and the all received power estimator 38 are the same as those of the first and second embodiments.

The all received power estimator 38 estimates an all received power $\hat{P}_{S+I+N,n}$, for each transmission stream, expected when the interference rejection combining is implemented, from the interference rejection combining reception weight matrix calculated by the interference rejection combining processor 32 and the CSI-RS vector measured by the CSI-RS vector measurer 126.

Specifically, the all received power estimator 38 calculates, an $N_{stream}$-dimensional estimate signal vector $\hat{s}$ in accordance with the following Equation (12):

$$\hat{s} = W_{IRC} y_{CSI-RS} \quad (12)$$

The all received power estimator 38 next extracts, for each transmission stream, an estimate signal $s_n$ from the estimate signal vector. The subscript n denotes a transmission stream number. The all received power estimator 38 then calculates an all received power $\hat{P}_{S+I+N,n}$ for each transmission stream, expected when the interference rejection combining is implemented in accordance with the following Equation (13):

$$\hat{P}_{S+I+N,n} = |\hat{s}_n|^2 \quad (13)$$

The channel impulse matrix estimator 40 estimates, from signals derived from radio waves received by the reception antennas 20, an $N_{RX} \times N_{TX}$-dimensional channel impulse matrix $H_{CSI-RS}$ of a CSI-RS received from the desired base station. Specifically, the channel impulse matrix estimator 40 calculates, from the CSI-RS vector $y_{CSI-RS}$ measured by the CSI-RS vector measurer 126, a channel impulse matrix thereof by a publically known method.

The desired reference signal power estimator 42 calculates, i.e., estimates, a desired reference signal power $\hat{P}_{S,n}$, for each transmission stream expected when the interference rejection combining is implemented in accordance with the following Equation (14):

$$\hat{P}_{S,n} = |w_{IRC,n} H_{CSI-RS} d_{1,CSI-RS}|^2 \quad (14)$$

The subscript n denotes a transmission stream number.

In Equation (14), $w_{IRC,n}$ is a row vector extracted for each transmission stream from the interference rejection combining reception weight matrix $W_{IRC}$ ($N_{stream} \times N_{RX}$-dimensional matrix) calculated by the interference rejection combining processor 32. Thus, this row vector is an interference rejection combining weight vector which is a part of the interference rejection combining reception weight matrix. The subscript n denotes a transmission stream number.

Thus, the desired reference signal power estimator 42, from an interference rejection combining weight vector, which is a part of an interference rejection combining reception weight matrix calculated by the interference rejection combining processor 32, a channel impulse matrix calculated by the channel impulse matrix estimator 40, and a CSI-RS sequence identified by the CSI-RS sequence identifier 125, estimates a desired reference signal power that is expected when the interference rejection combining is implemented.

The interference and noise power estimator 46 subtracts the desired reference signal power from the all received power, thereby estimating an interference and noise power relative to the reference signal, the interference and noise power being expected when the interference rejection combining is implemented. The interference and noise power estimator 46 calculates an interference and noise power $\hat{P}_{I+N,n}$ for each transmission stream in accordance with the following Equation (15):

$$\hat{P}_{I+N,n} = \hat{P}_{S+I+N,n} - \hat{P}_{S,n} \tag{15}$$

The subscript n denotes a transmission stream number.

The transmission weight vector estimator 48 estimates, from the channel impulse matrix estimated by the channel impulse matrix estimator 40, a transmission weight vector $W_{TX}$, to be used for precoding at the desired base station. More specifically, the transmission weight vector estimator 48, based on the channel impulse matrix $H_{CSI-RS}$ estimated by the channel impulse matrix estimator 40, estimates a transmission weight matrix $W_{TX}$ ($N_{TX} \times N_{stream}$-dimensional matrix) to be used for the precoding at the desired base station. The same method as in the first embodiment is used for the transmission weight matrix estimation.

The transmission weight vector is a column vector extracted, for each transmission stream, from the transmission weight matrix (NTX×Nstream-dimensional matrix). Thus, this column vector is a transmission weight vector which is a part of the transmission weight matrix. The subscript n denotes a transmission stream number. The transmission weight vector estimator 48 extracts, for each transmission stream, a transmission weight vector from the transmission weight matrix.

The desired data signal power estimator 50, from the interference rejection combining weight vector, the channel impulse matrix, and the transmission weight vector, calculates, i.e., estimates, a desired data signal power $\hat{P}_{S,n}'$ expected when the interference rejection combining is implemented for each transmission stream in accordance with the following Equation (16):

$$\hat{P}_{S,n} = |w_{IRC,n} H_{CSI-RS} w_{TX}|^2 \tag{6}$$

The subscript n denotes a transmission stream number.

The SINR calculator 52 calculates, from the desired data signal power estimated by the desired data signal power estimator 50 and the interference and noise power estimated by the interference and noise power estimator 46, a signal-to-interference-plus-noise ratio expected when the interference rejection combining is implemented. The SINR calculator 52 calculates, i.e., estimates, a signal-to-interference-plus-noise ratio $SINR_n$ expected when the interference rejection combining is implemented, for each transmission stream in accordance with the following Equation (17):

$$SINR_n = \hat{P}_{S,n}'/\hat{P}_{I+N,n} \tag{17}$$

The subscript n denotes a transmission stream number.

The channel state information determiner 54 determines channel state information (CSI), i.e., a CQI, PMI, and RI, from the signal-to-interference-plus-noise ratio $SINR_n$ calculated by the SINR calculator 52 by using a publically known method, and gives a signal representing the CSI including the CQI, PMI, and RI, to the transmission signal generator 56. The transmission signal generator 56 transmits, i.e., feeds the signal representing the CSI, back to the desired base station through the radio transmitter 58 and the transmission antenna 60. Thus, the transmission signal generator 56 serves as a channel state information transmitter.

The present embodiment estimates an all received power expected when the interference rejection combining is implemented, from an interference rejection combining reception weight matrix and a CSI-RS vector, and estimates a desired reference signal power expected when the interference rejection combining is implemented, from an interference rejection combining weight vector, a channel impulse matrix, and a CSI-RS sequence. An interference and noise power expected when the interference rejection combining is implemented is a difference between the all received power and the desired reference signal power. The interference rejection combining reception weight matrix and the channel impulse matrix could contain errors since they are obtained through estimation. In contrast, the CSI-RS sequence is error free for it is a sequence corresponding to a desired base station to which the mobile communication terminal connects. Accordingly, an interference and noise power with small error is calculated. Although the interference and noise power fluctuates frequently and greatly, since such an interference and noise power with small error is calculated, the present invention can calculate a signal-to-interference-plus-noise ratio (SINR) expected when the interference rejection combining is implemented with a high degree of accuracy.

Since the calculated SINR is highly accurate, a base station is able to perform suitable adaptive modulation and user scheduling depending on channel quality information determined based on an SINR of high degree of accuracy, and is also possible to perform a suitable precoding depending on channel state information determined based on an SINR with a high degree of accuracy. Moreover, since the calculated SINR has a high degree of accuracy, a suitable handover could be performed if the SINR is used as an index for handover.

In the present embodiment, the CSI-RS vector measurer 126 measures, as a reference signal vector, a channel state information reference signal vector (CSI-RS vector), which is a vector representing a channel state information reference signal, and the all received power estimator 38 estimates an all received power based on the CSI-RS vector measured by the CSI-RS vector measurer 126. Also, the channel impulse matrix estimator 40 estimates a channel impulse matrix based on the CSI-RS vector measured by the CSI-RS vector measurer 126, and the desired reference signal power estimator 42 estimates a desired reference signal power from an interference rejection combining weight vector, a channel impulse matrix, and a CSI-RS sequence identified by the CSI-RS sequence identifier 125. An interference and noise power is a difference between the all received power and the desired reference signal power.

As will be understood from the example mapping of FIG. 2, CSI-RSs are transmitted at lower density (with longer intervals) than CRSs are transmitted. Therefore, using a CSI-RS for estimating an all received power containing an interference power is less accurate than using a CRS. However, since the CSI-RS supports a maximum of 8 transmission antennas of a base station (cell), using a CSI-RS for the power estimation could probably be sometimes preferable, when the number of base station transmission antennas is large, in comparison to using a CRS for the power estimation. Also, the future 3GPP standardization may involve changes in the transmission interval of CSI-RSs and in other items relative to the CSI-RS, in which case, using a CSI-RS could still improve accuracy in estimating an all received power containing an interference power.

Fourth Embodiment

Figure 7:
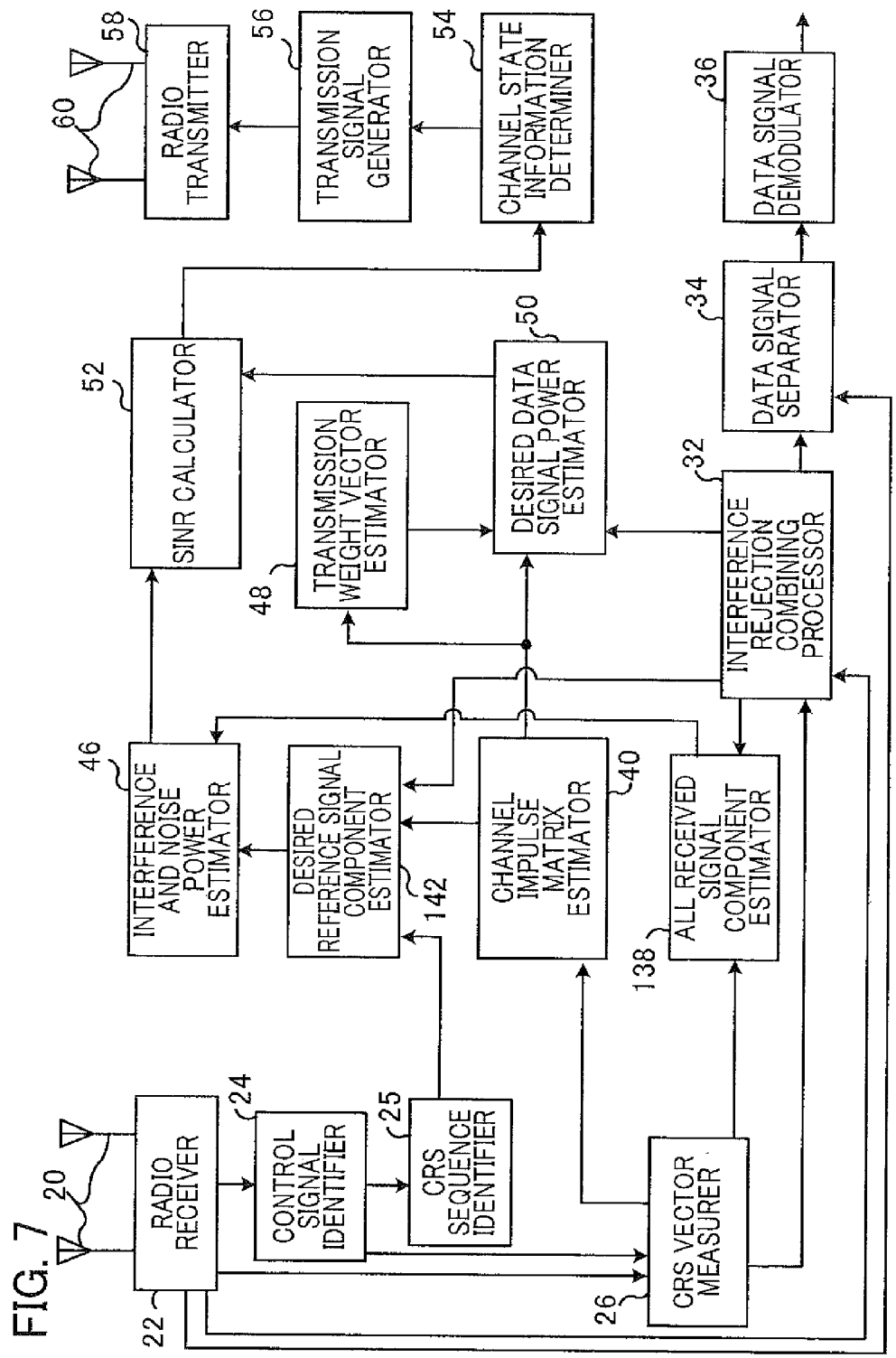
FIG. 7 is a block diagram showing a configuration of a mobile communication terminal according to a fourth embodiment of the present invention.

FIG. 7 is a block diagram showing a configuration of a mobile communication terminal according to a fourth embodiment of the present invention. FIG. 7 simply shows signal reception related portions and signal transmission related portions alone, and other portions are not depicted therein. FIG. 7 uses the same reference symbols to indicate components that are the same as in FIG. 4, and the following description omits detailed descriptions of these components in some cases.

The present embodiment is a modification of the first embodiment shown in FIG. 4. The mobile communication terminal has an all received signal component estimator 138 and a desired reference signal component estimator 142 in place of the all received power estimator 38 and the desired reference signal power estimator 42. The all received signal component estimator 138 and the desired reference signal component estimator 142 are functional blocks realized by a CPU, not shown, of the mobile communication terminal running and executing a computer program and functioning in accordance with the computer program. In the following, those features of the fourth embodiment differing from the first embodiment will be described in detail.

The all received signal component estimator 138 calculates in accordance with the above Equation (2), an $N_{stream}$-dimensional estimate signal vector $\hat{s}$.

The all received signal component estimator 138 extracts, for each transmission stream, an estimate signal s, from the estimate signal vector. The subscript n denotes a transmission stream number. The estimate signal $s_n$ corresponds to all received signal components, for each transmission stream, expected when the interference rejection combining is implemented. The all received signal components are combined signal components of a desired signal, an interfering signal, and a noise signal expected from a CRS vector. Thus, the all received signal component estimator 138 estimates the all received signal components expected when the interference rejection combining is implemented, from the interference rejection combining reception weight matrix calculated by the interference rejection combining processor 32 and the CRS vector measured by the CRS vector measurer 26.

The desired reference signal component estimator 142 calculates, i.e., estimates, desired reference signal components $w_{IRC,n} H_{CRS} d_{1,CRS}$, for each transmission stream, expected when the interference rejection combining is implemented. The subscript n denotes a transmission stream number. Thus, the desired reference signal component estimator 142 estimates desired reference signal components that are expected when the interference rejection combining is implemented, from an interference rejection combining weight vector, which is a part of an interference rejection combining reception weight matrix calculated by the interference rejection combining processor 32, a channel impulse matrix calculated by the channel impulse matrix estimator 40, and a CRS sequence identified by the CRS sequence identifier 25.

The interference and noise power estimator 46 subtracts the desired reference signal components from the all received signal components and squares a result of subtraction, thereby estimating an interference and noise power relative to a CRS, the interference and noise power being expected when the interference rejection combining is implemented. That is, the interference and noise power estimator 46 calculates an interference and noise power $\hat{P}_{I+N,n}$ for each transmission stream in accordance with the following Equation (5)':

$$\hat{P}_{I+N,n} = |s_n - w_{IRC,n} H_{CRS} d_{1,CRS}|^2 \quad (5)'$$

The subscript n denotes a transmission stream number.

The other operations are the same as those of the first embodiment explained with reference to FIG. 4. The present embodiment estimates all received signal components expected when the interference rejection combining is implemented, from an interference rejection combining reception weight matrix and a CRS vector, and estimates desired reference signal components expected when the interference rejection combining is implemented, from an interference rejection combining weight vector, a channel impulse matrix, and a CRS sequence. An interference and noise power expected when the interference rejection combining is implemented is a squared difference between the all received signal components and the desired reference signal components. The interference rejection combining reception weight matrix and the channel impulse matrix could contain errors since they are obtained by estimation. In contrast, the CRS sequence is error free because it is a sequence corresponding to a desired base station to which a mobile communication terminal connects. Therefore, an interference and noise power can be calculated with small error. The interference and noise power fluctuates frequently and greatly, but through calculation of the interference and noise power with small error, a signal-to-interference-plus-noise ratio (SINR) expected when the interference rejection combining is implemented can be calculated with a high degree of accuracy. Since the calculated SINR is highly accurate, a base station is able to perform suitable adaptive modulation and user scheduling depending on channel quality information determined based on an SINR of high degree of accuracy, and is also possible to perform a suitable precoding depending on channel state information determined based on an SINR with a high degree of accuracy. Moreover, since the calculated SINR has a high degree of accuracy, a suitable handover could be performed if the SINR is used as an index for handover.

In the present embodiment, the CRS vector measurer 26 measures, as a reference signal vector, a cell-specific reference signal vector (CRS vector), which is a vector representing a cell-specific reference signal, and the all received signal component estimator 138 estimates all received signal components based on a CRS vector measured by the CRS vector measurer 26. The channel impulse matrix estimator 40 estimates a channel impulse matrix based on the CRS vector measured by the CRS vector measurer 26, and the desired reference signal component estimator 142 estimates desired reference signal components from an interference rejection combining weight vector, a channel impulse matrix, and a CRS sequence identified by the CRS sequence identifier 25. An interference and noise power is a squared difference between the all received signal components and the desired reference signal components.

As shown in the mapping example of FIG. 2, since CRSs are transmitted at higher density (shorter intervals) than CSI-RSs are, using a CRS vector and a CRS sequence for estimation of desired reference signal components and all received signal components containing interfering signals, an accurate and timely estimation of an interference and noise power is possible.

Fifth Embodiment

Figure 8:
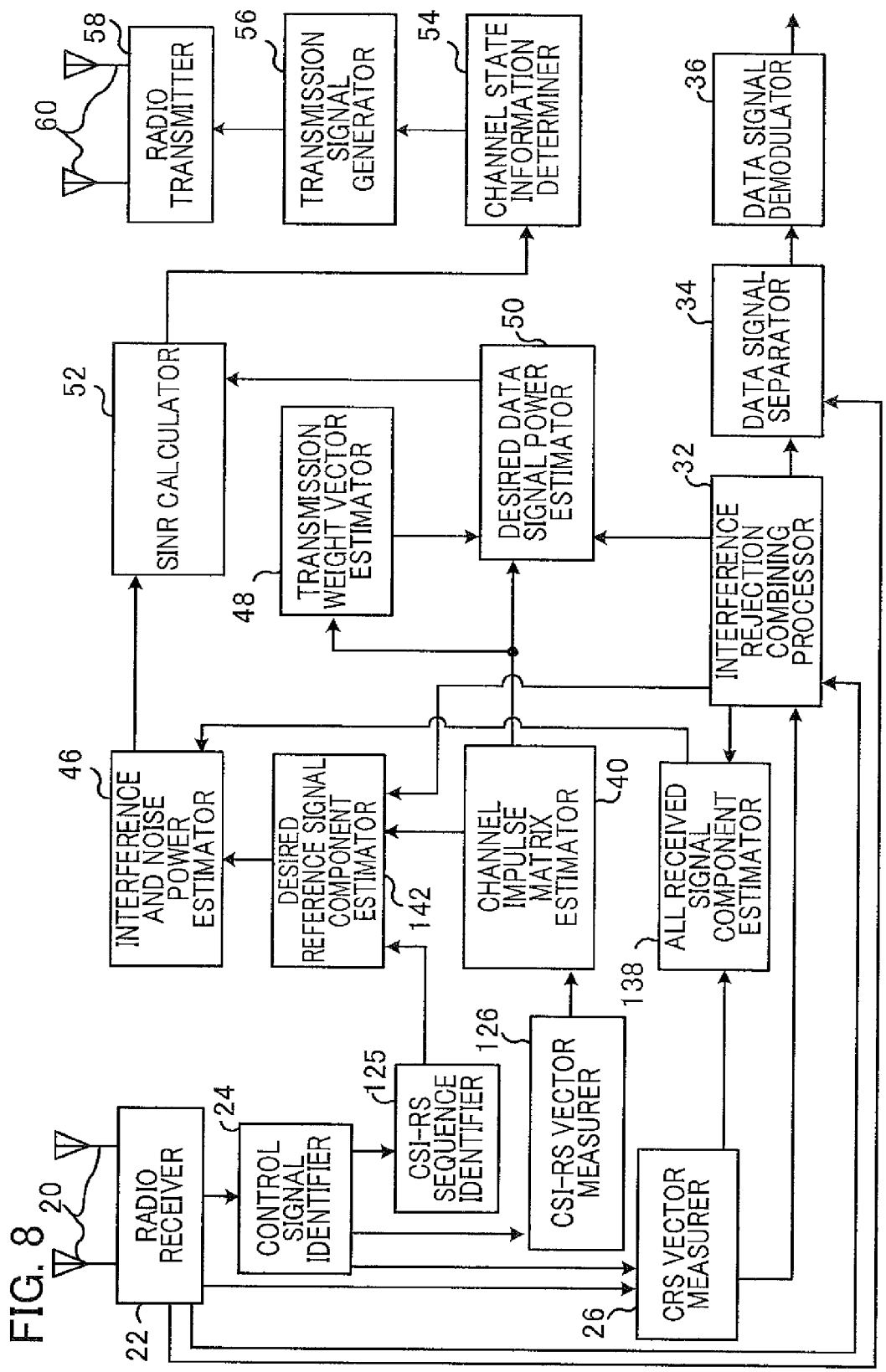
FIG. 8 is a block diagram showing a configuration of a mobile communication terminal according to a fifth embodiment of the present invention.

FIG. 8 is a block diagram showing a configuration of a mobile communication terminal according to a fifth embodiment of the present invention. FIG. 8 simply shows signal reception related portions and signal transmission related portions alone, and other portions are not depicted therein. FIG. 8 uses the same reference symbols to indicate components that are the same as in FIG. 5, and the following description omits detailed descriptions of these components in some cases.

The present embodiment is a modification of the second embodiment shown in FIG. 5. The mobile communication terminal has an all received signal component estimator 138 and a desired reference signal component estimator 142 in place of the all received power estimator 38 and the desired reference signal power estimator 42. In the following, those features of the fifth embodiment differing from the second embodiment will be described in detail.

The all received signal component estimator 138 calculates in accordance with the above Equation (2), an $N_{stream}$-dimensional estimate signal vector ŝ.

The all received signal component estimator 138 extracts, for each transmission stream, an estimate signal $s_n$ from the estimate signal vector. The subscript n denotes a transmission stream number. The estimate signal $s_n$ corresponds to all received signal components, for each transmission stream, expected when the interference rejection combining is implemented. Thus, the all received signal component estimator 138 estimates the all received signal components expected when the interference rejection combining is implemented, from the interference rejection combining reception weight matrix calculated by the interference rejection combining processor 32 and a CRS vector measured by the CRS vector measurer 26.

The desired reference signal component estimator 142 calculates, i.e., estimates, desired reference signal components $w_{IRC,n} H_{CSI-RS} d_{1,CSI-RS}$, for each transmission stream, expected when the interference rejection combining is implemented. The subscript n denotes a transmission stream number. Thus, the desired reference signal component estimator 142 estimates the desired reference signal components that are expected when the interference rejection combining is implemented, from the interference rejection combining weight vector, which is a part of the interference rejection combining reception weight matrix calculated by the interference rejection combining processor 32, the channel impulse matrix calculated by the channel impulse matrix estimator 40, and the CSI-RS sequence identified by the CSI-RS sequence identifier 125.

The interference and noise power estimator 46 subtracts the desired reference signal components from the all received signal components and squares a result of subtraction, thereby estimating an interference and noise power relative to the reference signal, the interference and noise power being expected when the interference rejection combining is implemented. That is, the interference and noise power estimator 46 calculates an interference and noise power $\hat{P}_{I+N,n}$ for each transmission stream in accordance with the following Equation (9)':

$$\hat{P}_{I+N,n} = |s_n - w_{IRC,n} H_{CSI-RS} d_{1,CSI-RS}|^2 \quad (9)'$$

The subscript n denotes a transmission stream number.

The other operations are the same as those of the second embodiment explained with reference to FIG. 5. The present embodiment estimates all received signal components expected when the interference rejection combining is implemented, from an interference rejection combining reception weight matrix and a CRS vector, and estimates desired reference signal components expected when the interference rejection combining is implemented, from an interference rejection combining weight vector, a channel impulse matrix, and a CSI-RS sequence. The interference and noise power expected when the interference rejection combining is implemented is a squared difference between the all received signal components and the desired reference signal components. The interference rejection combining reception weight matrix and the channel impulse matrix could contain errors since they are obtained by estimation. In contrast, the CSI-RS sequence is error free because it is a sequence corresponding to a desired base station to which a mobile communication terminal connects. Therefore, an interference and noise power can be calculated with small error. The interference and noise power fluctuates frequently and greatly, but through calculation of the interference and noise power with small error, a signal-to-interference-plus-noise ratio (SINR) expected when the interference rejection combining is implemented can be calculated with a high degree of accuracy. Since the calculated SINR is highly accurate, a base station is able to perform suitable adaptive modulation and user scheduling depending on channel quality information determined based on an SINR with a high degree of accuracy, and is also possible to perform a suitable precoding depending on channel state information determined based on an SINR with a high degree of accuracy. Moreover, since the calculated SINR has a high degree of accuracy, a suitable handover could be performed if the SINR is used as an index for handover.

In the present embodiment the CRS vector measurer 26 measures, as a reference signal vector, a cell-specific reference signal vector (CRS vector), which is a vector representing a cell-specific reference signal, and the all received signal component estimator 138 estimates all received signal components based on the CRS vector measured by the CRS vector measurer 26. The channel impulse matrix estimator 40 estimates a channel impulse matrix based on the CSI-RS vector measured by the CSI-RS vector measurer 126, and the desired reference signal component estimator 142 estimates desired reference signal components from an interference rejection combining weight vector, a channel impulse matrix, and a CSI-RS sequence identified by the CSI-RS sequence identifier 125. The interference and noise power is a squared difference between the all received signal components and the desired reference signal components.

As shown in the mapping example of FIG. 2, since CRSs are transmitted at higher density (with shorter intervals) than CSI-RSs are, using a CRS vector and a CRS sequence for estimation of desired reference signal components and all received signal components containing interfering signals, an accurate and timely estimation of the interference and noise power is enabled. In contrast, CSI-RSs are transmitted at lower density (with longer intervals) than CRSs are, but the desired reference signal components of the CSI-RSs probably do not fluctuate frequently or greatly. Therefore, using CSI-RS vectors and CSI-RS sequences for the estimation of desired reference signal components still enables an accurate and timely estimation of desired reference signal components. The accurate and timely estimation of all received signal components and the accurate and timely estimation of desired reference signal components enables an accurate and timely estimation of interference and noise powers.

Sixth Embodiment

Figure 9:
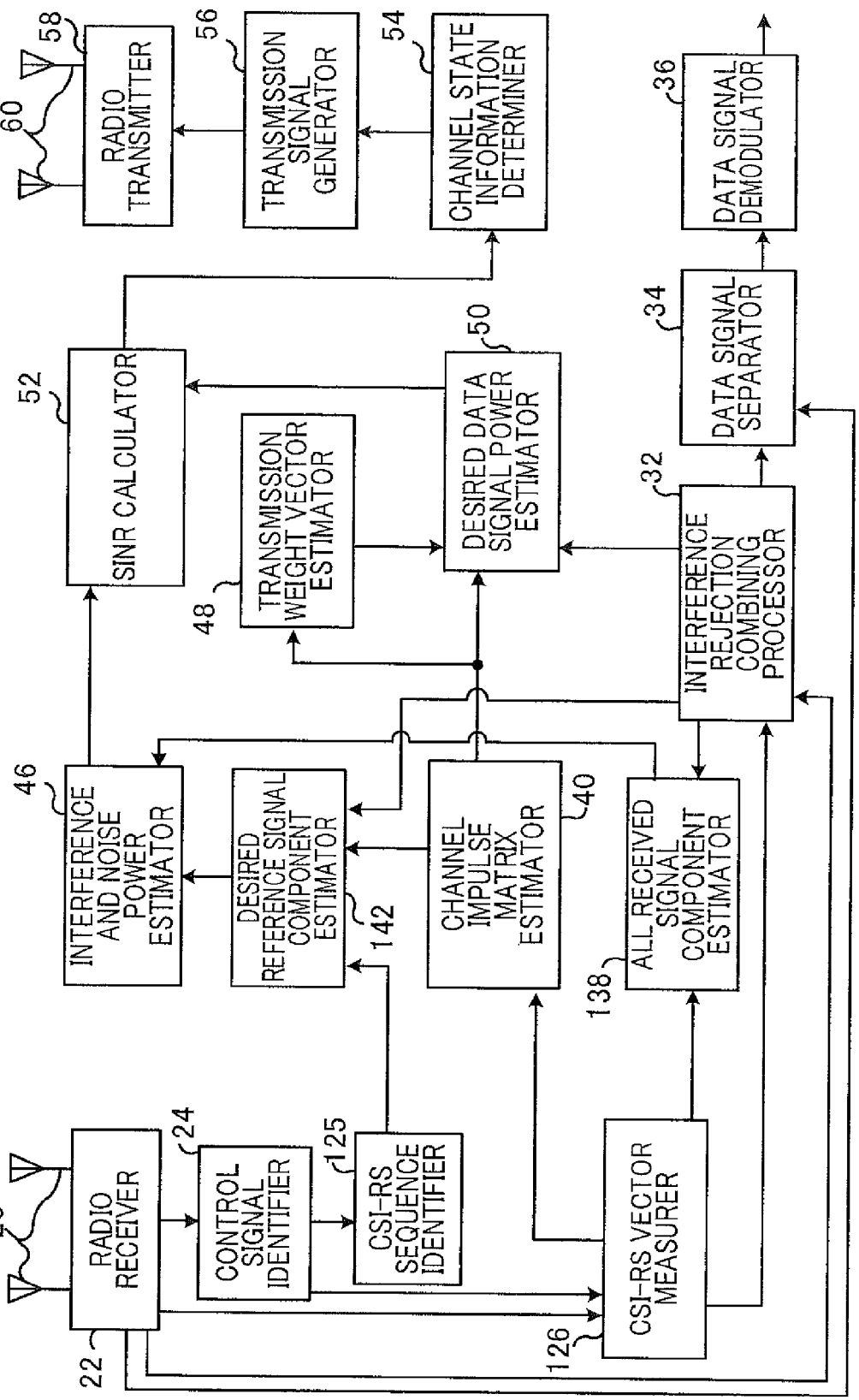
FIG. 9 is a block diagram showing a configuration of a mobile communication terminal according to a sixth embodiment of the present invention.

FIG. 9 is a block diagram showing a configuration of a mobile communication terminal according to a sixth embodiment of the present invention. FIG. 9 simply shows signal reception related portions and signal transmission related portions alone, and other portions are not depicted therein. FIG. 9 uses the same reference symbols to indicate components that are the same in FIG. 6, and the following description omits detailed descriptions of these components in some cases.

The present embodiment is a modification of the third embodiment shown in FIG. 6. The mobile communication terminal has an all received signal component estimator 138 and a desired reference signal component estimator 142 in place of the all received power estimator 38 and the desired reference signal power estimator 42. In the following, those features of the sixth embodiment differing from the third embodiment will be described in detail.

The all received signal component estimator 138 calculates an $N_{stream}$-dimensional estimate signal vector ŝ in accordance with the above Equation (12).

The all received signal component estimator 138 extracts, for each transmission stream, an estimate signal $s_n$ from the estimate signal vector. The subscript n denotes a transmission stream number. The estimate signal $s_n$ corresponds to all received signal components, for each transmission stream, expected when the interference rejection combining is implemented. Thus, the all received signal component estimator 138 estimates the all received signal component expected when the interference rejection combining is implemented, from the interference rejection combining reception weight matrix calculated by the interference rejection combining processor 32 and the CSI-RS vector measured by the CSI-RS vector measurer 126.

The desired reference signal component estimator 142 calculates, i.e., estimates, for each transmission stream, desired reference signal components $w_{IRC,n} H_{CSI-RS} d_{1,CSI-RS}$ that are expected when the interference rejection combining is implemented, for each transmission stream. The subscript n denotes a transmission stream number. Thus, the desired reference signal component estimator 142 estimates the desired reference signal components expected when the interference rejection combining is implemented, from the interference rejection combining weight vector, which is a part of the interference rejection combining reception weight matrix calculated by the interference rejection combining processor 32, the channel impulse matrix calculated by the channel impulse matrix estimator 40, and the CSI-RS sequence identified by the CSI-RS sequence identifier 125.

The interference and noise power estimator 46 subtracts the desired reference signal components from the all received signal components and squares a result of subtraction, thereby estimating an interference and noise power relative to the reference signal, the interference and noise power being expected when the interference rejection combining is implemented. That is, the interference and noise power estimator 46 calculates an interference and noise power $\hat{P}_{I+N,n}$ for each transmission stream in accordance with the following Equation (14)':

$$\hat{P}_{I+N,n} = |s_n - w_{IRC,n} H_{CSI-RS} d_{1,CSI-RS}|^2 \quad (14)'$$

The subscript n denotes a transmission stream number.

The other operations are the same as those of the third embodiment explained with reference to FIG. 6. The present embodiment estimates all received signal components expected when the interference rejection combining is implemented, from an interference rejection combining reception weight matrix and a CSI-RS vector, and estimates desired reference signal components expected when the interference rejection combining is implemented, from an interference rejection combining weight vector, a channel impulse matrix, and a CSI-RS sequence. An interference and noise power expected when the interference rejection combining is implemented is a squared difference between the all received signal components and the desired reference signal components. The interference rejection combining reception weight matrix and the channel impulse matrix could contain errors since they are obtained by estimation. In contrast, the CSI-RS sequence is error free for it is a sequence corresponding to a desired base station to which a mobile communication terminal connects. Therefore, an interference and noise power can be calculated with small error. The interference and noise power fluctuates frequently and greatly, but through calculation of the interference and noise power with small error, a signal-to-interference-plus-noise ratio (SINR) expected when the interference rejection combining is implemented can be calculated with a high degree of accuracy. Since the calculated SINR is highly accurate, a base station is able to perform suitable adaptive modulation and user scheduling depending on channel quality information determined based on an SINR of high degree of accuracy, and is also able to perform a suitable precoding depending on channel state information determined based on an SINR with a high degree of accuracy. Moreover, since the calculated SINR has a high degree of accuracy, a suitable handover could be performed if the SINR is used as an index for handover.

In the present embodiment, the CSI-RS vector measurer 126 measures, as a reference signal vector, a channel state information reference signal vector (CSI-RS vector), which is a vector representing a channel state information reference signal, and the all received signal component estimator 138 estimates all received signal components based on the CSI-RS vector measured by the CSI-RS vector measurer 126. The channel impulse matrix estimator 40 estimates a channel impulse matrix based on the CSI-RS vector measured by the CSI-RS vector measurer 126, and the desired reference signal component estimator 142 estimates desired reference signal components from an interference rejection combining weight vector, a channel impulse matrix, and a CSI-RS sequence identified by the CSI-RS sequence identifier 125. An interference and noise power is a squared difference between the all received signal components and the desired reference signal components.

As will be understood from the example mapping of FIG. 2, CSI-RSs are transmitted at lower density (with longer intervals) than CRSs are transmitted. Therefore, using a CSI-RS for estimating all received signal components containing an interfering signal is less accurate than using a CRS. However, since the CSI-RS supports a maximum of 8 transmission antennas of a base station (cell), using a CSI-RS for the signal components estimation could probably sometimes be preferable, when the number of base station transmission antennas is large, in comparison to using a CRS for signal components estimation. Also, the future 3GPP standardization may involve changes in the transmission interval of CSI-RSs and in other items relative to the CSI-RS, in which case, using a CSI-RS could still improve accuracy in estimating all received signal components containing an interfering signal.

Seventh Embodiment

A mobile communication terminal according to each of seventh to ninth embodiments has the same components as those in any one of the first to sixth embodiments. The mobile communication terminal according to each of the seventh to the ninth embodiments is additionally provided with a compensator 72 that compensates the signal-to-interference-plus-noise ratio calculated by the SINR calculator 52 or the interference and noise power estimated by the interference and noise power estimator 46, to enable the calculation SINR with an even higher degree of accuracy.

FIG. 10 is a block diagram showing a partial configuration of a mobile communication terminal according to the seventh embodiment of the present invention. Although not shown in FIG. 10, this mobile communication terminal has the same components as those in one of the first to the sixth embodiments shown in FIGS. 4 to 9, respectively, and is further provided with a received signal quality determiner 70 and the compensator 72.

The received signal quality determiner 70 measures received signal qualities relative to radio waves received from a plurality of base stations. The compensator 72 compensates for the signal-to-interference-plus-noise ratio $SINR_n$ calculated by the SINR calculator 52 for each transmission stream based on the received signal qualities measured by the received signal quality determiner 70. In the present embodiment, the received signal quality determiner 70 measures, as the received signal qualities, at least three reference signal reception powers (RSRP) of reference signals received from at least three base stations.

For example, in circumstances in which the mobile communication terminal 10 receives radio waves from the four base stations (cells) 1, 2, 3, and 4 as shown in FIG. 3, assumed is a case in which the base station 1 is a desired base station. The received signal quality determiner 70 measures a reference signal reception power $RSRP_1$ from the desired base station 1, a reference signal reception power $RSRP_2$ from the interfering base station 2, a reference signal reception power $RSRP_3$ from the interfering base station 3, and a reference signal reception power $RSRP_4$ from the interfering base station 4. The reference signal reception power $RSRP_1$ from the desired base station 1 is higher than the reference signal reception powers $RSRP_2$, $RSRP_3$, and $RSRP_4$ from the interfering base stations. That is, the $RSRP_1$ is the highest. We assume that the reference signal reception power $RSRP_2$ from the interfering base station 2 is the second highest, and the reference signal reception power $RSRP_3$ from the interfering base station 3 is the third highest. However, the $RSRP_2$ and the $RSRP_3$ may be equal to each other. In other words, the $RSRP_2$ is equal to or higher than $RSRP_3$.

The compensator 72 increases the signal-to-interference-plus-noise ratio $SINR_n$ calculated by the SINR calculator 52 based on a difference between the second highest reference signal reception power and the third highest reference signal reception power from among a plurality of reference signal reception powers, such that when the difference is great, the increase in the signal-to-interference-plus-noise ratio $SINR_n$ is great. In the above example, the compensator 72 compensates for the signal-to-interference-plus-noise ratio $SINR_n$ calculated by the SINR calculator 52, based on the difference between the second highest reference signal reception power $RSRP_2$ and the third highest reference signal reception power $RSRP_3$ ($RSRP_2-RSRP_3$) from among a plurality of the reference signal reception power $RSRP_1$, $RSRP_2$, $RSRP_3$, and $RSRP_4$, such that when the difference ($RSRP_2-RSRP_3$) is great, the increase is great.

The compensator 72 may decide an increase Δ in accordance with any one of the following exemplified methods. The increase Δ is a positive number.

(1) The compensator 72 may use a function to calculate the increase Δ as follows:

$$\Delta = f_1(RSRP_2 - RSRP_3)$$

where $f_1$ is a function in which, when the difference ($RSRP_2-RSRP_3$) is great, the increase Δ is great. FIG. 11 is a graph illustrating an example of the function $f_1$. However, the function $f_1$ is not limited to that shown in FIG. 11.

(2) The compensator 72 may refer to a table to decide the increase Δ based on the table. The table is stored in a storage device (not shown) of the mobile communication terminal. FIG. 12 is an example table. However, the table is not limited to what is shown in FIG. 12.

(3) The compensator 72 may compare the difference ($RSRP_2-RSRP_3$) with a threshold Th, to decide the increase Δ based on the comparison. For example, in a case in which the difference ($RSRP_2-RSRP_3$) is greater than the threshold Th, the compensator 72 may decide on a positive number (e.g., 3 dB) for the increase Δ, and otherwise decide on no increase for the increase Δ. The compensator 72 may compare the difference ($RSRP_2-RSRP_3$) with a plurality of thresholds, to decide the increase Δ.

After deciding the increase Δ as described above, the compensator 72 increases the signal-to-interference-plus-noise ratio $SINR_n$ for each transmission stream by the increase Δ. The compensator 72, in accordance with the following equation, calculates a compensated signal-to-interference-plus-noise ratio $SINR_n'$ for each transmission stream. The common increase Δ may be used for a plurality of transmission streams. Where the increase Δ is set in dB, the signal-to-interference-plus-noise ratio $SINR_n$ for each transmission stream and the compensated signal-to-interference-plus-noise ratio $SINR_n'$ for each transmission stream are also calculated in dB.

$$SINR_n' = SINR_n + \Delta$$

The channel state information determiner 54 determines, by a publically known method, channel state information (CSI), i.e., a CQI, PMI, and RI, from the compensated signal-to-interference-plus-noise ratio $SINR_n'$, to give a signal representing the CSI including the CQI, PMI, and RI to the transmission signal generator 56. The transmission signal generator 56 transmits, i.e., feeds, by means of the radio transmitter 58 and the transmission antenna 60, the signal representing the CSI back to the desired base station.

The effects of interference reduction by the IRC are high when the number of dominant interfering cells (interfering base stations) is small and when the interference resulting from the dominant interfering cells is great. In other words, when the number of the interfering cells is small, the interference reduction effects are high. Moreover, when the interference resulting from the dominant interfering cells is great, the interference reduction effects are high. If the interference reduction effects are high, the signal-to-interference-plus-noise ratio expected when the interference rejection combining is implemented is high. The present embodiment uses this principle to compensate for the signal-to-interference-plus-noise ratio $SINR_n$ expected when the interference rejection combining is implemented. The second highest reference signal reception power $RSRP_2$ is the reception power of a reference signal causing the greatest interference, and the third highest reference signal reception power $RSRP_3$ is the reception power of a reference signal causing the second greatest interference. When the difference ($RSRP_2-RSRP_3$) is great, the number of the dominant interfering cells is probably 1, and the interference resulting from the dominant interference cell is probably great. Therefore, the effects of interference reduction by the IRC are probably high. Conversely, when the difference ($RSRP_2-RSRP_3$) is small, the number of the dominant interfering cells is probably 2, and the interference resulting from the dominant interference cell is probably small. Therefore, the effects of interference reduction by the IRC are low. Accordingly, the compensator 72 compensates for the signal-to-interference-plus-noise ratio $SINR_n$ such that, when the difference ($RSRP_2 - RSRP_3$) is great, the signal-to-interference-plus-noise ratio SINR is high. Such compensation enables highly accurate calculation of the signal-to-interference-plus-noise ratio expected when the interference rejection combining is implemented.

Eighth Embodiment

A mobile communication terminal according to the eighth embodiment has the same components from those shown in FIG. 10. That is, this mobile communication terminal has the same components as those in any one of the first to the sixth embodiments shown in FIGS. 4 to 9, and is further provided with the received signal quality determiner 70 and the compensator 72. The received signal quality determiner 70 measures received signal qualities relative to radio waves received from a plurality of base stations. The compensator 72 increases the signal-to-interference-plus-noise ratio $SINR_n$ calculated by the SINR calculator 52 for each transmission stream based on the received signal qualities measured by the received signal quality determiner 70.

In the present embodiment, the received signal quality determiner 70 calculates, for each transmission stream, as the received signal quality, a non-interference-rejection-combining signal-to-interference-plus-noise ratio $SINR_{NIRC,n}$ which is a signal-to-interference-plus-noise ratio expected when the interference rejection combining is not implemented. The subscript n denotes a transmission stream number. The non-interference-rejection-combining signal-to-interference-plus-noise ratio $SINR_{NIRC,n}$ can be calculated by a publically known method.

The compensator 72 compensates for, based on the non-interference-rejection-combining signal-to-interference-plus-noise ratio $SINR_{NIRC,n}$, the signal-to-interference-plus-noise ratio SINR calculated by the SINR calculator 52, such that when the non-interference-rejection-combining signal-to-interference-plus-noise ratio $SINR_{NIRC,n}$ is low, the increase in the signal-to-interference-plus-noise ratio $SINR_n$ is great. The compensator 72 may decide an increase $\Delta_n$ in accordance with any one of the following exemplified methods. The increase $\Delta_n$ is a positive number and is decided for every transmission stream. The subscript n denotes a transmission stream number.

(1) The compensator 72 may use a function to calculate the increase $\Delta_n$ as follows:

$$\Delta_n = f_2(SINR_{NIRC,n})$$

where $f_2$ is a function in which, when the non-interference-rejection-combining signal-to-interference-plus-noise ratio $SIRN_{NIRC,n}$ is high, the increase $\Delta_n$ is great. FIG. 13 is a graph illustrating an example of a function $f_2$. However, the function $f_2$ is not limited to what is shown in FIG. 13.

(2) The compensator 72 may refer to a table to decide the increase $\Delta_n$ based on the table. The table is stored in a storage device (not shown) of the mobile communication terminal. FIG. 14 is an example table. However, the table is not limited to what is shown in FIG. 14.

(3) The compensator 72 may compare the non-interference-rejection-combining signal-to-interference-plus-noise ratio $SINR_{NIRC,n}$ with a threshold Th, to decide the increase $\Delta_n$ based on the comparison. For example, in a case in which the non-interference-rejection-combining signal-to-interference-plus-noise ratio $SINR_{NIRC,n}$ is lower than the threshold Th, the compensator 72 may decide on 3 dB for the increase $\Delta_n$, and otherwise decide on no increase for the increase $\Delta_n$. The compensator 72 may compare the non-interference-rejection-combining signal-to-interference-plus-noise ratio $SINR_{NIRC,n}$ with a plurality of thresholds, to decide the increase $\Delta_n$.

After deciding the increase $\Delta_n$ as described above, the compensator 72 increases the signal-to-interference-plus-noise ratio SINR for each transmission stream by the increase $\Delta_n$. The compensator 72, in accordance with the following equation, calculates a compensated signal-to-interference-plus-noise ratio $SINR_n'$ for each transmission stream. When the increase $\Delta_n$ is set in dB, the signal-to-interference-plus-noise ratio $SINR_n$ for each transmission stream and the compensated signal-to-interference-plus-noise ratio $SINR_n'$ for each transmission stream are also calculated in dB.

$$SINR_n' = SINR_n + \Delta_n$$

The channel state information determiner 54 determines, by a publically known method, channel state information (CSI), i.e., a CQI, PMI, and RI, from the compensated signal-to-interference-plus-noise ratio $SINR_n'$, to give a signal representing the CSI including the CQI, PMI, and RI to the transmission signal generator 56. The transmission signal generator 56 transmits, i.e., feeds, by means of the radio transmitter 58 and the transmission antenna 60, the signal representing the CSI back to the desired base station.

The effects of interference reduction by the IRC are high when the interference resulting from dominant interfering cells (interfering base stations) is great. In other words, when the interference resulting from the dominant interfering cells is great, the interference reduction effects are high. If the interference reduction effects are high, the signal-to-interference-plus-noise ratio expected when the interference rejection combining is implemented is high. The present embodiment uses this principle to compensate for the signal-to-interference-plus-noise ratio $SINR_n$ expected when the interference rejection combining is implemented. When the non-interference-rejection-combining signal-to-interference-plus-noise ratio $SINR_{NIRC,n}$, which is a signal-to-interference-plus-noise ratio that is expected when the interference rejection combining is not implemented, is high, the interference resulting from the dominant interfering cells is small, and the effects of interference reduction by the IRC are low. Conversely, when the non-interference-rejection-combining signal-to-interference-plus-noise ratio $SINR_{NIRC,n}$ is low, the interference resulting from the dominant interfering cells is great, and the effects of interference reduction by the IRC are high. Accordingly, the compensator 72 compensates for the signal-to-interference-plus-noise ratio $SINR_n$ such that when the non-interference-rejection-combining signal-to-interference-plus-noise ratio $SINR_{NIRC,n}$ is low, the signal-to-interference-plus-noise ratio $SINR_n$ is high. Such compensation enables highly accurate calculation of the signal-to-interference-plus-noise ratio expected when the interference rejection combining is implemented.

Ninth Embodiment

FIG. 15 is a block diagram showing a partial configuration of a mobile communication terminal according to a ninth embodiment of the present invention. Although not shown in FIG. 15, this mobile communication terminal has the same components as those in one of the first to the sixth embodiments shown in FIGS. 4 to 9, respectively, and is further provided with the received signal quality determiner 70 and the compensator 72. The received signal quality determiner 70 measures received signal qualities relative to radio waves received from a plurality of base stations. The compensator 72 reduces an interference and noise power $\hat{P}_{I+N,n}$ for each transmission stream estimated by the interference and noise power estimator 46 based on the received signal qualities measured by the received signal quality determiner 70.

In the present embodiment, the received signal quality determiner 70 measures, as the received signal qualities, at least three reference signal reception powers (RSRP) of reference signals received from at least three base stations.

For example, in circumstances in which the mobile communication terminal 10 receives radio waves from the four base stations (cells) 1, 2, 3, and 4 as shown in FIG. 3, a case is assumed in which the base station 1 is a desired base station. The received signal quality determiner 70 measures a reference signal reception power $RSRP_1$ from the desired base station 1, a reference signal reception power $RSRP_2$ from the interfering base station 2, a reference signal reception power $RSRP_3$ from the interfering base station 3, and a reference signal reception power $RSRP_4$ from the interfering base station 4. The reference signal reception power $RSRP_1$ from the desired base station 1 is higher than the reference signal reception powers $RSRP_2$, $RSRP_3$, and $RSRP_4$ from the interfering base stations. That is, the $RSRP_1$ is the highest. We assume the reference signal reception power $RSRP_2$ from the interfering base station 2 is the second highest, and the reference signal reception power $RSRP_3$ from the interfering base station 3 is the third highest. However, the $RSRP_2$ and the $RSRP_3$ may be equal to each other. In other words, the $RSRP_2$ is equal to or higher than $RSRP_3$.

The compensator 72 reduces an interference and noise power $\hat{P}_{I+N,n}$ for each transmission stream estimated by the interference and noise power estimator 46 based on the second highest reference signal reception power and the third highest reference signal reception power from among a plurality of reference signal reception powers, such that when the difference between the second highest reference signal reception power and the third highest reference signal reception power is great, the decrease in the interference and noise power is great, and such that when the second highest reference signal reception power is high, the decrease is great. In the above example, the compensator 72 compensates for the interference and noise power for each transmission stream estimated by the interference and noise power estimator 46, based on the second highest reference signal reception power $RSRP_2$ and the third highest reference signal reception power $RSRP_3$ from among a plurality of the reference signal reception power $RSRP_1$, $RSRP_2$, $RSRP_3$, and $RSRP_4$, such that when the difference ($RSRP_2$–$RSRP_3$) is great, the decrease in the interference and noise power is great and such that when the second highest reference signal reception power $RSRP_2$ is high, the decrease in the interference and noise power becomes great.

The compensator 72 may decide a decrease $\Delta$ in accordance with any one of the following exemplified methods. The decrease $\Delta$ is a positive number.

Figure 16:
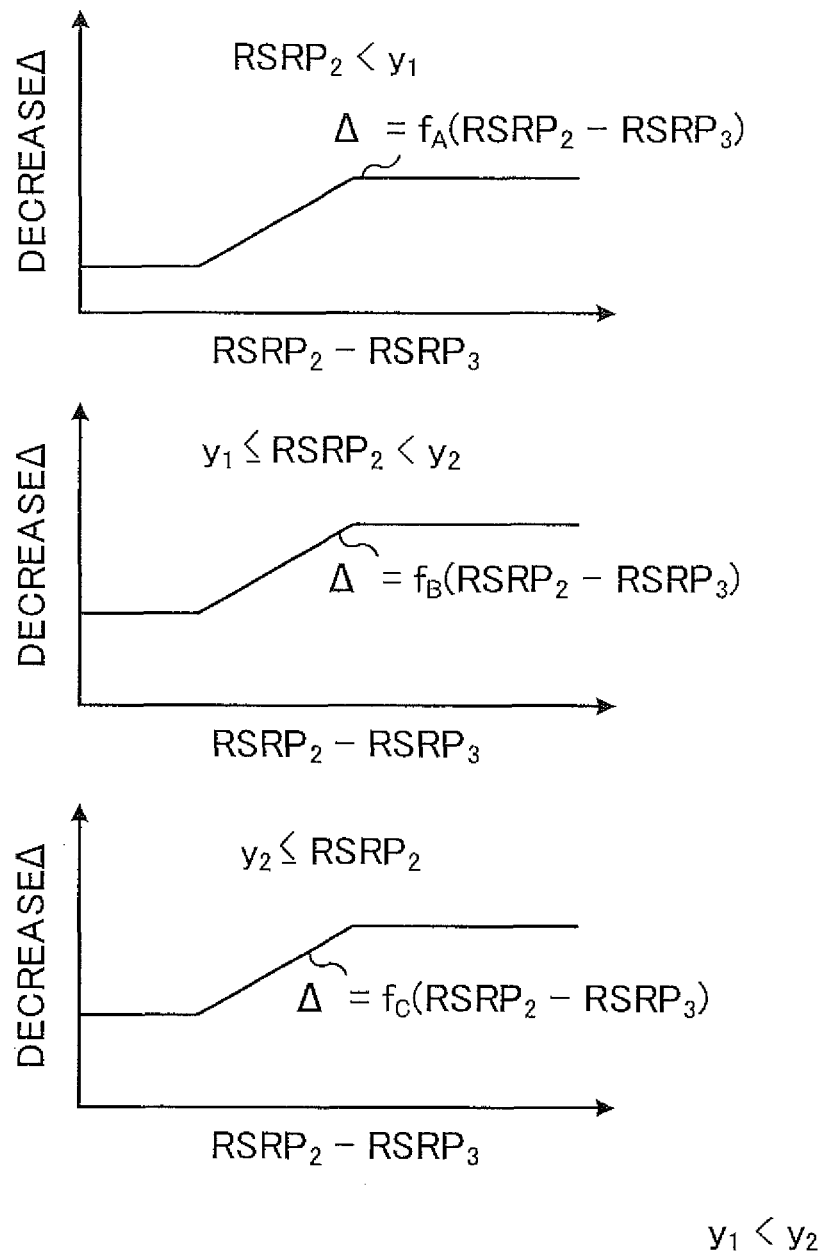
FIG. 16 shows graphs illustrating examples of functions $f_A$, $f_B$, and $f_C$ used in the ninth embodiment.

(1) The compensator 72 may select one of functions suited for the reference signal reception power $RSRP_2$ as follows, to calculate the decrease $\Delta$ in accordance with the selected function.

where $RSRP_2 < y_1$, $\Delta = f_A(RSRP_2 - RSRP_3)$ where $y_1 \leq RSRP_2 < y_2$, $\Delta = f_B(RSRP_2 - RSRP_3)$ where $y_2 \leq RSRP_2$, $\Delta = f_C(RSRP_2 - RSRP_3)$ where the $f_A$, $f_B$, and $f_C$ are each a function in which, when the difference ($RSRP_2$–$RSRP_3$) is great, the decrease $\Delta$ is great. $y_1$ and $y_2$ are thresholds ($y_1 < y_2$). FIG. 16 shows graphs showing examples of the functions $f_A$, $f_B$, and $f_C$. However, the functions $f_A$, $f_B$, and $f_C$ are not limited to those shown in FIG. 16. Neither the number of thresholds nor the number of functions is limited to the above examples.

(2) The compensator 72 may select one of tables suited for the reference signal reception power $RSRP_2$, to decide the decrease $\Delta$ based on the selected table. These tables are stored in a storage device (not shown) of the mobile communication terminal. FIG. 17 shows examples of the tables. Where $RSRP_2 < y_1$, the top table of FIG. 17 is used; where $y_1 \leq RSRP_2 < y_2$, the middle table of FIG. 17 is used; and where $y_2 \leq RSRP_2$, the bottom table of FIG. 17 is used. However, the tables are not limited to those shown in FIG. 17. Neither the number of thresholds nor the number of tables is limited to the above examples.

(3) The compensator 72 may decide the decrease $\Delta$, based on a range of the reference signal reception power $RSRP_2$ and difference ($RSRP_2$–$RSRP_3$). For example, the compensator 72 may decide on 30 dB for the decrease $\Delta$ when $RSRP_2 < y_1$ and when the difference ($RSRP_2$–$RSRP_3$) is greater than a threshold Th, and may decide that no decrease is necessary for the decrease $\Delta$ when $RSRP_2 < y_1$ and when the difference ($RSRP_2$–$RSRP_3$) is equal to or less than the threshold Th. The compensator 72 may decide on 40 dB for the decrease $\Delta$ when $y_1 \leq RSRP_2 < y_2$ and when the difference ($RSRP_2$–$RSRP_3$) is greater than the threshold Th; the compensator 72 may decide on 10 dB for the decrease $\Delta$ when $y_1 \leq RSRP_2 < y_2$ and when the difference ($RSRP_2$–$RSRP_3$) is equal to or less than the threshold Th; the compensator 72 may decide on 50 dB for the decrease $\Delta$ when $y_2 \leq RSRP_2$ and when the difference ($RSRP_2$–$RSRP_3$) is greater than the threshold Th; and the compensator 72 may decide on 20 dB for the decrease $\Delta$ when $y_2 \leq RSRP_2$ and when the difference ($RSRP_2$–$RSRP_3$) is equal to or less than the threshold Th. The compensator 72 may compare the difference ($RSRP_2$–$RSRP_3$) with a plurality of thresholds to decide the decrease $\Delta$.

After deciding the decrease $\Delta$, the compensator 72 reduces an interference and noise power $\hat{P}_{I+N,n}$ for each transmission stream by the decrease $\Delta$. The compensator 72 calculates, in accordance with the following equation, a compensated interference and noise power $\hat{P}_{I+N,n}'$ for each transmission stream. The common decrease $\Delta$ may be used for a plurality of transmission streams. When the decrease $\Delta$ is in dB or dBm, the interference and noise power for each transmission stream and the compensated interference and noise power for each transmission stream are also calculated in dB.

$$\hat{P}_{I+N,n}' = \hat{P}_{I+N,n} - \Delta$$

The SINR calculator 52 calculates, from the desired data signal power estimated by the desired data signal power estimator 50 and the interference and noise power compensated by the compensator 72, a signal-to-interference-plus-noise ratio expected when the interference rejection combining is implemented. That is, the SINR calculator 52 calculates, i.e., estimates, a signal-to-interference-plus-noise ratio $SINR_n$ that is expected when the interference rejection combining is implemented for each transmission stream in accordance with the following Equation (18):

$$SINR_n = \hat{P}_{S,n}' / \hat{P}_{I+N,n} \qquad (18)$$

The subscript n denotes a transmission stream number.

The channel state information determiner 54 determines, by a publically known method, channel state information (CSI), i.e., a CQI, PMI, and RI, from the signal-to-interference-plus-noise ratio $SINR_n$ calculated by the SINR calculator 52, to give a signal representing the CSI including the CQI, PMI, and RI to the transmission signal generator 56. The transmission signal generator 56 transmits, i.e., feeds, by means of the radio transmitter 58 and the transmission antenna 60, the signal representing the CSI back to the desired base station.

The effects of interference reduction by the IRC are great when the number of dominant interfering cells (interfering base stations) is small and when the interference resulting from the dominant interfering cells is great. In other words, when the number of the interfering cells is small, the interference reduction effects are high. Moreover, when the interference resulting from the dominant interfering cells is great, the interference reduction effects are high. If the interference reduction effects are high, the interference and noise power expected when the interference rejection combining is implemented is low. The present embodiment uses this principle, to compensate for the interference and noise power expected when the interference rejection combining is implemented. The second highest reference signal reception power RSRP2 is the reception power of a reference signal causing the greatest interference, and the third highest reference signal reception power RSRP3 is the reception power of a reference signal causing the second greatest interference. When the reference signal reception power RSRP2 is high, the interference resulting from the dominant interfering cells is probably great, and when the difference (RSRP2−RSRP3) is great, the number of the dominant interfering cells is probably 1, and the effects of interference reduction by the IRC are probably high. Accordingly, the compensator 72 compensates for the interference and noise power such that when the second highest reference signal reception power RSRP2 is high, the decrease in the interference and noise power is low, and when the difference (RSRP2−RSRP3) is great, the decrease in the interference and noise power is small. Such a compensation enables highly accurate calculation of the signal-to-interference-plus-noise ratio that is expected when the interference rejection combining is implemented.

Tenth Embodiment

Figure 18:
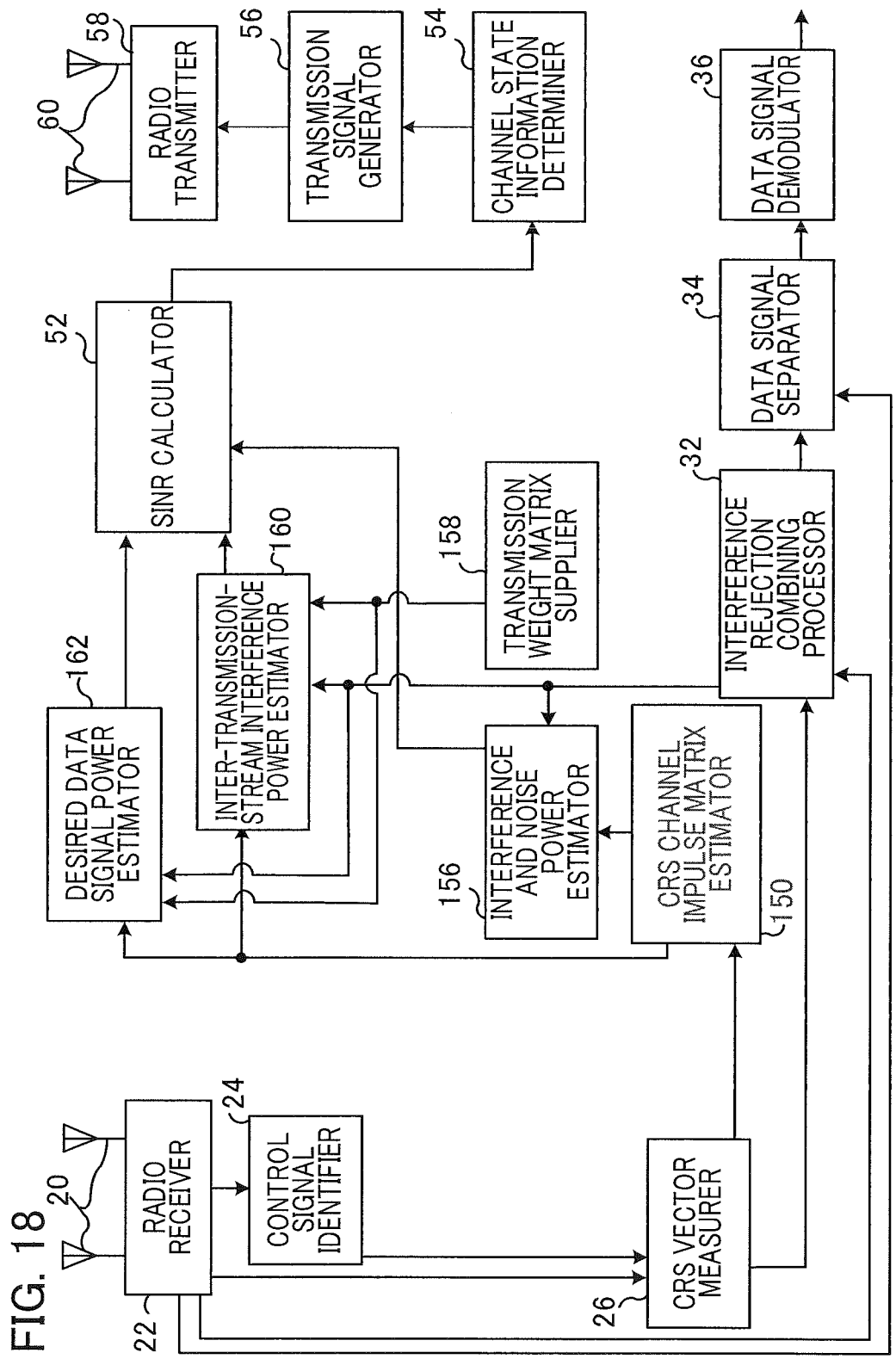
FIG. 18 is a block diagram showing a configuration of a mobile communication terminal according to each of tenth and eleventh embodiments of the present invention.

FIG. 18 is a block diagram showing a configuration of a mobile communication terminal according to a tenth embodiment of the present invention. FIG. 18 simply shows signal reception related portions and signal transmission related portions alone, and other portions are not depicted therein. FIG. 18 uses the same reference symbols to indicate components that are the same in FIG. 4, and the following description omits detailed descriptions of these components in some cases.

As shown in FIG. 18, each mobile communication terminal has a cell-specific reference signal (CRS) channel impulse matrix estimator 150, an interference and noise power estimator 156, a transmission weight matrix supplier 158, an inter-transmission-stream interference power estimator 160, and a desired data signal power estimator 162. These components are functional blocks realized by a CPU, not shown, of the mobile communication terminal running and executing a computer program and functioning in accordance with the computer program.

Similar to the first embodiment, the CRS vector measurer 26 (reference signal vector measurer) measures a cell-specific reference signal vector (CRS vector), which is a vector of a CRS transmitted from a desired base station. The interference rejection combining processor 32, based on the reference signal (CRS vector) measured by the CRS vector measurer 26, calculates an interference rejection combining reception weight matrix. However, the interference rejection combining processor 32 calculates the interference rejection combining reception weight matrix also based on a transmission weight matrix supplied by the transmission weight matrix supplier 158 (described later).

The CRS channel impulse matrix estimator 150 estimates, from signals derived from radio waves received by the reception antennas 20, two $N_{RX} \times N_{TX}$-dimensional channel impulse matrices (CRS channel impulse matrices) $H_{CRS,m}$ and $H_{CRS,m'}$, corresponding to two different resource elements of a CRS received from the desired base station.

Reference is made to FIG. 19 to describe the subscripts "m" and "m'". FIG. 19 is a diagram showing an example mapping of various signals in a resource block of a downlink transmission according to the LTE Advanced. As will be understood from FIG. 19, CRSs are transmitted from a plurality of transmission antenna ports of a base station (cell). The subscripts "m" and "m'" each denote a number for a resource element RE corresponding to one of the CRS channel impulse matrices. For example, the subscript "m" is a number for a resource element RE1 in FIG. 19, and the subscript "m'" is a number for a resource element RE2 in FIG. 19. The resource elements RE1 and RE2 are not limited to the depicted examples, but are, from among a plurality of resource elements of a CRS transmitted from a single antenna port, those elements that are close to each other in a frequency direction as much as possible (close subcarriers) and close to each other in a time direction as much as possible (close OFDM symbols).

The interference and noise power estimator 156 estimates an interference and noise power expected when the interference rejection combining is implemented, from the interference rejection combining reception weight matrix obtained by the interference rejection combining processor 32 and a plurality of channel impulse vectors, each of which is a part of respective ones of the plurality of channel impulse matrices obtained by the CRS channel impulse matrix estimator 150. That is, the interference and noise power estimator 156 calculates an interference and noise power $\hat{P}_{I+N,n}$ for each transmission stream in accordance with the following Equation (19):

$$\hat{P}_{I+N,n} = \frac{1}{2} |w_{IRC,m,n}(h_{CRS,m,a} - h_{CRS,m',a})|^2 \quad (19)$$

The subscript n denotes a transmission stream number.

$w_{IRC,m,n}$ is a row vector ($N_{RX}$-dimension) extracted for every transmission stream from an interference rejection combining reception weight matrix $W_{IRC,m}$ ($N_{stream} \times N_{RX}$-dimensional matrix) calculated by the interference rejection combining processor 32 and based on a CRS vector of a resource element with the number m. Thus, this row vector is an interference rejection combining weight vector which is a part of the interference rejection combining reception weight matrix. The subscript n denotes a transmission stream number. The interference rejection combining reception weight matrix is calculated based on the CRS vector and a transmission weight matrix supplied by the transmission weight matrix supplier 158 (described later).

$hC_{CRS,m,a}$ is a column vector ($N_{RX}$-dimension) extracted for each antenna port number "a", from the CRS channel impulse matrix $H_{CRS,m}$ ($N_{RX} \times N_{TX}$-dimensional matrix) calculated by the CRS channel impulse matrix estimator 150. In other words, this column vector is a channel impulse vector which is a part of the CRS channel impulse matrix. As shown in FIG. 19, CRSs are transmitted from a plurality of transmission antenna ports of a base station (cell). The subscript "a" denotes an antenna port number of a base station from which the CRS is transmitted. Thus, in the example shown in FIG. 19, "a" is 1 or 2.

$h_{CRS,m',a}$ is a column vector ($N_{RX}$-dimension) extracted for each antenna port number "a" from the CRS channel impulse matrix $H_{CRS,m'}$ ($N_{RX} \times N_{TX}$-dimensional matrix) calculated by the CRS channel impulse matrix estimator 150. That is, this column vector is a channel impulse vector which is a part of the CRS channel impulse matrix.

The transmission weight matrix supplier 158 supplies a candidate for a transmission weight matrix $W_{TXi}$ ($N_{TX} \times N_{stream}$-dimensional matrix) to be used for precoding at the desired base station. The subscript i denotes a number for the transmission weight matrix listed in a codebook (describing a set of transmission weight matrices), when both of the mobile communication terminal and the base station own the same codebook.

The inter-transmission-stream interference power estimator 160, from the interference rejection combining weight vector being a part of the interference rejection combining reception weight matrix, one of the CRS channel impulse matrices estimated by the CRS channel impulse matrix estimator 150, and from the candidate for the transmission weight matrix, estimates an inter-transmission-stream interference power transmitted from the desired base station and expected when the interference rejection combining is implemented. That is, the inter-transmission-stream interference power estimator 160 calculates an inter-transmission-stream interference power $\hat{P}_{Layer,n}$ for each transmission stream in accordance with the following Equation (20):

$$\hat{P}_{Layer,n} = \sum_{n'=1, n' \neq n}^{N_{Stream}} |w_{IRC,p,n} H_{CRS,p} w_{Tx,i,n'}|^2 \qquad (20)$$

The subscript n denotes a transmission stream number.

$w_{IRC,p,n}$ is an $N_{RX}$-dimensional row vector (interference rejection combining weight vector) extracted for each transmission stream from the interference rejection combining reception weight matrix ($N_{stream} \times N_{RX}$-dimensional matrix) calculated by the interference rejection combining processor 32 and is based on a CRS vector of a resource element with a number p.

$H_{CRS,p}$ is a CRS channel impulse matrix calculated by the CRS channel impulse matrix estimator 150, the matrix corresponding to the CRS vector of the resource element with the number p.

$w_{Tx,i,n'}$ is a column vector ($N_{TX}$-dimension) extracted for each stream from the candidate transmission weight matrix ($N_{TX} \times N_{stream}$-dimensional matrix) supplied from the transmission weight matrix supplier 158. In other words, the column vector is a transmission weight vector that is a part of the candidate transmission weight matrix. The subscript n' denotes a transmission stream differing from the transmission stream for which the inter-transmission-stream interference power is calculated through Equation (20).

The desired data signal power estimator 162 estimates, from the interference rejection combining weight vector, one of the CRS channel impulse matrices estimated by the CRS channel impulse matrix estimator 150, and the transmission weight matrix candidate, a desired data signal power expected when the interference rejection combining is implemented. The desired data signal power estimator 162 calculates a desired data signal power $\hat{P}_{S,n}'$ for each transmission stream in accordance with the following Equation (21):

$$\hat{P}_{S,n}' = |w_{IRC,p,n} H_{CRS,p} w_{Tx,i,n}|^2 \qquad (21)$$

The subscript n denotes a transmission stream number.

$w_{Tx,i,n}$ is a column vector ($N_{TX}$-dimension) extracted for each stream from the candidate transmission weight matrix ($N_{TX} \times N_{stream}$-dimensional matrix) supplied from the transmission weight matrix supplier 158. In other words, this column vector is a transmission weight vector which is a part of the candidate transmission weight matrix. The subscript n denotes a transmission stream that is the same as the one for which the desired data signal power is calculated through Equation (21).

The SINR calculator 52 calculates a signal-to-interference-plus-noise ratio expected when the interference rejection combining is implemented, from the desired data signal power estimated by the desired data signal power estimator 162, the interference and noise power estimated by the interference and noise power estimator 156, and the inter-transmission-stream interference power estimated by the inter-transmission-stream interference power estimator 160. That is, the SINR calculator 52 calculates, i.e., estimates, a signal-to-interference-plus-noise ratio SINR, expected when the interference rejection combining is implemented, for each transmission stream, in accordance with the following Equation (22):

$$SINR_n = \hat{P}_{S,n}' / (\hat{P}_{I+N,n} + \hat{P}_{Layer,n}) \qquad (22)$$

The subscript n denotes a transmission stream number.

An operation will be explained for calculating a signal-to-interference-plus-noise ratio SINR by the mobile communication terminal according to the present embodiment. The interference and noise power estimator 156 first calculates, in accordance with the above Equation (19) an interference and noise power corresponding to the resource element number m for each transmission stream (Step 1). The inter-transmission-stream interference power estimator 160 next calculates, in accordance with the above Equation (20) an inter-transmission-stream interference power corresponding to the resource element number p for each transmission stream (Step 2). The desired data signal power estimator 162 then calculates, in accordance with the above Equation (21) a desired data signal power corresponding to the resource element number p for each transmission stream (Step 3). Moreover, the SINR calculator 52 calculates, in accordance with the above Equation (22), for each transmission stream, a signal-to-interference-plus-noise ratio $SINR_n$ (Step 4). The process so far from Step 1 up to Step 4 corresponds to a transmission weight matrix that has the above number i.

After completing Step 4, the number i for the transmission weight matrix is incremented by 1. The transmission weight matrix supplier 158 then supplies the next transmission weight matrix (the number (i+1)). The process from Step 1 to Step 4 will be repeated for the next transmission weight matrix (the number (i+1)). The process from Step 1 to Step 4 will be repeated for each and every one of transmission weight matrices provided in the codebook. Thus, a signal-to-interference-plus-noise ratio $SINR_n$ corresponding to the resource element m is calculated for every transmission weight matrix provided in the codebook. The SINR calculator 52 supplies one having the highest value (there are highest values for the respective transmission streams) from among these many signal-to-interference-plus-noise ratios $SINR_n$ to the channel state information determiner 54. The channel state information determiner 54 determines channel state information (CSI) from the signal-to-interference-plus-noise ratio $SINR_n$ of the highest value output from the SINR calculator 52. A transmission weight matrix corresponding to the signal-to-interference-plus-noise ratio $SINR_n$ of the highest value is used when the channel state information determiner 54 determines the channel state information. Moreover, the data signal separator 34 performs signal separation, using an interference rejection combining reception weight matrix corresponding to the transmission weight matrix.

The signal-to-interference-plus-noise ratio SINR of the highest value obtained in the foregoing operation corresponds to a particular resource element (with the number m) and a particular resource element (with the number p). The mobile communication terminal may calculate a highest value of average signal-to-interference-plus-noise ratios SINR over a plurality of resource elements, to determine the channel state information by using the highest average value. For example, at Step 1, the interference and noise power estimator 156 may, relative to a plurality of resource elements (the resource element with the number m and a resource element with another number), apply Equation (19) to calculate a plurality of interference and noise powers and take an average of the interference and noise powers. At Step 2, the inter-transmission-stream interference power estimator 160 may, relative to a plurality of resource elements (the resource element with the number p and a resource element with another number), apply Equation (20), to calculate a plurality of inter-transmission-stream interference powers and take an average of the inter-transmission-stream interference powers. At Step 3, the desired data signal power estimator 162 may, relative to a plurality of resource elements (the resource element with the number p and a resource element with another number), apply Equation (21), to calculate a plurality of desired data signal powers and take an average of the desired data signal powers. At Step 4, the SINR calculator 52 may calculate a signal-to-interference-plus-noise ratio from the average desired data signal power, the average interference and noise power, and the average inter-transmission-stream interference power.

In the present embodiment, the CRS channel impulse matrix estimator 150 estimates a plurality of channel impulse matrices corresponding to different resource elements of a CRS, and the interference and noise power estimator 156, based on a plurality of channel impulse vectors, each of which is a part of respective ones of the plurality of channel impulse matrices, estimates an interference and noise power expected when the interference rejection combining is implemented. Where different resource elements are close to each other in the frequency direction (close subcarriers) and also in the time direction (close OFDM symbols), the channel characteristics for these resource elements are probably almost the same, and the difference between a plurality of channel impulse matrices derived from the resource elements is probably caused by the interference and noise. Accordingly, an interference and noise power can be estimated with a high degree of accuracy based on a plurality of channel impulse vectors derived from these resource elements. Thus estimating an interference and noise power with small error enables highly accurate calculation of a signal-to-interference-plus-noise ratio (SINR) that is expected when the interference rejection combining is implemented.

Since the calculated SINR is highly accurate, a base station is able to perform suitable adaptive modulation and user scheduling depending on channel quality information determined based on an SINR with a high degree of accuracy, and it is also possible to perform a suitable precoding depending on channel state information determined based on an SINR with a high degree of accuracy. Moreover, since the calculated SINR has a high degree of accuracy, a suitable handover could be performed if the SINR is used as an index for handover.

Eleventh Embodiment

The mobile communication terminal according to an eleventh embodiment of the present invention has the same configuration as that of the tenth embodiment. The tenth embodiment uses Equation (19) at Step 1, but the present embodiment uses the following Equation (23) at Step 1. That is, the interference and noise power estimator 156 calculates an interference and noise power $\hat{P}_{I+N,n}$ for each transmission stream in accordance with the following Equation (23):

$$\hat{P}_{I+N,n} = \tfrac{1}{2} |(w_{IRC,m,a} h_{CRS,m,a} - w_{IRC,m',n} h_{CRS,m',a})|^2 \quad (23)$$

The subscript n denotes a transmission stream number.

In Equation (23), $w_{IRC,m',n}$ is a row vector ($N_{RX}$-dimension) extracted for each transmission stream from the interference rejection combining reception weight matrix $W_{IRC,m'}$ ($N_{stream} \times N_{RX}$-dimensional matrix) calculated by the interference rejection combining processor 32 and based on the CRS vector of a resource element with the number m'. Thus, this row vector is an interference rejection combining weight vector which is a part of the interference rejection combining reception weight matrix. The subscript n denotes a transmission stream number. The interference rejection combining reception weight matrix is calculated based on the CRS vector and the transmission weight matrix supplied from the transmission weight matrix supplier 158. The other variables in Equation (23) are as described above in relation to Equation (19).

The other features are the same as those of the tenth embodiment. An operation will be explained for calculating a signal-to-interference-plus-noise ratio $SINR_n$ by the mobile communication terminal according to the present embodiment. The interference and noise power estimator 156 first calculates, in accordance with the above Equation (23) an interference and noise power corresponding to the resource element number m for each transmission stream (Step 1). The inter-transmission-stream interference power estimator 160 next calculates, in accordance with the above Equation (20) an inter-transmission-stream interference power corresponding to the resource element number p for each transmission stream (Step 2). The desired data signal power estimator 162 then calculates, in accordance with the above Equation (21) a desired data signal power corresponding to the resource element number p for each transmission stream (Step 3). Moreover, the SINR calculator 52 calculates, in accordance with the above Equation (22), for each transmission stream, a signal-to-interference-plus-noise ratio $SINR_n$ (Step 4). The process so far from Step 1 up to Step 4 corresponds to a transmission weight matrix that has the above number i.

After completing Step 4, the number i for the transmission weight matrix is incremented by 1. The transmission weight matrix supplier 158 then supplies the next transmission weight matrix (the number (i+1)). The process from Step 1 to Step 4 will be repeated for the next transmission weight matrix (the number (i+1)). The process from Step 1 to Step 4 will be repeated for each and every one of the transmission weight matrices provided in the codebook. Thus, a signal-to-interference-plus-noise ratio $SINR_n$ corresponding to the resource element m is calculated for every transmission weight matrix provided in the codebook. The SINR calculator 52 supplies one having the highest value (there are highest values for the respective transmission streams) from among the many signal-to-interference-plus-noise ratios SINR to the channel state information determiner 54. The channel state information determiner 54 determines the channel state information (CSI) from the signal-to-interference-plus-noise ratio $SINR_n$ of the highest value output from the SINR calculator 52. A transmission weight matrix corresponding to the signal-to-interference-plus-noise ratio $SINR_n$ of the highest value is used when the channel state information determiner 54 determines the channel state information. Moreover, the data signal separator 34 performs signal separation, using an interference rejection combining reception weight matrix corresponding to the transmission weight matrix.

Similar to the tenth embodiment, the mobile communication terminal may calculate a highest value of average signal-to-interference-plus-noise ratios $SINR_n$ over a plurality of resource elements, to determine the channel state information by using the highest average value.

Twelfth Embodiment

Figure 20:
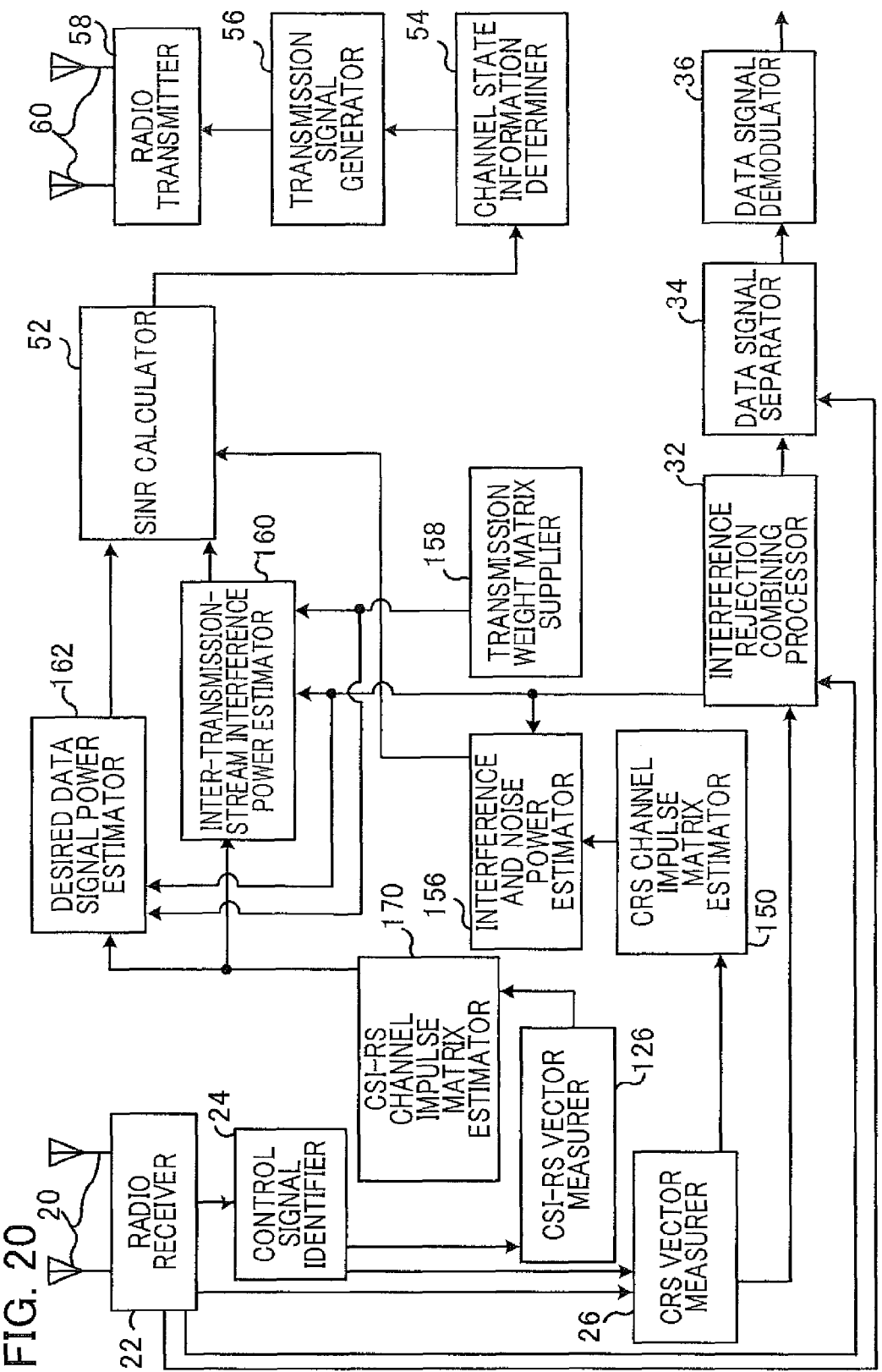
FIG. 20 is a block diagram showing a configuration of a mobile communication terminal according to each of twelfth and thirteenth embodiments of the present invention.

FIG. 20 is a block diagram showing a configuration of a mobile communication terminal according to a twelfth embodiment of the present invention. FIG. 20 simply shows signal reception related portions and signal transmission related portions alone, and other portions are not depicted therein. FIG. 20 uses the same reference symbols to indicate components that are the same in FIG. 18, and the following description omits detailed descriptions of these components in some cases.

As shown in FIG. 20, each mobile communication terminal additionally has a CSI-RS (channel state information reference signal) vector measurer 126 and a CSI-RS (channel state information reference signal) channel impulse matrix estimator 170. These components are functional blocks realized by a CPU, not shown, of the mobile communication terminal running and executing a computer program and functioning in accordance with the computer program.

Similar to the tenth embodiment, the CRS vector measurer 26 (reference signal vector measurer) measures a cell-specific reference signal vector (CRS vector), which is a vector of CRS transmitted from a desired base station. Similar to the tenth embodiment, the interference rejection combining processor 32, based on the reference signal vector (CRS vector) measured by the CRS vector measurer 26 and the transmission weight matrix supplied from the transmission weight matrix supplier 158, calculates an interference rejection combining reception weight matrix.

Similar to the tenth embodiment, the CRS channel impulse matrix estimator 150 estimates, from signals derived from radio waves received by the reception antennas 20, two $N_{RX} \times N_{TX}$-dimensional channel impulse matrices (CRS channel impulse matrices) corresponding to two different resource elements of a CRS received from the desired base station. Similar to the tenth embodiment, the interference and noise power estimator 156 calculates an interference and noise power for each transmission stream in accordance with the above Equation (19). Similar to the tenth embodiment, the transmission weight matrix supplier 158 supplies a candidate for a transmission weight matrix ($N_{TX} \times N_{stream}$-dimensional matrix) to be used for precoding at the desired base station.

The CSI-RS vector measurer 126, similar to the first embodiment, measures a channel state information reference signal vector (CSI-RS vector) which is a vector of a CSI-RS transmitted from the desired base station.

The CSI-RS channel impulse matrix estimator 170 estimates, from signals derived from radio waves received by the reception antennas 20, an $N_{RX} \times N_{TX}$-dimensional channel impulse matrix (CSI-RS channel impulse matrix) $H_{CSI-RS,p}$ corresponding to a freely selected resource element (with the number p) of a CSI-RS received from the desired base station.

The inter-transmission-stream interference power estimator 160, from the interference rejection combining weight vector, being a part of the interference rejection combining reception weight matrix, the CSI-RS channel impulse matrix CSI-RS estimated by the channel impulse matrix estimator 170, and from the candidate for the transmission weight matrix, estimates an inter-transmission-stream interference power that is expected when the interference rejection combining is implemented. That is, the inter-transmission-stream interference power estimator 160 calculates an inter-transmission-stream interference power $\hat{P}_{Layer,a}$ for each transmission stream in accordance with the following Equation (24):

$$\hat{P}_{Layer,n} = \sum_{n'=1, n' \neq n}^{N_{Stream}} |w_{IRC,p,n} H_{CSI-RS,p} w_{Tx,i,n'}|^2 \quad (24)$$

The subscript n denotes a transmission stream number. $w_{IRC,p,n}$ and $w_{Tx,i,n'}$ are as described above in relation to Equation (20) of the tenth embodiment.

The desired data signal power estimator 162 estimates, from the interference rejection combining weight vector, the CSI-RS channel impulse matrix estimated by the CSI-RS channel impulse matrix estimator 170, and the transmission weight matrix candidate, a desired data signal power expected when the interference rejection combining is implemented. The desired data signal power estimator 162 calculates a desired data signal power $\hat{P}_{S,n}'$ for each transmission stream in accordance with the following Equation (25):

$$\hat{P}_{S,n}' = |w_{IRC,p,n} H_{CSI-RS,p} w_{Tx,i,n}|^2 \quad (25)$$

The subscript n denotes a transmission stream number. $w_{Tx,i,n}$ is as described above in relation to Equation (21) of the tenth embodiment.

The SINR calculator 52 calculates a signal-to-interference-plus-noise ratio that is expected when the interference rejection combining is implemented, from the desired data signal power estimated by the desired data signal power estimator 162, the interference and noise power estimated by the interference and noise power estimator 156, and the inter-transmission-stream interference power estimated by the inter-transmission-stream interference power estimator 160. That is, the SINR calculator 52 calculates, i.e., estimates, a signal-to-interference-plus-noise ratio $SINR_n$, expected when the interference rejection combining is implemented, for each transmission stream, in accordance with the above Equation (22).

The other features are the same as those of the tenth embodiment. An operation will be explained for calculating a signal-to-interference-plus-noise ratio $SINR_n$ by the mobile communication terminal according to the present embodiment. The interference and noise power estimator 156 first calculates, in accordance with the above Equation

(19) an interference and noise power corresponding to the resource element number m for each transmission stream (Step 1). The inter-transmission-stream interference power estimator 160 next calculates, in accordance with the above Equation (20) an inter-transmission-stream interference power corresponding to the resource element number p for each transmission stream (Step 2). The desired data signal power estimator 162 then calculates, in accordance with the above Equation (24) a desired data signal power corresponding to the resource element number p for each transmission stream (Step 3). Moreover, the SINR calculator 52 calculates, in accordance with the above Equation (25) a signal-to-interference-plus-noise ratio $SINR_n$ for each transmission stream (Step 4). The process so far from Step 1 up to Step 4 corresponds to a transmission weight matrix that has the above number i.

After completing Step 4, the number i for the transmission weight matrix is incremented by 1. The transmission weight matrix supplier 158 then supplies the next transmission weight matrix (the number (i+1)). The process from Step 1 to Step 4 will be repeated for the next transmission weight matrix (the number (i+1)). The process from Step 1 to Step 4 will be repeated for each and every one of transmission weight matrices provided in the codebook. Thus, a signal-to-interference-plus-noise ratio SINR, corresponding to the resource element m is calculated for every transmission weight matrix provided in the codebook. The SINR calculator 52 supplies one having the highest value (there are highest values for the respective transmission streams), from among the many signal-to-interference-plus-noise ratios $SINR_n$, to the channel state information determiner 54. The channel state information determiner 54 determines the channel state information (CSI) from the signal-to-interference-plus-noise ratio $SINR_n$ of the highest value output from the SINR calculator 52. A transmission weight matrix corresponding to the signal-to-interference-plus-noise ratio $SINR_n$ of the highest value is used when the channel state information determiner 54 determines the channel state information. Moreover, the data signal separator 34 performs signal separation, using an interference rejection combining reception weight matrix corresponding to the transmission weight matrix.

Similar to the tenth embodiment, the mobile communication terminal may calculate a highest value of average signal-to-interference-plus-noise ratios $SINR_n$ over a plurality of resource elements, to determine the channel state information by using the highest average value. The present embodiment can achieve substantially the same effects as those of the tenth embodiment.

Thirteenth Embodiment

The mobile communication terminal according to a thirteenth embodiment of the present invention has the same configuration as that of the twelfth embodiment. The twelfth embodiment uses Equation (19) at Step 1, whereas the present embodiment uses Equation (23) (described above in relation to the eleventh embodiment) at Step 1.

The other features are the same as those of the twelfth embodiment. An operation will be explained for calculating an signal-to-interference-plus-noise ratio $SINR_n$ by the mobile communication terminal according to the present embodiment. The interference and noise power estimator 156 first calculates, in accordance with the above Equation (23) an interference and noise power corresponding to the resource element number m for each transmission stream (Step 1). The inter-transmission-stream interference power estimator 160 next calculates, in accordance with the above Equation (24) an inter-transmission-stream interference power corresponding to the resource element number p for each transmission stream (Step 2). The desired data signal power estimator 162 then calculates, in accordance with the above Equation (25) a desired data signal power corresponding to the resource element number p for each transmission stream (Step 3). Moreover, the SINR calculator 52 calculates, in accordance with the above Equation (22) a signal-to-interference-plus-noise ratio $SINR_n$ for each transmission stream (Step 4). The process so far from Step 1 up to Step 4 corresponds to a transmission weight matrix that has the above number i.

After completing Step 4, the number i for the transmission weight matrix is incremented by 1. The transmission weight matrix supplier 158 then supplies the next transmission weight matrix (the number (i+1)). The process from Step 1 to Step 4 will be repeated for the next transmission weight matrix (the number (i+1)). The process from Step 1 to Step 4 will be repeated for each and every one of transmission weight matrices provided in the codebook. Thus, a signal-to-interference-plus-noise ratio $SINR_n$ corresponding to the resource element m is calculated for every transmission weight matrix provided in the codebook. The SINR calculator 52 supplies one having the highest value (there are highest values for the respective transmission streams) from among the many signal-to-interference-plus-noise ratios $SINR_n$ to the channel state information determiner 54. The channel state information determiner 54 determines the channel state information (CSI) from the signal-to-interference-plus-noise ratio $SINR_n$ of the highest value output from the SINR calculator 52. A transmission weight matrix corresponding to the signal-to-interference-plus-noise ratio SINR of the highest value is used when the channel state information determiner 54 determines the channel state information. Moreover, the data signal separator 34 performs signal separation, using an interference rejection combining reception weight matrix corresponding to the transmission weight matrix.

Similar to the tenth embodiment, the mobile communication terminal may calculate a highest value of average signal-to-interference-plus-noise ratios $SINR_n$ over a plurality of resource elements, to determine the channel state information by using the highest average value. The present embodiment can achieve substantially the same effects as those of the tenth embodiment.

The above seventh to the ninth embodiments each can be combined with any one of the tenth to the thirteenth embodiments. Moreover, the above tenth to the thirteenth embodiments each give an example of a transmission precoding system using a codebook, but may use a feely selected precoding matrix calculated, for example through singular value decomposition, based on a CRS or CSI-RS channel impulse matrix estimated at the mobile communication terminal.

Fourteenth Embodiment

Figure 21:
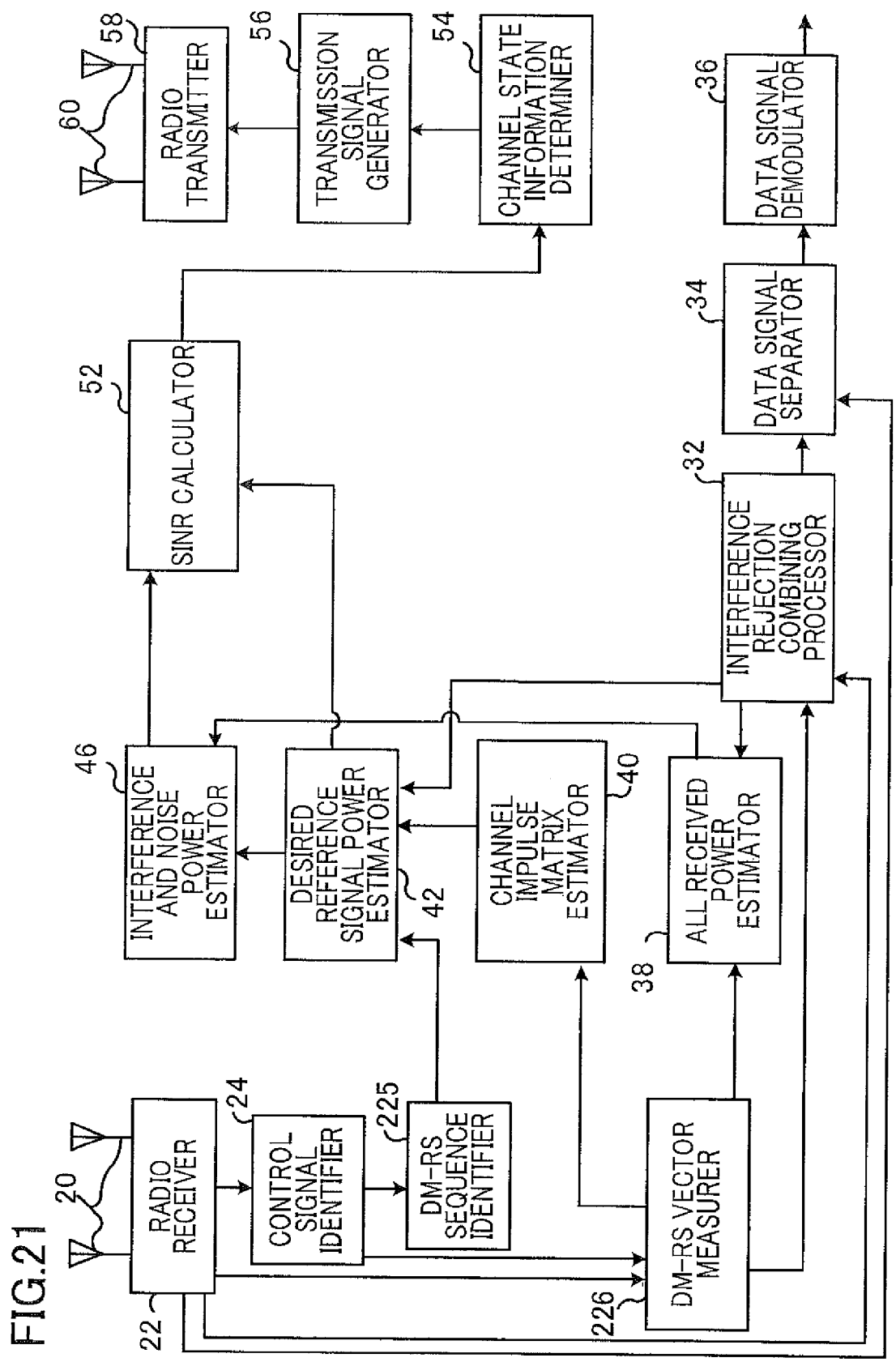
FIG. 21 is a block diagram showing a configuration of a mobile communication terminal according to a fourteenth embodiment of the present invention.

FIG. 21 is a block diagram showing a configuration of a mobile communication terminal according to a fourteenth embodiment of the present invention. FIG. 21 simply shows signal reception related portions and signal transmission related portions alone, and other portions are not depicted therein. FIG. 21 uses the same reference symbols to indicate components that are the same in FIG. 4 (the first embodiment), and the following description omits detailed descriptions of these components in some cases.

As shown in FIG. 21, each mobile communication terminal has a DM-RS (demodulation reference signal) sequence identifier 225 and a DM-RS (demodulation reference signal) vector measurer 226. The DM-RS sequence identifier 225 and the DM-RS vector measurer 226 are functional blocks realized by a CPU, not shown, of the mobile communication terminal running and executing a computer program and functioning in accordance with the computer program. Unlike the first embodiment, the mobile communication terminal according to the present embodiment does not have the transmission weight vector estimator 48 or the desired data signal power estimator 50.

The DM-RS sequence identifier 225 (reference signal sequence identifier) identifies, based on the cell ID indicated by the control signals identified by the control signal identifier 24, a demodulation reference signal sequence (DM-RS sequence) $d_{1,DM\text{-}RS}$, which is a sequence of a demodulation reference signal (DM-RS) transmitted from a desired base station. Specifically, from among a set of DM-RS sequences known to the mobile communication terminal, the DM-RS sequence identifier 225 selects a DM-RS sequence that corresponds to the cell ID.

The DM-RS vector measurer 226 (reference signal vector measurer) measures a demodulation reference signal vector (DM-RS vector) $y_{DM\text{-}RS}$ which is a vector representing a DM-RS transmitted from the desired base station. The DM-RS vector is an $N_{RX}$-dimensional vector, and $N_{RX}$ corresponds to the number of the reception antennas 20 of the mobile communication terminal.

The interference rejection combining processor 32 calculates, based on a reference signal vector (DM-RS vector) measured by the DM-RS vector measurer 226, an interference rejection combining reception weight matrix $W_{IRC}$ by use of a publically known method so as to reduce effects on desired beams of radio waves, transmitted from the desired base station, by another beam. The interference rejection combining reception weight matrix is an $N_{stream} \times N_{RX}$-dimensional matrix. $N_{stream}$ is the number of transmission layers transmitted from the desired base station to the mobile communication terminal.

The data signal separator 34 uses the interference rejection combining reception weight matrix calculated by the interference rejection combining processor 32, to separate, from among signals output from the radio receiver 22, data signals for this mobile communication terminal from data signals for another mobile communication terminal. The data signal demodulator 36 demodulates and decodes the data signals for the mobile communication terminal, which have been separated by the data signal separator 34, to obtain data signals.

The all received power estimator 38 estimates an all received power $\hat{P}_{S+I+N,n}$ expected when the interference rejection combining is implemented from an interference rejection combining reception weight matrix calculated by the interference rejection combining processor 32 and a DM-RS vector measured by the DM-RS vector measurer 226. The all received power is a sum of a desired signal power, an interference power, and a noise power expected from the DM-RS vector, and is estimated for each transmission stream. The subscript n denotes a transmission stream number.

Specifically, the all received power estimator 38 calculates an $N_{stream}$-dimensional estimate signal vector $\hat{s}$ in accordance with the following Equation (26):

$$\hat{s} = W_{IRC} y_{DM\text{-}RS} \qquad (26)$$

The all received power estimator 38 then extracts, from the estimate signal vector, an estimate signal $s_n$ for each transmission stream. The subscript n denotes a transmission stream number. The all received power estimator 38 calculates an all received power $\hat{P}_{S+I+N,n}$, for each transmission stream, expected when the interference rejection combining is implemented in accordance with the following Equation (27):

$$\hat{P}_{S+I+N,n} = |s_n|^2 \qquad (27)$$

The channel impulse matrix estimator 40 estimates, from signals derived from radio waves received by the reception antennas 20, an $N_{RX} \times N_{stream}$-dimensional channel impulse matrix of a DM-RS $H_{DM\text{-}RS}$ which is received from the desired base station. Specifically, the channel impulse matrix estimator 40 estimates, from the DM-RS vector $y_{DM\text{-}RS}$ measured by the DM-RS vector measurer 226, a channel impulse matrix thereof by use of a publically known method.

The desired reference signal power estimator 42 calculates, i.e., estimates, a desired reference signal power $\hat{P}_{S,n}$, for each transmission stream, expected when the interference rejection combining is implemented in accordance with the following Equation (28):

$$\hat{P}_{S,n} = |w_{IRC,n} H_{DM\text{-}RS} d_{1,DM\text{-}RS}|^2 \qquad (28)$$

where subscript n denotes a transmission stream number.

In Equation (28), $w_{IRC,n}$ is a row vector extracted relative to each transmission stream from the interference rejection combining reception weight matrix $W_{IRC}$ ($N_{stream} \times N_{RX}$-dimensional matrix) calculated by the interference rejection combining processor 32. Thus, this row vector is an interference rejection combining weight vector which is a part of the interference rejection combining reception weight matrix. The subscript n denotes a transmission stream number.

Thus, the desired reference signal power estimator 42 estimates a desired reference signal power expected when the interference rejection combining is implemented from an interference rejection combining weight vector, which is a part of the interference rejection combining reception weight matrix calculated by the interference rejection combining processor 32, a channel impulse matrix calculated by the channel impulse matrix estimator 40, and a DM-RS sequence identified by the DM-RS sequence identifier 225. In the present embodiment, the desired reference signal power estimator 42 estimates a desired reference signal power based on a DM-RS from a desired base station. Since DM-RSs are precoded in substantially the same way as for data signals, the desired reference signal power estimated by the desired reference signal power estimator 42 can be regarded as a desired data signal power.

The interference and noise power estimator 46 subtracts the desired reference signal power from the all received power, thereby estimating an interference and noise power relative to a DM-RS, the interference and noise power being expected when the interference rejection combining is implemented. That is, the interference and noise power estimator 46 calculates an interference and noise power $\hat{P}_{I+N,n}$ for each transmission stream in accordance with the following Equation (29):

$$\hat{P}_{I+N,n} = \hat{P}_{S+I+N,n} - \hat{P}_{S,n} \qquad (29)$$

The subscript n denotes a transmission stream number.

The SINR calculator 52 calculates a signal-to-interference-plus-noise ratio expected when the interference rejection combining is implemented, from the desired reference signal power (desired data signal power) estimated by the desired reference signal power estimator 42 and the interference and noise power estimated by the interference and noise power estimator 46. The SINR calculator 52 calculates, i.e., estimates, a signal-to-interference-plus-noise ratio SINR, expected when the interference rejection combining is implemented, for each transmission stream in accordance with the following Equation (30):

$$\text{SINR}_n = \hat{P}_{S,n} / \hat{P}_{I+N,n} \tag{30}$$

The subscript n denotes a transmission stream number.

The channel state information determiner 54 determines channel state information (CSI) from the signal-to-interference-plus-noise ratio $\text{SINR}_n$ calculated by the SINR calculator 52. As the channel state information, as described above, a set of a channel quality indicator (CQI), a precoding matrix indicator (PMI), and a rank indicator (RI) is known. The channel state information determiner 54 uses a publically known method to determine a CQI, PMI, and RI, to give a signal representing the CSI including the CQI, PMI, and RI, to the transmission signal generator 56.

The transmission signal generator 56 transmits, i.e., feeds the signal representing the CSI, back to the desired base station through the radio transmitter 58 and the transmission antenna 60. Thus, the transmission signal generator 56 serves as a channel state information transmitter.

The present embodiment estimates an all received power expected when the interference rejection combining is implemented, from an interference rejection combining reception weight matrix and a DM-RS vector, and estimates a desired reference signal power expected when the interference rejection combining is implemented, from an interference rejection combining weight vector, a channel impulse matrix, and a DM-RS sequence. An interference and noise power expected when the interference rejection combining is implemented is a difference between the all received power and the desired reference signal power. The interference rejection combining reception weight matrix and the channel impulse matrix could contain errors since they are obtained through estimation. In contrast, the DM-RS sequence is error free because it is a sequence corresponding to a desired base station to which the mobile communication terminal connects. Accordingly, an interference and noise power with small error is calculated. Although the interference and noise power fluctuates frequently and greatly, since such an interference and noise power with small error is calculated, the present invention can calculate a signal-to-interference-plus-noise ratio (SINR) expected when the interference rejection combining is implemented with a high degree of accuracy.

Since the calculated SINR is highly accurate, a base station is able to perform suitable adaptive modulation and user scheduling depending on channel quality information determined based on an SINR of a high degree of accuracy, and it is also possible to perform a suitable precoding depending on channel state information determined based on an SINR with a high degree of accuracy. Moreover, since the calculated SINR has a high degree of accuracy, a suitable handover could be performed if the SINR is used as an index for handover.

In the present embodiment, the DM-RS vector measurer 226 measures, as a reference signal vector, a demodulation reference signal vector (DM-RS vector), which is a vector representing a demodulation reference signal, and the all received power estimator 38 estimates an all received power based on the DM-RS vector measured by the DM-RS vector measurer 226. Also, the channel impulse matrix estimator 40 estimates a channel impulse matrix based on the DM-RS vector measured by the DM-RS vector measurer 226, and the desired reference signal power estimator 42 estimates a desired reference signal power from an interference rejection combining weight vector, a channel impulse matrix, and a DM-RS sequence identified by the DM-RS sequence identifier 225. An interference and noise power is a difference between the all received power and the desired reference signal power.

As shown in the mapping example of FIG. 2, since DM-RSs are transmitted at higher density (with shorter intervals) than CSI-RSs are transmitted, the use of a DM-RS vector and a DM-RS sequence for estimating an all received power including an interference power and a desired reference signal power enables an accurate and timely estimation of an interference and noise power.

In the first embodiment, the desired reference signal power estimator 42 estimates a desired reference signal power based on CRSs from a desired base station. Since the estimated desired reference signal power cannot be regarded as a desired data signal power, the first embodiment estimates a transmission weight matrix to be used for precoding at the desired base station and estimates a desired data signal power based on the estimated transmission weight matrix, and the SINR calculator 52 of the first embodiment calculates a signal-to-interference-plus-noise ratio based on the desired data signal power. In contrast, in the present embodiment, the desired reference signal power estimator 42 estimates a desired reference signal power based on DM-RSs from a desired base station. Since DM-RSs are precoded in substantially the same way as for data signals, the desired reference signal power estimated by the desired reference signal power estimator 42 can be regarded as a desired data signal power. The SINR calculator 52 calculates, from the desired reference signal power (desired data signal power) estimated by the desired reference signal power estimator 42 and the interference and noise power estimated by the interference and noise power estimator 46, a signal-to-interference-plus-noise ratio expected when the interference rejection combining is implemented. Therefore, in the present embodiment, estimation of a transmission weight matrix to be used for precoding at a desired base station and estimation of a desired data signal power based on the estimated transmission weight matrix are not necessary. Accordingly, the transmission weight vector estimator 48 and the desired data signal power estimator 50 of the first embodiment can be omitted.

Fifteenth Embodiment

Figure 22:
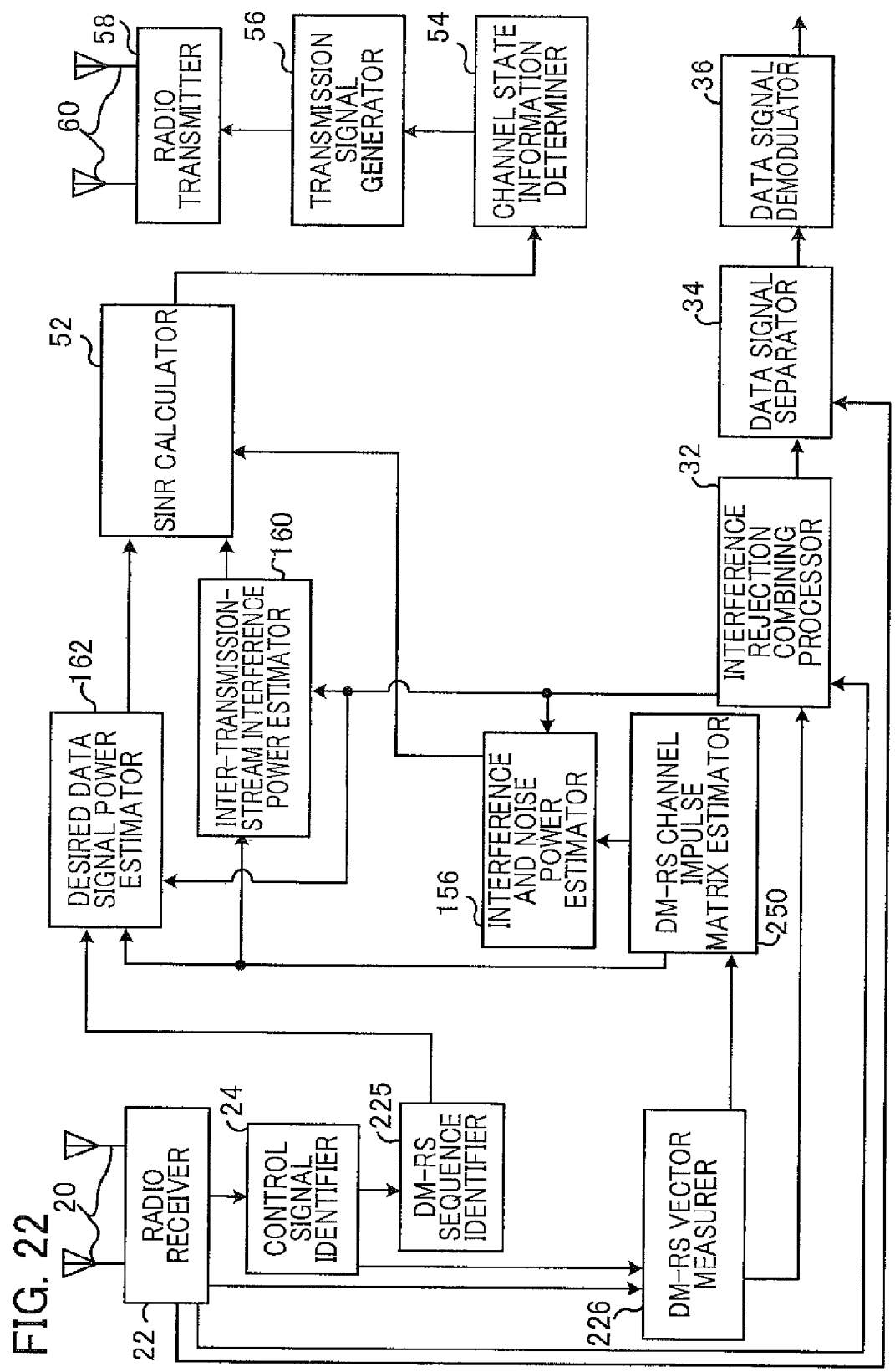
FIG. 22 is a block diagram showing a configuration of a mobile communication terminal according to each of fifteenth and sixteenth embodiments of the present invention.

FIG. 22 is a block diagram showing a configuration of a mobile communication terminal according to a fifteenth of the present invention. FIG. 22 simply shows signal reception related portions and signal transmission related portions alone, and other portions are not depicted therein. FIG. 22 uses the same reference symbols to indicate components that are the same in FIG. 18 (the tenth embodiment), and the following description omits detailed descriptions of these components in some cases.

As shown in FIG. 22, each mobile communication terminal has a DM-RS (demodulation reference signal) sequence identifier 225, a DM-RS (demodulation reference signal) vector measurer 226, and a demodulation reference signal (DM-RS) channel impulse matrix estimator 250. These components are functional blocks realized by a CPU, not shown, of the mobile communication terminal running and executing a computer program and functioning in accordance with the computer program. Unlike the tenth embodiment, mobile communication terminal according to the present embodiment does not have the transmission weight matrix supplier 158.

The DM-RS sequence identifier 225 (reference signal sequence identifier), based on the cell ID indicated by the control signals identified by the control signal identifier 24, identifies a demodulation reference signal sequence (DM-RS sequence) $d_{1,DM\text{-}RS}$ which is a sequence of a demodulation reference signal (DM-RS) transmitted from a desired base station. Specifically, from among a set of DM-RS sequences known to the mobile communication terminal, the DM-RS sequence identifier 225 selects a DM-RS sequence that corresponds to the cell ID.

Similar to the fourteenth embodiment, the DM-RS vector measurer 226 (reference signal vector measurer) measures a demodulation reference signal vector (DM-RS vector), which is a vector of a DM-RS transmitted from the desired base station. The interference rejection combining processor 32, based on the reference signal (DM-RS vector) measured by the DM-RS vector measurer 226, calculates an interference rejection combining reception weight matrix.

The DM-RS channel impulse matrix estimator 250 estimates, from signals derived from radio waves received by the reception antennas 20, two $N_{RX} \times N_{stream}$-dimensional channel impulse matrices (DM-RS channel impulse matrices) $H_{DM\text{-}RS,m}$ and $H_{DM\text{-}RS,m'}$ corresponding to two different resource elements of the DM-RS received from the desired base station.

Figure 23:
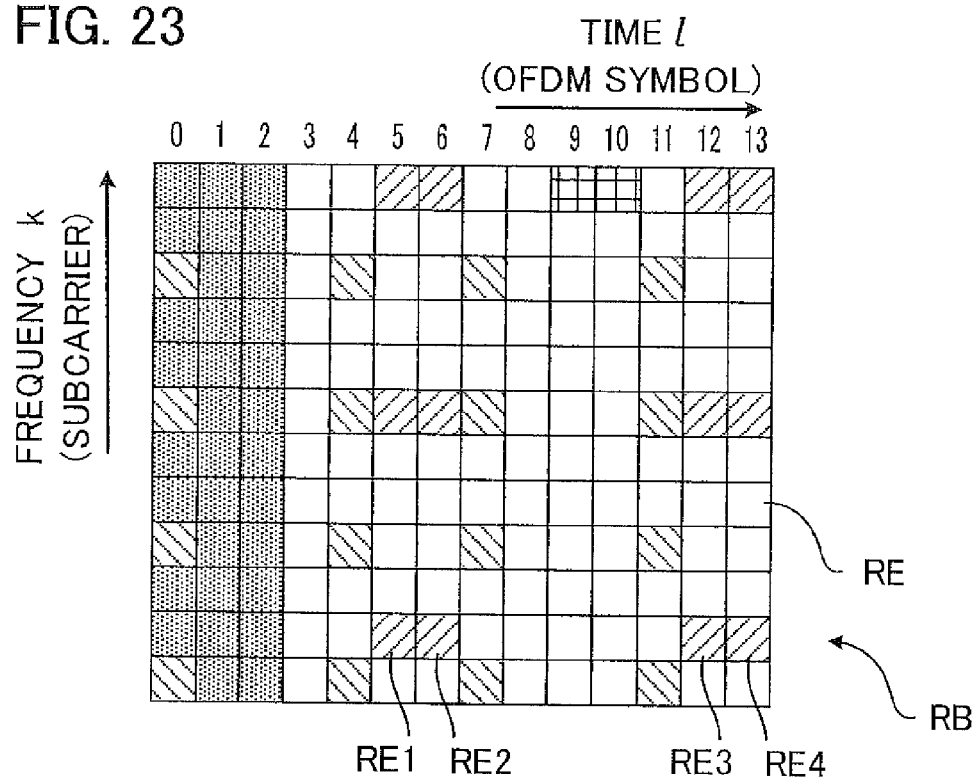
FIG. 23 is a block diagram showing an example mapping of various signals in a resource block of a downlink transmission.

Reference is made to FIG. 23 to describe the subscripts "m" and "m'". FIG. 23 is a diagram showing an example mapping of various signals in a resource block of a downlink transmission according to the LTE Advanced. As shown in FIG. 23, DM-RSs are transmitted using two consecutive resource elements (e.g., resource elements RE1 and RE2) in each of some subcarriers. However, in the two consecutive resource elements, the first resource element corresponds to a transmission layer 1; and the last resource element corresponds to a transmission layer 2. For example, the resource elements RE1 and RE3 each correspond to the transmission layer 1; and the resource elements RE2 and RE4 each correspond to the transmission layer 2. The subscripts "m" and "m'" denote numbers for different resource elements RE corresponding to one of the transmission layers. For example, the subscript "m" denotes a number for the resource element RE1 shown in FIG. 23, and the subscript "m'" denotes a number for the resource element RE3 shown in FIG. 23. The subscript "m" may be a number for the resource element RE2 shown in FIG. 23, and the subscript "m'" may be a number for the resource element RE4 shown in FIG. 23. The resource elements used are not limited to the depicted example, but are those with the same frequency (same subcarrier) and are close to each other in the time direction as much as possible (close OFDM symbols).

The interference and noise power estimator 156 estimates an interference and noise power expected when the interference rejection combining is implemented, from the interference rejection combining reception weight matrix obtained by the interference rejection combining processor 32 and a plurality of channel impulse vectors, each of which is a part of respective ones of the plurality of channel impulse matrices obtained by the DM-RS channel impulse matrix estimator 250. That is, the interference and noise power estimator 156 calculates an interference and noise power $\hat{P}_{I+N,n}$ for each transmission stream in accordance with the following Equation (31):

$$\hat{P}_{I+N,n} = \tfrac{1}{2} w_{IRC,m,n}(h_{DM\text{-}RS,m,a} - h_{DM\text{-}RS,m',a})|^2 \qquad (31)$$

The subscript n denotes a transmission stream number.

$w_{IRC,m,n}$ is a row vector ($N_{RX}$-dimension) extracted for every transmission stream from the interference rejection combining reception weight matrix $w_{IRC,m}$ ($N_{stream} \times N_{RX}$-dimensional matrix) calculated by the interference rejection combining processor 32 and based on a DM-RS vector of a resource element with the number m. Thus, this row vector is an interference rejection combining weight vector which is a part of the interference rejection combining reception weight matrix. The subscript n denotes a transmission stream number. The interference rejection combining reception weight matrix is based on the DM-RS vector.

$h_{DM\text{-}RS,m,a}$ is a column vector ($N_{RX}$-dimension) extracted for each antenna port number "a", from the DM-RS channel impulse matrix $H_{DM\text{-}RS,m}$ ($N_{RX} \times N_{stream}$-dimensional matrix) calculated by the DM-RS channel impulse matrix estimator 250. In other words, this column vector is a channel impulse vector that is a part of the DM-RS channel impulse matrix. A DM-RS is transmitted from a plurality of transmission antenna ports of a base station (cell). The subscript "a" denotes an antenna port number of a base station from which the DM-RS is transmitted. Thus, "a" is 1 or 2.

$h_{DM\text{-}RS,m',a}$ is a column vector ($N_{RX}$-dimension) extracted for each antenna port number "a", from the DM-RS channel impulse matrix $H_{DM\text{-}RS,m'}$ ($N_{RX} \times N_{stream}$-dimensional matrix) calculated by the DM-RS channel impulse matrix estimator 250. That is, this column vector is a channel impulse vector which is a part of the DM-RS channel impulse matrix.

The inter-transmission-stream interference power estimator 160, from the interference rejection combining weight vector being a part of the interference rejection combining reception weight matrix and the DM-RS channel impulse matrix estimated by the DM-RS channel impulse matrix estimator 250, estimates an inter-transmission-stream interference power that is transmitted from the desired base station and is expected when the interference rejection combining is implemented. That is, the inter-transmission-stream interference power estimator 160 calculates an inter-transmission-stream interference power $\hat{P}_{Layer,n}$ for each transmission stream in accordance with the following Equation (32):

$$\hat{P}_{Layer,n} = \sum_{n'=1, n' \neq n}^{N_{Stream}} |w_{IRC,p,n} H_{DM-RS,p}|^2 \qquad (32)$$

The subscript n denotes a transmission stream number.

$w_{IRC,p,n}$ is an $N_{RX}$-dimensional row vector (interference rejection combining weight vector) extracted for each transmission stream from the interference rejection combining reception weight matrix ($N_{stream} \times N_{RX}$-dimensional matrix) calculated by the interference rejection combining processor 32 and is based on a DM-RS vector of a resource element with a number p.

$H_{DM\text{-}RS,p}$ is a DM-RS channel impulse matrix calculated by the DM-RS channel impulse matrix estimator 250, the matrix corresponding to the DM-RS vector of the resource element with the number p.

The desired data signal power estimator 162 estimates, from the interference rejection combining weight vector, the DM-RS channel impulse matrix estimated by the DM-RS channel impulse matrix estimator 250, and the DM-RS sequence identified by the DM-RS sequence identifier 225, a desired data signal power expected when the interference rejection combining is implemented. The desired data signal power estimator 162 calculates a desired data signal power $\hat{P}_{S,n}{}'$ for each transmission stream in accordance with the following Equation (33):

$$\hat{P}_{S,n}{}' = |w_{IRC,p,n} H_{DM-RS,p} d_{1,DM-RS}|^2 \quad (33)$$

The subscript n denotes a transmission stream number.

The SINR calculator 52 calculates a signal-to-interference-plus-noise ratio expected when the interference rejection combining is implemented, from the desired data signal power estimated by the desired data signal power estimator 162, the interference and noise power estimated by the interference and noise power estimator 156, and the inter-transmission-stream interference power estimated by the inter-transmission-stream interference power estimator 160. That is, the SINR calculator 52 calculates, i.e., estimates, a signal-to-interference-plus-noise ratio $SINR_n$ that is expected when the interference rejection combining is implemented, for each transmission stream, in accordance with the following Equation (34):

$$SINR_n = \hat{P}_{S,n}{}' / (\hat{P}_{I+N,n} + \hat{P}_{Layer,n}) \quad (34)$$

The subscript n denotes a transmission stream number.

An operation will be explained for calculating a signal-to-interference-plus-noise ratio $SINR_n$ by the mobile communication terminal according to the present embodiment. The interference and noise power estimator 156 first calculates, in accordance with the above Equation (31) an interference and noise power corresponding to the resource element number m for each transmission stream (Step 1). The inter-transmission-stream interference power estimator 160 next calculates, in accordance with the above Equation (32) an inter-transmission-stream interference power corresponding to the resource element number p for each transmission stream (Step 2). The desired data signal power estimator 162 then calculates, in accordance with the above Equation (33) a desired data signal power corresponding to the resource element number p for each transmission stream (Step 3). Moreover, the SINR calculator 52 calculates, in accordance with the above Equation (34) a signal-to-interference-plus-noise ratio $SINR_n$ for each transmission stream (Step 4).

After completing Step 4, the channel state information determiner 54 determines channel state information (CSI) from the signal-to-interference-plus-noise ratio $SINR_n$ output from the SINR calculator 52.

The signal-to-interference-plus-noise ratio $SINR_n$ obtained in the foregoing operation corresponds to a particular resource element (with the number m) and a particular resource element (with the number p). The mobile communication terminal may calculate an average signal-to-interference-plus-noise ratio SINR, over a plurality of resource elements, to determine the channel state information by using the average signal-to-interference-plus-noise ratio SINR. For example, at Step 1, the interference and noise power estimator 156 may, relative to a plurality of resource elements (the resource element with the number m and a resource element with another number), apply Equation (31) to calculate a plurality of interference and noise powers and take an average of the interference and noise powers. At Step 2, the inter-transmission-stream interference power estimator 160 may, relative to a plurality of resource elements (the resource element with the number p and a resource element with another number), apply Equation (32), to calculate a plurality of inter-transmission-stream interference powers and take an average of the inter-transmission-stream interference powers. At Step 3, the desired data signal power estimator 162 may, relative to a plurality of resource elements (the resource element with the number p and a resource element with another number), apply Equation (33), to calculate a plurality of desired data signal powers and take an average of the desired data signal powers. At Step 4, the SINR calculator 52 may calculate a signal-to-interference-plus-noise ratio from the average desired data signal power, the average interference and noise power, and the average inter-transmission-stream interference power.

In the present embodiment, the DM-RS channel impulse matrix estimator 250 estimates a plurality of channel impulse matrices corresponding to different resource elements of a DM-RS, and the interference and noise power estimator 156, based on a plurality of channel impulse vectors, each of which is a part of respective ones of the plurality of channel impulse matrices, estimates an interference and noise power expected when the interference rejection combining is implemented. Where different resource elements are in the same frequency (same subcarrier) and are also close to each other in the time direction (close OFDM symbols), the channel characteristics for these resource elements are substantially the same, and the difference between a plurality of channel impulse matrices derived from the resource elements is probably caused by the interference and noise. Accordingly, an interference and noise power can be estimated with a high degree of accuracy based on a plurality of channel impulse vectors derived from these resource elements. Thus estimating an interference and noise power with small error enables highly accurate calculation of a signal-to-interference-plus-noise ratio (SINR) expected when the interference rejection combining is implemented.

Since the calculated SINR is highly accurate, a base station is able to perform suitable adaptive modulation and user scheduling depending on channel quality information determined based on an SINR of a high degree of accuracy, and is also possible to perform a suitable precoding depending on channel state information determined based on an SINR with a high degree of accuracy. Moreover, since the calculated SINR has a high degree of accuracy, a suitable handover could be performed if the SINR is used as an index for handover.

In the tenth embodiment, various processings are performed based on CRSs from a desired base station. Since CRSs are not precoded in the same way as for data signals, the tenth embodiment uses a transmission weight matrix candidate to be used for precoding at the desired base station to estimate a desired data signal power, and the SINR calculator 52 of the tenth embodiment calculates a signal-to-interference-plus-noise ratio based on the desired data signal power. Moreover, the process of calculating a signal-to-interference-plus-noise ratio is repeated for a plurality of transmission weight matrix candidates, and the highest signal-to-interference-plus-noise ratio is selected. In contrast, in the present embodiment, various processings are performed based on DM-RSs from a desired base station. Since DM-RSs are precoded in substantially the same way as for data signals, a desired data signal power can be readily calculated. Therefore, repeating the process of calculating a signal-to-interference-plus-noise ratio for a plurality of transmission weight matrix candidates is not necessary.

Accordingly, the transmission weight matrix supplier 158 of the tenth embodiment can be omitted.

Sixteenth Embodiment

The mobile communication terminal according to a sixteenth embodiment of the present invention has the same configuration as that of the fifteenth embodiment. The fifteenth embodiment uses Equation (31) at Step 1, whereas the present embodiment uses the following Equation (35) in Step 1. That is, the interference and noise power estimator 156 calculates an interference and noise power $\hat{P}_{I+N,n}$ for each transmission stream in accordance with the following Equation (35):

$$\hat{P}_{I+N,n} = \frac{1}{2}|(w_{IRC,m,n}h_{DM-RS,m,a} - w_{IRC,m',n}h_{DM-RS,m',a})| \quad (35)$$

The subscript n denotes a transmission stream number.

In Equation (35), $w_{IRC,m',n}$ is a row vector ($N_{RX}$-dimension) extracted for each transmission stream from the interference rejection combining reception weight matrix $W_{IRC,m'}$ ($N_{stream} \times N_{RX}$-dimensional matrix) calculated by the interference rejection combining processor 32 and based on the DM-RS vector of a resource element with the number m'. Thus, this row vector is an interference rejection combining weight vector which is a part of the interference rejection combining reception weight matrix. The subscript n denotes a transmission stream number. The interference rejection combining reception weight matrix is calculated based on the DM-RS vector. The other variables of Equation (35) are as described in relation to Equation (31).

The other features are the same as those of the fifteenth embodiment. An operation will be explained for calculating a signal-to-interference-plus-noise ratio $SINR_n$ by the mobile communication terminal according to the present embodiment. The interference and noise power estimator 156 first calculates, in accordance with the above Equation (35) an interference and noise power corresponding to the resource element number m for each transmission stream (Step 1). The inter-transmission-stream interference power estimator 160 next calculates, in accordance with the above Equation (32) an inter-transmission-stream interference power corresponding to the resource element number p for each transmission stream (Step 2). The desired data signal power estimator 162 then calculates, in accordance with the above Equation (33) a desired data signal power corresponding to the resource element number p for each transmission stream (Step 3). Moreover, the SINR calculator 52 calculates, in accordance with the above Equation (34) a signal-to-interference-plus-noise ratio $SINR_n$ for each transmission stream (Step 4).

After completing Step 4, the channel state information determiner 54 determines channel state information (CSI) from the signal-to-interference-plus-noise ratio $SINR_n$ of the highest value output from the SINR calculator 52.

Similar to the fifteenth embodiment, the mobile communication terminal may calculate a highest value of average signal-to-interference-plus-noise ratios $SINR_n$ over a plurality of resource elements, to use the highest average value to determine the channel state information. The present embodiment can achieve the same effects as those of the fifteenth embodiment.

The above seventh to ninth embodiments each can be combined with any one of the fourteenth to the sixteenth embodiments.

Seventeenth Embodiment

The mobile communication terminal according to a seventeenth embodiment uses a highly accurate signal-to-interference-plus-noise ratio that is obtained by one of the above first to sixth and tenth to sixteenth embodiments, to execute the successive interference cancellation (SIC).

Figure 24:
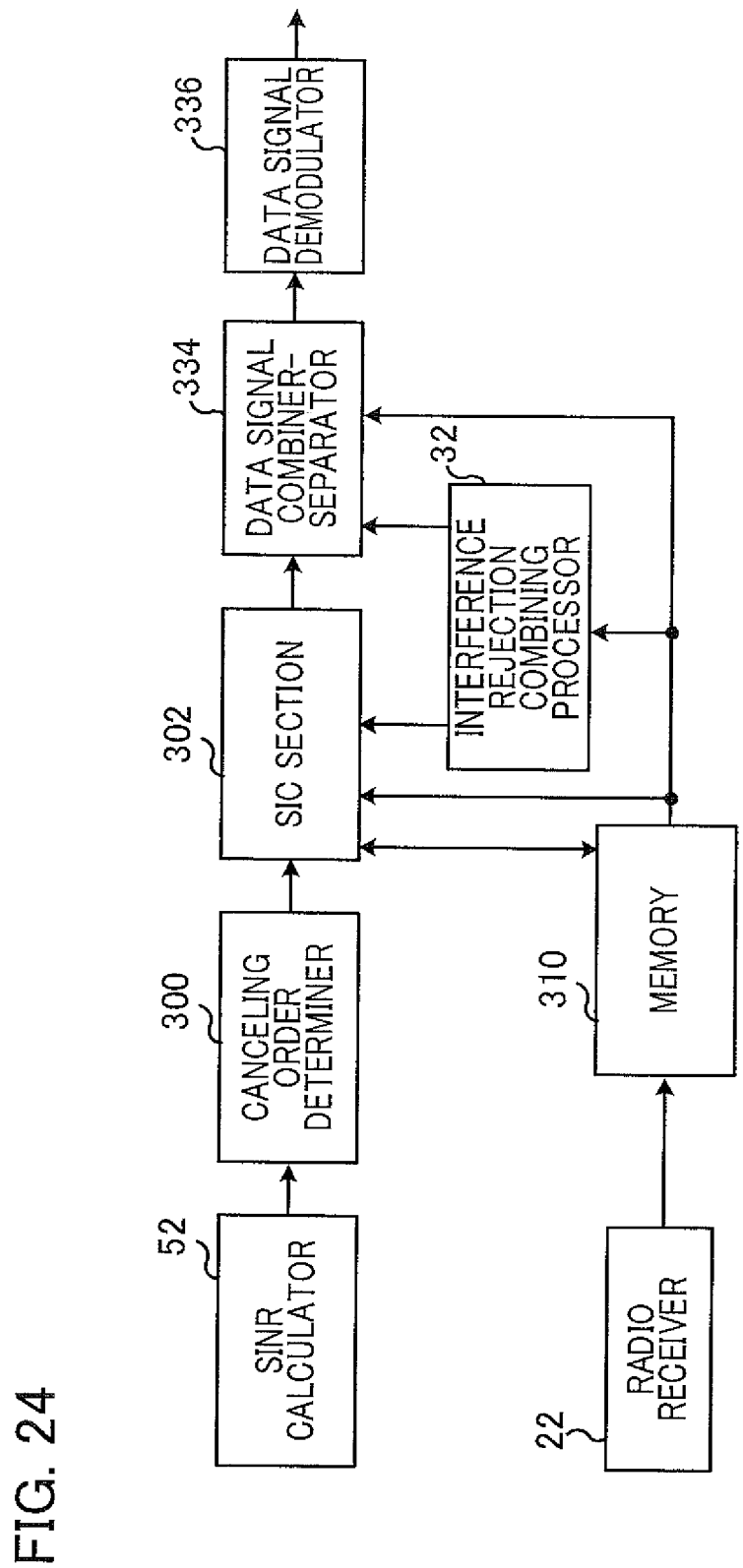
FIG. 24 is a block diagram showing a partial configuration of a mobile communication terminal according to a seventeenth embodiment of the present invention.

FIG. 24 is a block diagram showing a partial configuration of a mobile communication terminal according to the seventeenth embodiment of the present invention. The mobile communication terminal according to the seventeenth embodiment has substantially the same configuration as one of the first to sixth and tenth to sixteenth embodiments, and further has a canceling order determiner 300, a SIC section (successive interference canceller) 302, a memory 310, a data signal combiner-separator 334, and a data signal demodulator 336. FIG. 24 simply shows, from among the components of the above embodiments, the radio receiver 22, the SINR calculator 52, and the interference rejection combining processor 32 alone. The data signal separator 34 and the data signal demodulator 36 are not necessary from among the components of the above embodiments.

The SIC section 302 demodulates an interfering data signal from an interfering base station to generate an interference replica, and cancels an interference replica from a received signal derived from radio waves received at the plurality of reception antennas 20, the received signal being output from the radio receiver 22, to extract a desired data signal from a desired base station. More specifically, the SIC section 302 repeats, regardless of a desired data signal or an interfering data signal, demodulating a data signal having a higher SINR with higher priority, thereby generating a data signal replica, and canceling the data signal replica generated through the demodulation from the received signal (where a desired data signal and an interfering data signal are mixed). When all data signals are demodulated and all interference replicas are obtained, the SIC section 302 cancels all the interference replicas from the received signals, to extract desired data signals. Whether the demodulated data signal replica is one for a desired data signal or one for an interfering data signal can be determined based on the cell ID of a control signal transmitted from a base station.

Received signals output from the radio receiver 22 are stored in the memory 310 for the SIC operation at the SIC section 302. Results of the calculation such as interference replicas obtained by the SIC section 302 are also stored in the memory 310.

The SINR of desired data signals and the SINR of interfering data signals are used to decide an order of demodulation and cancellation of data signals at the SIC section 302. For this reason, the SINR calculator 52 calculates SINRs expected when the interference rejection combining is implemented not only for desired data signals but also for interfering data signals. In the above other embodiments, the SINR calculator 52 calculates SINRs expected when the interference rejection combining is implemented for desired data signals, but in the present embodiment, calculates SINRs expected when the interference rejection combining is implemented for interfering data signals also.

The interference rejection combining for interfering data signals is executed assuming actual interfering data signals to be desired data signals and also assuming actual desired data signals to be interfering data signals. Therefore, those components not shown in FIG. 24 also treat signals from an actual interfering base station as signals from a desired base station. Where the present embodiment uses the configuration of the fourteenth embodiment shown in FIG. 21, the DM-RS sequence identifier 225 identifies a DM-RS sequence transmitted from an interfering base station, and the DM-RS vector measurer 226 measures a DM-RS vector transmitted from the interfering base station. The interference rejection combining processor 32, based on the DM-RS vector of the interfering base station, calculates an interference rejection combining reception weight matrix so as to reduce effects on interfering beams of radio waves transmitted from the interfering base station by other beams (including actually desired beams). The all received power estimator 38, from the interference rejection combining reception weight matrix calculated by the interference rejection combining processor 32 and the DM-RS vector measured by the DM-RS vector measurer 226, estimates an all received power from the interfering base station expected when the interference rejection combining is implemented relative to the interfering data signal. The channel impulse matrix estimator 40 estimates a channel impulse matrix of a DM-RS received from the interfering base station. The desired reference signal power estimator 42 calculates, i.e., estimates, a reference signal power (a power of the DM-RS from the interfering base station) for each transmission stream, expected when the interference rejection combining is implemented relative to interfering data signals. The power of the DM-RS received from the interfering base station can be regarded as an interfering data signal power. The interference and noise power estimator 46 subtracts the reference signal power from the interfering base station, from the all received power from the interfering base station, thereby to estimate an interference and noise power with respect to the DM-RS received from the interfering base station expected when the interference rejection combining is implemented relative to interfering data signals. The SINR calculator 52 calculates, from the reference signal power (interfering data signal power) estimated by the desired reference signal power estimator 42 and the interference and noise power estimated by the interference and noise power estimator 46, a signal-to-interference-plus-noise ratio expected when the interference rejection combining is implemented relative to interfering data signals.

Also, when the present embodiment uses one of the embodiments other than the fourteenth embodiment, the present embodiment treats a signal from an actual interfering base station as a signal from a desired base station. Although the detailed description thereof is omitted herein, this will be understood by those skilled in the art.

The canceling order determiner 300 determines an order of demodulation and cancellation of data signals at the SIC section 302 based on the SINR with regard to desired data signals and the SINR with regard to interfering data signals calculated by the SINR calculator 52. The SIC section 302, in accordance with the order determined by the canceling order determiner 300, executes data signal demodulation and cancellation. A SIC operation at the SIC section 302 uses the interference rejection combining reception weight matrix for desired data signals and the interference rejection combining reception weight matrix for interfering data signals generated by the interference rejection combining processor 32.

The data signal combiner-separator 334 performs a combining or separation process of a desired data signal output from the SIC section 302. Specifically, the data signal combiner-separator 334 performs signal combining when the number of transmission streams of the desired data signal is 1, and performs signal separation when the number of transmission streams of the desired data signal is 2. The combining or separation process uses the interference rejection combining reception weight matrix for desired data signals generated by the interference rejection combining processor 32. The data signal demodulator 336 demodulates and decodes a data signal destined for the mobile communication terminal, the data signal being output from the data signal combiner-separator 334, to obtain the data signal.

A specific operation of the mobile communication terminal will now be described. For simplicity, we assume that the mobile communication terminal receives interfering signals from two interfering base stations (hereinafter referred to as a first interfering base station and a second interfering base station).

A received signal output from the radio receiver 22 is first stored in the memory 310. The mobile communication terminal then executes channel estimation relative to base stations, and the interference rejection combining processor 32 calculates, from channel estimation results, an interference rejection combining reception weight matrix relative to each base station.

The SINR calculator 52 calculates SINRs relative to the respective base stations. The canceling order determiner 300, based on the SINRs relative to the base stations, determines an order of data signal demodulation and cancellation at the SIC section 302, such that a data signal having a higher SINR is demodulated and canceled with priority. The SIC section 302 executes the data signal demodulation and cancellation in accordance with the order determined by the canceling order determiner 300.

For example, a case is assumed in which an SINR for the desired data signal is the highest, that an SINR for a first interfering data signal from the first interfering base station is the second highest, and an SINR for a second interfering data signal from the second interfering base station is the lowest. In this case, the desired data signal having the highest SINR is first demodulated and canceled. The SIC section 302 weights the received signal with an interference rejection combining reception weight matrix generated for the desired data signal by the interference rejection combining processor 32, demodulates the desired data signal from the weighted signal, and generates a replica of the desired data signal. The SIC section 302 cancels the desired data signal replica from the received signal stored in the memory 310, to store a result of cancellation in the memory 310.

The first interfering data signal for which the SINR is the second highest is subsequently demodulated and canceled. The SIC section 302 weights the cancellation result stored in the memory 310 with an interference rejection combining reception weight matrix generated for the first interfering data signal by the interference rejection combining processor 32, demodulates the first interfering data signal from the weighted cancellation result, and generates a replica of the first interfering data signal. The SIC section 302 cancels the first interfering data signal replica from the cancellation result stored in the memory 310, to store a result of cancellation (corresponding to the second interfering data signal) and the first interfering data signal replica in the memory 310.

The second interfering data signal for which the SINR is the lowest is subsequently demodulated and canceled. The SIC section 302 weights the cancellation result (corresponding to the second interfering data signal) stored in the memory 310 with an interference rejection combining reception weight matrix generated for the second interfering data signal by the interference rejection combining processor 32, demodulates the second interfering data signal from the weighted cancellation result, and generates a replica of the second interfering data signal. The SIC section 302 then stores the second interfering data signal replica in the memory 310.

The first and second interfering data signal replicas are thus obtained. The SIC section 302 cancels the first interfering data signal replica and the second interfering data signal replica from the received signal stored in the memory 310, thereby extracting the desired data signal.

The data signal combiner-separator 334 performs a combining or separation process of the desired data signal, and the data signal demodulator 336 demodulates and decodes the data signal, to obtain the data signal.

When the SINR of the first interfering data signal of the first interfering base station is the highest because the mobile communication terminal is near the boundary of a desired cell and when the SINR of the desired data signal is the second highest, the first interfering data signal is first demodulated and canceled, and a replica of the first interfering data signal is first generated. The desired data signal is then demodulated and canceled, and a replica of the desired data signal is generated. In any case, once every data signal is demodulated and all interference replicas therefor are obtained, the SIC section 302 cancels all the interference replicas from the received signal, to extract a desired data signal.

Since the present embodiment uses a highly accurate signal-to-interference-plus-noise ratio relative to each data signal calculated by the SINR calculator 52, the data signal demodulation and cancellation is executed in an appropriate order. In the present embodiment, even if the SIC section 302 once demodulates a desired data signal, it demodulates interfering data signals until it obtains all interfering data signal replicas and cancels all the interfering data signals replicas from the received signal, to extract a desired data signal. Therefore, the extracted desired data signal is highly accurate.

Eighteenth Embodiment

Figure 25:
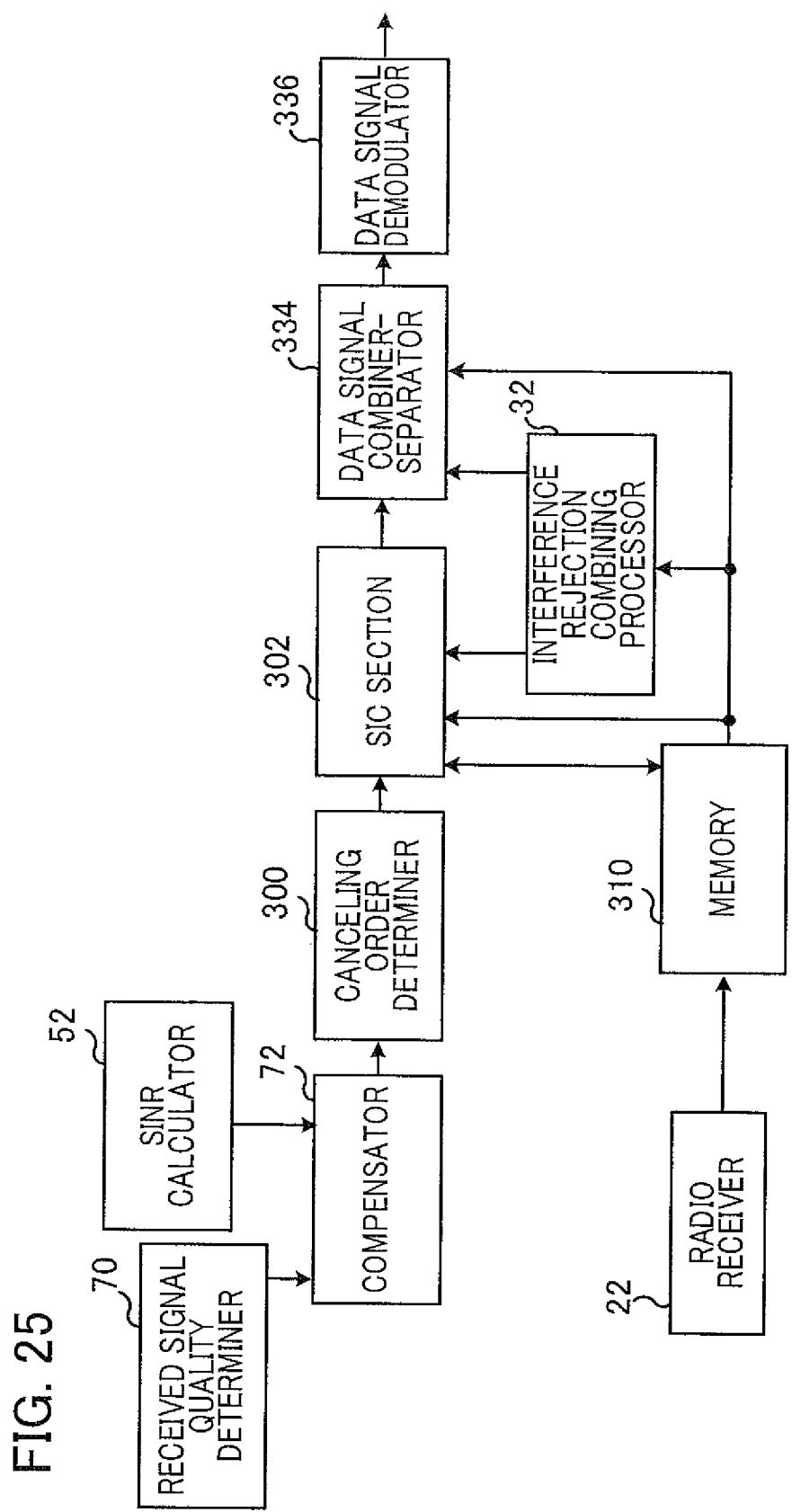
FIG. 25 is a block diagram showing a partial configuration of a mobile communication terminal according to an eighteenth embodiment of the present invention.

FIG. 25 is a block diagram showing a partial configuration of a mobile communication terminal according to an eighteenth embodiment of the present invention. The mobile communication terminal according to the eighteenth embodiment has substantially the same configuration as the seventeenth embodiment, and further has a received signal quality determiner 70 and a compensator 72. FIG. 25 uses the same reference symbols to indicate components that are the same in FIG. 24, and the following description omits detailed descriptions of these components.

The received signal quality determiner 70 and the compensator 72 are the same as the received signal quality determiner 70 and the compensator 72 according to the seventh to the ninth embodiments. The compensator 72, based on received signal qualities measured or calculated by the received signal quality determiner 70, compensates for SINRs calculated by the SINR calculator 52, to supply the compensated SINRs to the canceling order determiner 300. Similar to the seventeenth embodiment, the SINR calculator 52 calculates not only SINRs expected when the interference rejection combining is implemented for desired data signals but also SINRs expected when the interference rejection combining is implemented for interfering data signals. The compensator 72 compensates for these SINRs, to supply the compensated SINR to the canceling order determiner 300.

Alternatively, the compensator 72 may compensate for, based on received signal qualities measured or calculated by the received signal quality determiner 70, interference and noise powers estimated by the interference and noise power estimator 46 (e.g., refer to FIG. 15), to supply the compensated interference and noise powers to the SINR calculator 52. In this case, the interference and noise power estimator 46 calculates not only the interference and noise power for desired data signals but also the interference and noise power for interfering data signals. The compensator 72 compensates for these interference and noise powers, to supply the compensated interference and noise powers to the SINR calculator 52. The SINR calculator 52 calculates not only SINRs expected when the interference rejection combining is implemented for desired data signals but also SINRs expected when the interference rejection combining is implemented for interfering data signals.

In any case, in the present embodiment, SINRs with even higher degree of accuracy can be calculated for the same reasons described above in relation to the seventh to the ninth embodiments. The present embodiment can achieve the same effects as those of the seventeenth embodiment. Moreover, the canceling order determiner 300 uses even more accurate SINRs for determining an order of data signal demodulation and cancellation. Therefore, the demodulation and cancellation can be performed in a more appropriate order.

Other Modifications

Functions executed by a CPU at a mobile communication terminal may be executed by hardware or by a programmable logic device such as an FPGA (Field Programmable Gate Array) and a DSP (Digital Signal Processor) instead of by a CPU.

The above embodiments and modifications can be combined as long as they do not contradict one another.

DESCRIPTION OF REFERENCE SIGNS

1, 2, 3, 4 base station
1a,2a,3a,4a cell area
10 mobile communication terminal
20 reception antenna
22 radio receiver,
24 control signal identifier,
25 cell-specific reference signal (CRS) sequence identifier (reference signal sequence identifier)
26 cell-specific reference signal (CRS) vector measurer (reference signal vector measurer)
32 interference rejection combining processor
34 data signal separator
36 data signal demodulator
38 all received power estimator
40 channel impulse matrix estimator
42 desired reference signal power estimator
46 interference and noise power estimator
48 transmission weight vector estimator
50 desired data signal power estimator
52 signal-to-interference-plus-noise ratio (SINR) calculator
54 channel state information determiner
56 transmission signal generator (channel state information transmitter),
58 radio transmitter
60 transmission antenna
70 received signal quality determiner
72 compensator
125 CSI-RS (channel state information reference signal) sequence identifier (reference signal sequence identifier),
126 CSI-RS vector measurer (reference signal vector measurer)
138 all received signal component estimator
142 desired reference signal component estimator 150 cell-specific reference signal (CRS) channel impulse matrix estimator
156 interference and noise power estimator
158 transmission weight matrix supplier
160 inter-transmission-stream interference power estimator
162 desired data signal power estimator
170 CSI-RS (channel state information reference signal) channel impulse matrix estimator
225 DM-RS (demodulation reference signal) sequence identifier (reference signal sequence identifier)
226 DM-RS vector measurer (reference signal vector measurer)
250 demodulation reference signal (DM-RS) channel impulse matrix estimator
300 canceling order determiner
302 SIC section (successive interference canceller)
334 data signal combiner-separator
336 data signal demodulator

The invention claimed is:

1. A mobile communication terminal for receiving a downlink signal from a desired base station by an orthogonal frequency-division multiple access, the mobile communication terminal comprising:
   a plurality of reception antennas for receiving radio waves;
   a reference signal vector measurer configured to measure a reference signal vector being a vector representing a reference signal transmitted from the desired base station;
   an interference rejection combining processor configured to calculate an interference rejection combining reception weight matrix based on the reference signal vector measured by the reference signal vector measurer so as to reduce effects on a desired beam by another beam, wherein the desired beam is a beam of radio waves transmitted from the desired base station;
   an all received power estimator configured to estimate an all received power expected when an interference rejection combining is implemented, the all received power being estimated from the interference rejection combining reception weight matrix and the reference signal vector measured by the reference signal vector measurer;
   a channel impulse matrix estimator configured to estimate a channel impulse matrix from a signal derived from the radio waves received by the reception antennas;
   a desired reference signal power estimator configured to estimate a desired reference signal power expected when the interference rejection combining is implemented, the desired reference signal power being estimated from an interference rejection combining weight vector being a part of the interference rejection combining reception weight matrix, the channel impulse matrix, and a reference signal sequence being a sequence of the reference signal or of another reference signal;
   an interference and noise power estimator configured to estimate an interference and noise power expected when the interference rejection combining is implemented, the interference and noise power being estimated by subtracting the desired reference signal power from the all received power;
   a transmission weight vector estimator configured to estimate a transmission weight vector, from the channel impulse matrix, to be used for precoding performed at the desired base station;
   a desired data signal power estimator configured to estimate a desired data signal power expected when the interference rejection combining is implemented, the desired data signal power being estimated from the interference rejection combining weight vector, the channel impulse matrix, and the transmission weight vector; and
   a signal-to-interference-plus-noise ratio calculator configured to calculate a signal-to-interference-plus-noise ratio expected when the interference rejection combining is implemented, the signal-to-interference-plus-noise ratio being calculated from the desired data signal power and the interference and noise power.

2. The mobile communication terminal according to claim 1,
   wherein the reference signal vector measurer is configured to measure, as the reference signal vector, a cell-specific reference signal vector being a vector representing a cell-specific reference signal.

3. The mobile communication terminal according to claim 2,
   wherein the channel impulse matrix estimator is configured to estimate the channel impulse matrix based on the cell-specific reference signal vector measured by the reference signal vector measurer, and
   wherein the desired reference signal power estimator is configured to estimate the desired reference signal power from the interference rejection combining weight vector, the channel impulse matrix, and a sequence of the cell-specific reference signal.

4. The mobile communication terminal according to claim 2, further comprising:
   a channel state information reference signal vector measurer configured to measure a channel state information reference signal vector being a vector representing a channel state information reference signal transmitted from the desired base station,
   wherein the channel impulse matrix estimator is configured to estimate the channel impulse matrix based on the channel state information reference signal vector measured by the channel state information reference signal vector measurer, and
   wherein the desired reference signal power estimator is configured to estimate the desired reference signal power from the interference rejection combining weight vector, the channel impulse matrix, and a sequence of the channel state information reference signal.

5. The mobile communication terminal according to claim 1,
   wherein the reference signal vector measurer is configured to measure, as the reference signal vector, a channel state information reference signal vector being a vector representing a channel state information reference signal,
   wherein the channel impulse matrix estimator is configured to estimate the channel impulse matrix based on the channel state information reference signal vector measured by the reference signal vector measurer, and
   wherein the desired reference signal power estimator is configured to estimate the desired reference signal power from the interference rejection combining weight vector, the channel impulse matrix, and a sequence of the channel state information reference signal.

6. The mobile communication terminal according to claim 1, further comprising:
- a received signal quality determiner configured to measure or calculate received signal qualities for radio waves received from a plurality of base stations; and
- a compensator configured to, based on the received signal quality, compensate for the signal-to-interference-plus-noise ratio calculated at the signal-to-interference-plus-noise ratio calculator or the interference and noise power estimated by the interference and noise power estimator.

7. The mobile communication terminal according to claim 6,
- wherein the received signal quality determiner is configured to measure, as the received signal qualities, a plurality of reference signal reception powers of reference signals received from the base stations, and
- wherein the compensator is configured to, based on a difference between a second highest reference signal reception power and a third highest reference signal reception power from among the reference signal reception powers, increase the signal-to-interference-plus-noise ratio such that, when the difference is great, an increase in the signal-to-interference-plus-noise ratio is great.

8. The mobile communication terminal according to claim 6,
- wherein the received signal quality determiner is configured to calculate, as the received signal qualities, a non-interference-rejection-combining signal-to-interference-plus-noise ratio being a signal-to-interference-plus-noise ratio expected when the interference rejection combining is not implemented, and
- wherein the compensator is configured to increase the signal-to-interference-plus-noise ratio such that, when the non-interference-rejection-combining signal-to-interference-plus-noise ratio is small, an increase in the signal-to-interference-plus-noise ratio is great.

9. The mobile communication terminal according to claim 6,
- wherein the received signal quality determiner is configured to measure, as the received signal qualities, a plurality of reference signal reception powers of reference signals received from the base stations, and
- wherein, the compensator is configured to decrease the interference and noise power based on a second highest reference signal reception power and a third highest reference signal reception power from among the reference signal reception powers, such that, when a difference between the second highest reference signal reception power and the third highest reference signal reception power is great, a decrease in the interference and noise power is great and such that, when the second highest reference signal reception power is high, the decrease in the interference and noise power is great.

10. The mobile communication terminal according to claim 1, further comprising:
- a channel state information determiner configured to determine channel state information from the signal-to-interference-plus-noise ratio; and
- a channel state information transmitter configured to transmit the channel state information to the desired base station.

11. The mobile communication terminal according to claim 1, further comprising:
- a successive interference canceller configured to generate an interference replica by demodulating an interfering data signal from an interfering base station and cancel the interference replica from a received signal derived from radio waves received by the reception antennas, thereby extracting a desired data signal from the desired base station,
- wherein the signal-to-interference-plus-noise ratio calculator is configured to calculate a signal-to-interference-plus-noise ratio that is expected when the interference rejection combining is implemented with regard to the desired data signal and to calculate a signal-to-interference-plus-noise ratio that is expected when the interference rejection combining is implemented with regard to the interfering data signal assumed as being a desired data signal, and
- wherein the successive interference canceller is configured to repeat generating a data signal replica by demodulating a data signal with a higher signal-to-interference-plus-noise ratio with priority and canceling the data signal replica from the received signal, and cancel data signal replicas of every interfering data signal from the received signal, to extract the desired data signal.

12. A mobile communication terminal for receiving a downlink signal from a desired base station by an orthogonal frequency-division multiple access, the mobile communication terminal comprising:
- a plurality of reception antennas for receiving radio waves;
- a reference signal vector measurer configured to measure a reference signal vector being a vector representing a reference signal transmitted from the desired base station;
- an interference rejection combining processor configured to calculate an interference rejection combining reception weight matrix based on the reference signal vector measured by the reference signal vector measurer so as to reduce effects on a desired beam by another beam, wherein the desired beam is a beam of radio waves transmitted from the desired base station;
- an all received signal component estimator configured to estimate all received signal components expected when the interference rejection combining is implemented, the all received signal components being estimated from the interference rejection combining reception weight matrix and the reference signal vector measured by the reference signal vector measurer;
- a channel impulse matrix estimator configured to estimate a channel impulse matrix from a signal derived from radio waves received by the reception antennas;
- a desired reference signal component estimator configured to estimate desired reference signal components expected when the interference rejection combining is implemented, the desired reference signal components being estimated from an interference rejection combining weight vector being a part of the interference rejection combining reception weight matrix, the channel impulse matrix, and a reference signal sequence being a sequence of the reference signal or of another reference signal;
- an interference and noise power estimator configured to estimate an interference and noise power expected when the interference rejection combining is implemented, the interference and noise power being estimated by squaring a result of subtraction obtained by subtracting the desired reference signal components from the all received signal components;

a transmission weight vector estimator configured to estimate a transmission weight vector, from the channel impulse matrix, to be used for precoding at the desired base station;

a desired data signal power estimator configured to estimate a desired data signal power expected when the interference rejection combining is implemented, the desired data signal power being estimated from the interference rejection combining weight vector, the channel impulse matrix, and the transmission weight vector; and a signal-to-interference-plus-noise ratio calculator configured to calculate a signal-to-interference-plus-noise ratio that is expected when the interference rejection combining is implemented, the signal-to-interference-plus-noise ratio being calculated from the desired data signal power and the interference and noise power.

13. The mobile communication terminal according to claim 12, wherein the reference signal vector measurer is configured to measure, as the reference signal vector, a cell-specific reference signal vector being a vector representing a cell-specific reference signal.

14. The mobile communication terminal according to claim 13, wherein the channel impulse matrix estimator is configured to estimate the channel impulse matrix based on the cell-specific reference signal vector measured by the reference signal vector measurer, and wherein the desired reference signal component estimator is configured to estimate the desired reference signal components from the interference rejection combining weight vector, the channel impulse matrix, and a sequence of the cell-specific reference signal.

15. The mobile communication terminal according to claim 13, further comprising:

a channel state information reference signal vector measurer configured to measure a channel state information reference signal vector being a vector representing a channel state information reference signal transmitted from the desired base station, wherein the channel impulse matrix estimator is configured to estimate the channel impulse matrix based on the channel state information reference signal vector measured by the channel state information reference signal vector measurer, and wherein the desired reference signal component estimator is configured to estimate the desired reference signal components from the interference rejection combining weight vector, the channel impulse matrix, and a sequence of the channel state information reference signal.

16. The mobile communication terminal according to claim 12, wherein the reference signal vector measurer is configured to measure, as the reference signal vector, a channel state information reference signal vector being a vector representing a channel state information reference signal, wherein the channel impulse matrix estimator is configured to estimate the channel impulse matrix based on the channel state information reference signal vector measured by the reference signal vector measurer, and wherein the desired reference signal component estimator is configured to estimate the desired reference signal components from the interference rejection combining weight vector, the channel impulse matrix, and a sequence of the channel state information reference signal.

17. A mobile communication terminal for receiving a downlink signal from a desired base station by an orthogonal frequency-division multiple access, the mobile communication terminal comprising:

a plurality of reception antennas for receiving radio waves;

a reference signal vector measurer configured to measure a reference signal vector being a vector representing a reference signal transmitted from the desired base station;

an interference rejection combining processor configured to calculate an interference rejection combining reception weight matrix based on the reference signal vector measured by the reference signal vector measurer so as to reduce effects on a desired beam by another beam, wherein the desired beam is a beam of radio waves transmitted from the desired base station;

a channel impulse matrix estimator configured to estimate a plurality of channel impulse matrices each corresponding to respective ones of different resource elements of the reference signal, from a signal derived from radio waves received by the reception antennas;

an interference and noise power estimator configured to estimate an interference and noise power expected when an interference rejection combining is implemented, the interference and noise power being estimated from the interference rejection combining reception weight matrix and a plurality of channel impulse vectors each being a part of respective ones of the channel impulse matrices;

a transmission weight matrix supplier configured to supply a candidate for a transmission weight matrix to be used for precoding at the desired base station;

an inter-transmission-stream interference power estimator configured to estimate an inter-transmission-stream interference power expected when the interference rejection combining is implemented from an interference rejection combining weight vector being a part of the interference rejection combining reception weight matrix, one of the channel impulse matrices or another of the channel impulse matrices estimated by the channel impulse matrix estimator, and the transmission weight matrix candidate, wherein the inter-transmission-stream interference power is transmitted from the desired base station;

a desired data signal power estimator configured to estimate a desired data signal power expected when the interference rejection combining is implemented, the desired data signal power being estimated from the interference rejection combining weight vector, one of the channel impulse matrices estimated by the channel impulse matrix estimator or another channel impulse matrix, and the transmission weight matrix candidate; and a signal-to-interference-plus-noise ratio calculator configured to calculate a signal-to-interference-plus-noise ratio expected when the interference rejection combining is implemented, the signal-to-interference-plus-noise ratio being calculated from the desired data signal power, the interference and noise power, and the inter-transmission-stream interference power.

18. The mobile communication terminal according to claim 17, wherein the reference signal vector measurer is configured to measure, as the reference signal vector, a cell-specific reference signal vector being a vector representing a cell-specific reference signal, wherein the interference rejection combining processor is configured to calculate the interference rejection combining reception weight matrix based on the cell-specific reference signal vector measured by the reference signal vector measurer;

wherein the channel impulse matrix estimator is configured to estimate a plurality of channel impulse matrices respectively corresponding to each of different resource elements of the cell-specific reference signal vector, and wherein the interference and noise power estimator is configured to estimate the interference and noise power from the interference rejection combining reception weight matrix and from a plurality of channel impulse vectors respectively being a part of each of the channel impulse matrices derived from the cell-specific reference signal.

19. The mobile communication terminal according to claim 18, wherein the inter-transmission-stream interference power estimator is configured to estimate the inter-transmission-stream interference power from the interference rejection combining weight vector, one of the channel impulse matrices estimated by the channel impulse matrix estimator, the channel impulse matrices being derived from the cell-specific reference signal, and from the transmission weight matrix candidate, and wherein the desired data signal power estimator is configured to estimate the desired data signal power from the interference rejection combining weight vector, one of the channel impulse matrices estimated by the channel impulse matrix estimator, and the transmission weight matrix candidate, the channel impulse matrices being derived from the cell-specific reference signal.

20. The mobile communication terminal according to claim 18, further comprising:

a channel state information reference signal vector measurer configured to measure a channel state information reference signal vector being a vector representing a channel state information reference signal transmitted from the desired base station; and a channel state information reference signal channel impulse matrix estimator configured to estimate a channel state information reference signal channel impulse matrix from a signal derived from radio waves received by the reception antennas, the channel state information reference signal channel impulse matrix being a channel impulse matrix derived from the channel state information reference signal, wherein the inter-transmission-stream interference power estimator is configured to estimate the inter-transmission-stream interference power from the interference rejection combining weight vector, the channel state information reference signal channel impulse matrix estimated by the channel state information reference signal channel impulse matrix estimator, and the transmission weight matrix candidate, and wherein the desired data signal power estimator is configured to estimate the desired data signal power from the interference rejection combining weight vector, the channel state information reference signal channel impulse matrix estimated by the channel state information reference signal channel impulse matrix estimator, and the transmission weight matrix candidate.

21. A mobile communication terminal for receiving a downlink signal from a desired base station by an orthogonal frequency-division multiple access, the mobile communication terminal comprising:

a plurality of reception antennas for receiving radio waves;

a reference signal vector measurer configured to measure a demodulation reference signal vector being a vector representing a reference signal for demodulation transmitted from the desired base station;

an interference rejection combining processor configured to calculate an interference rejection combining reception weight matrix based on the demodulation reference signal vector measured by the reference signal vector measurer so as to reduce effects on a desired beam by another beam, wherein the desired beam is a beam of radio waves transmitted from the desired base station;

an all received power estimator configured to estimate an all received power expected when an interference rejection combining is implemented, the all received power being estimated from the interference rejection combining reception weight matrix and the demodulation reference signal vector measured by the reference signal vector measurer;

a channel impulse matrix estimator configured to estimate a channel impulse matrix based on the demodulation reference signal vector measured by the reference signal vector measurer;

a desired reference signal power estimator configured to estimate a desired reference signal power expected when the interference rejection combining is implemented, the desired reference signal power being estimated from an interference rejection combining weight vector being a part of the interference rejection combining reception weight matrix, the channel impulse matrix, and a sequence of the reference signal for demodulation;

an interference and noise power estimator configured to estimate an interference and noise power expected when the interference rejection combining is implemented, the interference and noise power being estimated by subtracting the desired reference signal power from the all received power; and a signal-to-interference-plus-noise ratio calculator configured to calculate a signal-to-interference-plus-noise ratio expected when the interference rejection combining is implemented, the signal-to-interference-plus-noise ratio being calculated from the desired reference signal power and the interference and noise power.

22. A mobile communication terminal for receiving a downlink signal from a desired base station by an orthogonal frequency-division multiple access, the mobile communication terminal comprising:

a plurality of reception antennas for receiving radio waves;

a reference signal vector measurer configured to measure a demodulation reference signal vector being a vector representing a reference signal for demodulation transmitted from the desired base station;

an interference rejection combining processor configured to calculate an interference rejection combining reception weight matrix based on the demodulation reference signal vector measured by the reference signal vector measurer so as to reduce effects on a desired beam by another beam, wherein the desired beam is a beam of radio waves transmitted from the desired base station;

a channel impulse matrix estimator configured to estimate, from a signal derived from radio waves received by the reception antennas, a plurality of channel impulse matrices each corresponding to respective ones of different resource elements of the reference signal for demodulation;

an interference and noise power estimator configured to estimate an interference and noise power that is expected when an interference rejection combining is implemented, the interference and noise power being estimated from the interference rejection combining reception weight matrix and a plurality of channel impulse vectors each being a part of respective ones of the channel impulse matrices;

an inter-transmission-stream interference power estimator configured to estimate an inter-transmission-stream interference power from an interference rejection combining weight vector being a part of the interference rejection combining reception weight matrix and one of the channel impulse matrices estimated by the channel impulse matrix estimator, wherein the inter-transmission-stream interference power is transmitted from the desired base station and is expected when the interference rejection combining is implemented;

a desired data signal power estimator configured to estimate a desired data signal power expected when the interference rejection combining is implemented, the desired data signal power being estimated from the interference rejection combining weight vector, one of the channel impulse matrices estimated by the channel impulse matrix estimator, and a sequence of the reference signal for demodulation; and a signal-to-interference-plus-noise ratio calculator configured to calculate a signal-to-interference-plus-noise ratio expected when the interference rejection combining is implemented, the signal-to-interference-plus-noise ratio being calculated from the desired data signal power, the interference and noise power, and the inter-transmission-stream interference power.

* * * * *